US012654159B2

(12) United States Patent
Han et al.

(10) Patent No.: US 12,654,159 B2
(45) Date of Patent: Jun. 16, 2026

(54) ZSM-5/β CORE-SHELL MOLECULAR SIEVE AND SYNTHESIS AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Lei Han, Beijing (CN); Wei Lin, Beijing (CN); Peng Wang, Beijing (CN); Haitao Song, Beijing (CN); Lixia Wang, Beijing (CN); Xiang Zhou, Beijing (CN); Liuzhou Zhao, Beijing (CN); Xueguo Zheng, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 663 days.

(21) Appl. No.: 18/002,322

(22) PCT Filed: Jun. 24, 2021

(86) PCT No.: PCT/CN2021/101993
§ 371 (c)(1),
(2) Date: Dec. 19, 2022

(87) PCT Pub. No.: WO2021/259347
PCT Pub. Date: Dec. 30, 2021

(65) Prior Publication Data
US 2023/0347330 A1     Nov. 2, 2023

(30) Foreign Application Priority Data

Jun. 24, 2020     (CN) ......................... 202010590434.7
Aug. 28, 2020     (CN) ......................... 202010885254.1
(Continued)

(51) Int. Cl.
*B01J 35/00*          (2006.01)
*B01J 29/40*          (2006.01)
(Continued)

(52) U.S. Cl.
CPC .............. *B01J 35/19* (2024.01); *B01J 29/40* (2013.01); *B01J 29/7007* (2013.01);
(Continued)

(58) Field of Classification Search
None
See application file for complete search history.

(56) References Cited

U.S. PATENT DOCUMENTS 3,702,886 A      11/1972  Argauer et al.
2014/0256538 A1*  9/2014  Yoon ......................... B01J 29/80
                                                      502/67
2018/0237702 A1   8/2018  Akah et al.

FOREIGN PATENT DOCUMENTS

CN        101884935 A      11/2010
CN        101885493 A  *  11/2010
(Continued)

OTHER PUBLICATIONS

CN-101884935-A, English translation (Year: 2010).*
(Continued)

*Primary Examiner* — Stefanie J Cohen
(74) *Attorney, Agent, or Firm* — NKL Law; Allen Xue

(57)          ABSTRACT
A ZSM-5/β core-shell molecular sieve has a core composed of at least two crystal grains of ZSM-5 molecular sieve and
(Continued)

a shell composed of a plurality of crystal grains of β molecular sieve. The ZSM-5 molecular sieve grains has an average grain size of 0.05-15 μm. The core-shell molecular sieve has a shell coverage of 50-100%, a shell thickness of 10-2000 nm, and an average grain size of the β molecular sieve grains in the shell of 10-500 nm. A ratio of a height of a diffraction peak at 2θ=22.4° to a height of a diffraction peak at 2θ=23.1° in an X-ray diffraction pattern of the ZSM-5/β core-shell molecular sieve is 0.1-10:1.

19 Claims, 5 Drawing Sheets

(30)     Foreign Application Priority Data

| Aug. 31, 2020 | (CN) | .......................... | 202010893693.7 |
| Aug. 31, 2020 | (CN) | .......................... | 202010894090.9 |
| Sep. 18, 2020 | (CN) | .......................... | 202010985188.5 |

(51)  Int. Cl.

| *B01J 29/70* | (2006.01) |
| *B01J 35/61* | (2024.01) |
| *B01J 35/64* | (2024.01) |
| *B01J 37/04* | (2006.01) |
| *B01J 37/08* | (2006.01) |
| *C01B 39/38* | (2006.01) |
| *B01J 35/40* | (2024.01) |
| *B01J 35/45* | (2024.01) |

(52)  U.S. Cl.
CPC ........... *B01J 35/615* (2024.01); *B01J 35/617* (2024.01); *B01J 35/647* (2024.01); *B01J 37/04* (2013.01); *B01J 37/08* (2013.01); *C01B 39/38* (2013.01); *B01J 35/40* (2024.01); *B01J 35/45* (2024.01); *B01J 2229/30* (2013.01); *B01J 2229/62* (2013.01)

(56)     References Cited

FOREIGN PATENT DOCUMENTS

| CN | 103803581 | A | 5/2014 |
| CN | 104591217 | A | 5/2015 |
| CN | 110540869 | A | 12/2019 |
| CN | 110950731 | A | 4/2020 |
| JP | H04354541 | A | 12/1992 |
| JP | 2018532871 | A | 11/2018 |
| JP | 2020509122 | A | 3/2020 |

OTHER PUBLICATIONS

Zeng, Qing Hu et al. "Growth of ZSM-5 crystals within hollow β-zeolite", Chinese Chemical Letters, Jun. 28, 2011, vol. 22, No. 9, pp. 1103-1106.

Al-Sabawi, Mustafa et al. "Fluid catalytic cracking of biomass-derived oils and their blends with petroleum feedstocks: A review", Energy & Fuels, Sep. 20, 2012, vol. 26, No. 9, pp. 5355-5372.

Pan, Meng et al.; "Synthesis and Characterization of Y-Type Zeolite Cores and a Nano-β Zeolite Polycrystalline Shell Composites"; Journal of The Chinese Ceramic Society; vol. 43, No. 5; May 31, 2015; ISSN:0454-5648; pp. 686-691.

Bouizi, Younes et al.; "Factors Controlling the Formation of Core-Shell Zeolite-Zeolite Composites", Chem. Mater.; vol. 18, No. 20; Sep. 7, 2006; ISSN:0897-4756; pp. 4959-4966.

Yang, Cuiding et al.; "Micro-reaction Test Method for Catalytic CrackingFresh Catalyst"; Petrochemical Analytical Method(RIPP Testing Method); Sep. 1990; pp. 424-427; RIPP 151-90, RIPP152-90; ISBN : 7-03-001894-X.

* cited by examiner

ZSM-5/β CORE-SHELL MOLECULAR SIEVE AND SYNTHESIS AND USE THEREOF

CROSS REFERENCE TO RELATED APPLICATIONS

This application is a U.S. national stage entry of PCT International Application No. PCT/CN2021/101993, filed on Jun. 24, 2021, which claims the priorities of Chinese patent application No. 202010590434.7, filed on Jun. 24, 2020, titled "ZSM-5/β core-shell molecular sieve and synthesis and use thereof", Chinese patent application No. 202010894090.9, filed on Aug. 31, 2020, titled "catalyst for producing light olefins and heavy fuel oil via the cracking of hydrogenated VGO, its preparation and application thereof", Chinese patent application No. 202010885254.1, filed on Aug. 28, 2020, titled "catalytic cracking catalyst for producing more light olefins from hydrogenated LCO, its preparation and application thereof", Chinese patent application No. 202010893693.7, filed on Aug. 31, 2020, titled "use of core-shell molecular sieve in catalytic cracking catalyst for heavy oils", and Chinese patent application No. 202010985188.5, filed on Sep. 18, 2020, titled "catalytic cracking catalyst rich in pore structures, its preparation, and application thereof", the contents of which are incorporated herein by reference in their entirety.

TECHNICAL FIELD

The present application relates to the field of catalytic materials, particularly to a ZSM-5/β core-shell molecular sieve, its synthesis and application thereof.

BACKGROUND ART

The demand of society for high value-added petroleum products is continuously increased, which promotes the development of oil refining industry towards deep processing, so as to convert petroleum fractions into products with higher value, such as light olefins, BTX and the like, to the maximum extent.

Zeolite molecular sieves are microporous crystalline materials with framework structures, have pore structures with specific sizes and shapes, large specific surface areas and strong adjustable acid properties, and are widely applied in petroleum refining and processing, such as catalytic cracking, alkane isomerization, catalytic reforming, toluene disproportionation and other catalytic reactions.

ZSM-5 molecular sieves having MFI structure and β molecular sieves having BEA structure are two molecular sieves widely used in industries. ZSM-5 molecular sieve is a high-silica mesoporous molecular sieve (U.S. Pat. No. 3,702,886) having an MFI structure and three-dimensional straight channels that is developed by Mobil Corporation, USA, which has a unique pore structure, belongs to the orthorhombic system, and has unit cell parameters a=20.07 Å, b=19.92 Å, c=13.42 Å, of which the number of Al atoms in the unit cell can be varied within a range from 0 to 27, the silica-alumina ratio may vary over a large range; the framework of ZSM-comprises two interdigitated 10-membered ring channel systems, in which one type of channels are S-curved with a pore diameter of 5.5 Å×5.1 Å; the other type of channels are linear with a pore diameter of 5.3 Å×5.6 Å. ZSM-5 has the characteristics of good shape-selective catalysis and isomerization performance, high thermal and hydrothermal stability, high specific surface area, wide silica-alumina ratio range, unique surface acidity and lower carbon deposition, is widely used as a catalyst or catalyst carrier, and is successfully used in processes of alkylation, isomerization, disproportionation, catalytic cracking, gasoline preparation from methanol, olefin preparation from methanol and the like. R molecular sieves are macroporous high-silica zeolite having a three-dimensional structure and a crossed twelve-membered ring channel system with pore diameters of 5.7 Å×7.5 Å and 5.6 Å×6.5 Å. Due to its special structure, the molecular sieve has both acid catalysis property and structural selectivity, has good thermal and hydrothermal stability, moderate acidity and acid stability and hydrophobicity, shows excellent catalytic performance in transalkylation reaction and heavy aromatics upgrading reaction, and shows the characteristics of difficult coking and long service life in hydrocarbon reaction in catalysis applications.

However, although the ZSM-5 molecular sieve has a shape-selective property, its pore diameter is small, which is not conducive to diffusion and adsorption of large molecular reactants, especially cyclic hydrocarbons, and although the R molecular sieve has a large pore diameter, which allows large molecular reactants to enter and increases accessibility of active centers, it has no shape-selective property for small molecular light olefins such as ethylene and propylene. In the prior art, ZSM-5 molecular sieve and R molecular sieve are used in combination for hydrocarbon oil conversion, and the common way currently used is to use a mechanical mixture of the two molecular sieves, and in such a case, the distance between the ZSM-5 molecular sieve particles and the R molecular sieve particles is long.

In recent years, researches have studied on the formation of two molecular sieves into a core-shell molecular sieve, which is typically consisted of two molecular sieves with different crystalline structures, wherein one molecular sieve is taken as a core, and the other molecular sieve is taken as a shell wrapped on the surface of the core, so that the two different molecular sieves, i.e. core and shell molecular sieves, are used as catalytic materials to promote the catalytic reaction. However, the research on the core-shell molecular sieve in the prior art is still in the beginning stage, and thus is not sufficient, and it is not easy to obtain a core-shell molecular sieve with good performance. Existing core-shell molecular sieves such as ZSM-5/β core-shell molecular sieve have poor reaction performance when used for catalytic cracking reaction, and no prior arts provide a core-shell molecular sieve suitable for the catalytic cracking or deep cracking of hydrocarbon oils or its preparation.

DISCLOSURE OF THE INVENTION

An object of the present application is to provide a novel ZSM-5/β core-shell molecular sieve, its synthesis and application thereof, wherein the core-shell molecular sieve has a core of ZSM-5 molecular sieve and a shell of β molecular sieve, and the core-shell molecular sieve shows a better conversion effect when used for catalytic conversion of hydrocarbon oils.

To achieve the above object, in an aspect, the present application provides a ZSM-5/β core-shell molecular sieve comprising a core composed of at least two crystal grains of ZSM-5 molecular sieve and a shell composed of a plurality of crystal grains of β molecular sieve, the ZSM-5 molecular sieve grains having an average grain size of 0.05-15 the core-shell molecular sieve having a shell coverage of 50-100%, a shell thickness of 10-2000 nm, and an average grain size of the β molecular sieve grains in the shell of 10-500 nm, wherein a ratio of a height of a diffraction peak at 2θ=22.4° to a height of a diffraction peak at 2θ=23.1° in an X-ray diffraction pattern of the ZSM-5/β core-shell molecular sieve is 0.1-10:1.

In another aspect, the present application provides a method for the synthesis of a ZSM-5/β core-shell molecular sieve, comprising the steps of:

1) treating a particulate ZSM-5 molecular sieve with a surfactant solution to obtain a ZSM-5 molecular sieve material I;

2) treating the ZSM-5 molecular sieve material I with a slurry comprising a particulate β molecular sieve to obtain a ZSM-5 molecular sieve material II, wherein the particles of the β molecular sieve are composed of at least one crystal grain of the β molecular sieve;

3) providing a synthesis liquid comprising a silicon source, an aluminum source, an optional alkali source, a template and water, and crystallizing the synthesis liquid at a temperature of 50-300° C., preferably 75-250° C., more preferably 80-180° C. for 4-100 hours, preferably 10-80 hours, more preferably 18-50 hours to obtain a pre-crystallized synthesis liquid III; and 4) mixing the ZSM-5 molecular sieve material II with the pre-crystallized synthesis liquid III and crystallizing the resultant to obtain the ZSM-5/β core-shell molecular sieve.

Preferably, the particles of the ZSM-5 molecular sieve used in step 1) are composed of at least two crystal grains of the ZSM-5 molecular sieve.

In yet another aspect, the present application provides a catalyst comprising, on a dry basis and based on the weight of the catalyst, from 30 wt % to 90 wt % of a carrier, from 2 wt % to 50 wt % of the ZSM-5/β core-shell molecular sieve according to the present application, and from 0 wt % to 50 wt % of an additional molecular sieve.

Preferably, the ZSM-5/β core-shell molecular sieve has a sodium content, calculated as $Na_2O$, of no more than 0.15 wt %.

In yet another aspect, the present application provides a process for the catalytic conversion of a hydrocarbon oil, comprising the step of contacting a hydrocarbon oil feedstock with a catalyst according to the present application.

The core-shell molecular sieve of the present application can be used in hydrocarbon conversion reactions, such as catalytic cracking reactions, alkylation reactions, isomerization reactions, and the like. Particularly, when used for the cracking or deep cracking of hydrocarbon oils, the core-shell molecular sieve of the present application shows better conversion effect; and when used for the cracking of hydrocarbon oils comprising naphthenic rings, such as the cracking and conversion of hydrogenated LCO, it shows higher propylene yield and/or ethylene yield, and higher heavy oil conversion rate.

The method for the synthesis of the ZSM-5/β core-shell molecular sieve of the present application have one or more selected from the group consisting of the following beneficial effects:

(1) a quick synthesis of the ZSM-5/β core-shell molecular sieve can be achieved;

(2) a β molecular sieve can be synthesized using a relatively lower amount of template;

(3) the shell coverage can be improved;

(4) the total specific surface area of the synthesized molecular sieve can be improved;

(5) the synthesized molecular sieve has a relatively higher ratio of mesopore surface area;

(6) the synthesized molecular sieve has more pores of 2-50 nm, the pore diameter distribution of the molecular sieve shows pore diameter distribution peaks within the pore diameter ranges of 2-4 nm and 20-80 nm, and the molecular sieve has an abundance of mesoporous and macroporous pore volumes.

Other characteristics and advantages of the present application will be described in detail in the Detailed Description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the Detailed Description hereinbelow. In the drawings.

DETAILED DESCRIPTION OF THE INVENTION

Figure 1:
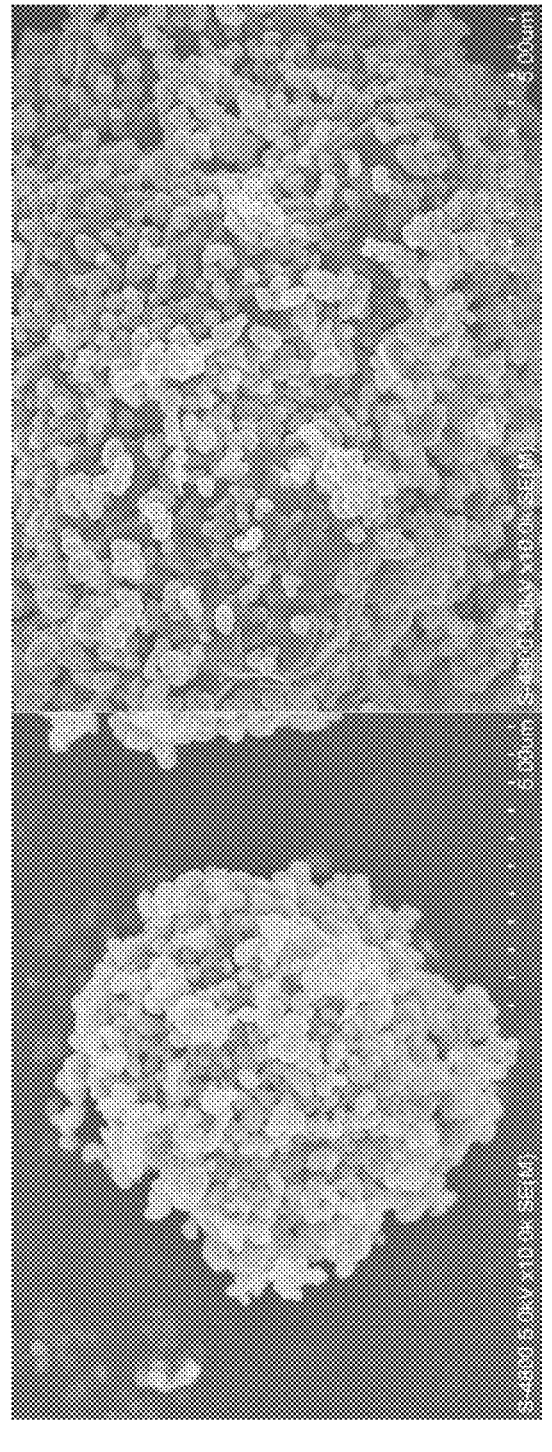
FIG. 1 shows an SEM image of the ZSM-5/β core-shell molecular sieve obtained in Example I-1 of the present application.

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, the "grain size" refers to the size of the widest part of a crystal grain, which can be obtained by measuring the size of the widest part of the projection plane of the crystal grain in an SEM or TEM image of a sample. The average of the grain sizes of a plurality of crystal grains is the average grain size of the sample.

In the present application, the "particle size" refers to the size of the widest part of a particle, which can be obtained by measuring the size of the widest part of the projection plane of the particle in an SEM or TEM image of a sample, and the average of the particle sizes of a plurality of particles is the average particle size of the sample. It can also be measured by a laser particle sizer. One particle may comprise one or more crystal grains therein.

In the present application, the "dry weight" refers to the weight of a solid product measured after being calcined in air at 850° C. for 1 hour.

In the present application, the "catalyst-to-oil ratio" refers to the weight ratio of the catalyst to the feedstock oil.

In the present application, the term "sodium-type core-shell molecular sieve" refers to a ZSM-5/β core-shell molecular sieve obtained after the crystallization step without a treatment (e.g., ammonium exchange) for reducing the $Na_2O$ content; the term "hydrogen-type core-shell molecular sieve" or "modified core-shell molecular sieve" refers to a ZSM-5/β core-shell molecular sieve obtained from the "sodium-type core-shell molecular sieve" after a treatment (e.g., ammonium exchange) for reducing the $Na_2O$ content (e.g., reducing the $Na_2O$ content to a level of less than 0.15 wt %).

In the present application, the term "heavy oil" has a meaning well known in the art and may be, for example, one or more selected from the group consisting of atmospheric residue, atmospheric gas oil, vacuum residue, vacuum gas oil, coker gas oil, and light/heavy deasphalted oil.

In the present application, the term "intermediate base crude oil" refers to a type of crude oil that has properties intermediate between paraffin base crude oil and naphthene base crude oil, with a characterization factor of 11.5-12.1, of which the alkane content and cycloalkane content are almost the same.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

ZSM-5/β Core-Shell Molecular Sieve

As described above, in a first aspect, the present application provides a ZSM-5/β core-shell molecular sieve comprising a core composed of at least two crystal grains of ZSM-5 molecular sieve and a shell composed of a plurality of crystal grains of β molecular sieve, wherein a ratio of a height (D1) of a diffraction peak at 2θ=22.4° to a height (D2) of a diffraction peak at 2θ=23.1° in an X-ray diffraction pattern of the ZSM-5/β core-shell molecular sieve is 0.1-10:1. According to the present application, the diffraction peak at 2θ=22.4° refers to the diffraction peak in the X-ray diffraction pattern at a 2θ angle within a range of 22.4°±0.1°, and the diffraction peak at 2θ=23.1° refers to the diffraction peak in the X-ray diffraction pattern at a 2θ angle within a range of 23.1°±0.1°.

In a preferred embodiment of the ZSM-5/β core-shell molecular sieve, the ratio of the height (D1) of the diffraction peak at 2θ=22.4° to the height (D2) of the diffraction peak at 2θ=23.1° is in a range of 0.1-8:1, such as 0.1-5:1 or 0.12-4:1 or 0.8-8:1.

In a preferred embodiment of the ZSM-5/β core-shell molecular sieve, the mass ratio of the core to the shell of the core-shell molecular sieve is in a range of 0.2-20:1, for example 1-15:1, wherein the mass ratio of the core to the shell can be calculated using the peak area of the X-ray diffraction pattern.

In a preferred embodiment of the ZSM-5/β core-shell molecular sieve, the ZSM-5/β core-shell molecular sieve has a total specific surface area (also referred to as the specific surface area of the ZSM-5/β core-shell molecular sieve) of more than 420 $m^2/g$, for example, 420-650 $m^2/g$. Further preferably, the ZSM-5/β core-shell molecular sieve has a total specific surface area of more than 450 $m^2/g$, such as 450-620 $m^2/g$, 480-600 $m^2/g$, 490-580 $m^2/g$ or 500-560 $m^2/g$.

In a preferred embodiment of the ZSM-5/β core-shell molecular sieve, the proportion of the mesopore surface area of the ZSM-5/β core-shell molecular sieve to the total surface area thereof (also referred to as the proportion of the mesopore specific surface area to the total specific surface area) is in a range of from 10% to 40%, for example from 12% to 35%. Here, the mesopore refer to pores having a pore diameter of 2-50 nm.

In a preferred embodiment of the ZSM-5/β core-shell molecular sieve, the pore volume of pores having a pore diameter of 0.3-0.6 nm in the ZSM-5/β core-shell molecular sieve accounts for 40% to 90%, such as 40% to 88%, 50% to 85%, 60% to 85%, or 70% to 82%, of the total pore volume of the ZSM-5/β core-shell molecular sieve.

In a preferred embodiment of the ZSM-5/β core-shell molecular sieve, the pore volume of pores having a pore diameter of 0.7-1.5 nm in the ZSM-5/β core-shell molecular sieve accounts for 3% to 20%, for example 3% to 15% or 3% to 9%, of the total pore volume of the ZSM-5/β core-shell molecular sieve.

In a preferred embodiment of the ZSM-5/β core-shell molecular sieve, the pore volume of pores having a pore diameter of 2-4 nm in the ZSM-5/β core-shell molecular sieve accounts for 4% to 50%, for example 4% to 40%, or 4% to 20%, or 4% to 10%, of the total pore volume of the ZSM-5/β core-shell molecular sieve.

In a preferred embodiment of the ZSM-5/β core-shell molecular sieve, the pore volume of the pores with a pore diameter of 20-80 nm in the ZSM-5/β core-shell molecular sieve accounts for 5% to 40%, such as 5% to 30%, or 6% to 20%, or 7% to 18%, or 8% to 16%, of the total pore volume of the ZSM-5/β core-shell molecular sieve.

In a preferred embodiment of the ZSM-5/β core-shell molecular sieve, the pore volume of pores having a pore diameter of 2-80 nm in the core-shell molecular sieve accounts for 10% to 30%, for example 11% to 25%, of the total pore volume.

In a preferred embodiment of the ZSM-5/β core-shell molecular sieve, the pore volume of the pores with a pore diameter of 20-80 nm in the core-shell molecular sieve accounts for 50% to 70%, such as 55% to 65% or 58% to 64%, of the pore volume of the pores with a pore diameter of 2-80 nm.

In a preferred embodiment of the ZSM-5/β core-shell molecular sieve, the ZSM-5/β core-shell molecular sieve has a total pore volume of from 0.28 mL/g to 0.42 mL/g, for example from 0.3 mL/g to 0.4 mL/g or from 0.32 mL/g to 0.38 mL/g.

In the above preferred embodiments, the ZSM-5/β core-shell molecular sieve has obviously a gradient pore distribution of micropore-mesopore-macropore, and is abundant in mesopore and macropore volumes within the pore diameter ranges of 2-4 nm and 20-80 nm, which is beneficial to the fractional cracking of large molecules of naphthenic heavy oil.

According to the present application, the total pore volume and the pore diameter distribution can be measured by a low-temperature nitrogen adsorption volume method, and the pore diameter distribution can be calculated using a BJH calculation method, in accordance with the RIPP-151-90 method (see "Petrochemical Analysis Methods (RIPP Test Methods)", edited by Cuiding YANG et al., Science Press, September 1990, pages 424-427, ISBN: 7-03-001894-X). In a preferred embodiment of the ZSM-5/β core-shell molecular sieve, the β molecular sieve grains in the shell of the ZSM-5/β core-shell molecular sieve has an average grain size in a range of from 10 to 500 nm, for example from 50 to 500 nm.

In a preferred embodiment of the ZSM-5/β core-shell molecular sieve, the shell of the ZSM-5/β core-shell molecular sieve has a thickness of 10-2000 nm, such as 50 to 2000 nm.

In a preferred embodiment of the ZSM-5/β core-shell molecular sieve, the shell molecular sieve (i.e. the β molecular sieve in the shell) has a silica-alumina ratio (i.e. a silica to alumina molar ratio calculated as $SiO_2/Al_2O_3$) in a range of from 10 to 500, preferably from 10 to 300, for example from 30 to 200 or from 25 to 200.

In a preferred embodiment of the ZSM-5/β core-shell molecular sieve, the core molecular sieve of the ZSM-5/β core-shell molecular sieve (i.e., the ZSM-5 molecular sieve in the core) has a silica-alumina ratio of 10 to ∞, e.g., 20 to ∞, 50 to ∞, 30 to 300, 30 to 200, 20 to 80, 25 to 70 or 30 to 60.

According to the present application, the particles of the core molecular sieve of the ZSM-5/β core-shell molecular sieve are aggregates of a plurality of ZSM-5 molecular sieve crystal grains, and the number of the ZSM-5 molecular sieve crystal grains in a single particle of the core molecular sieve is not less than 2.

In a preferred embodiment of the ZSM-5/β core-shell molecular sieve, the ZSM-5 molecular sieve crystal grains in the core of the ZSM-5/β core-shell molecular sieve have an average grain size of from 0.05 to 15 μm, preferably from 0.1 to 10 μm for example from 0.1 to 5 μm or from 0.1 to 1.2 μm.

In a preferred embodiment of the ZSM-5/β core-shell molecular sieve, the ZSM-5 molecular sieve particles in the core of the ZSM-5/β core-shell molecular sieve have an average particle size of 0.1 to 30 such as 0.2 μm to 25 μm, 0.5 to 10 μm, 1 to 5 μm or 2 to 4 μm.

In a preferred embodiment of the ZSM-5/β core-shell molecular sieve, the shell coverage of the core-shell molecular sieve is in a range of 50-100%, for example 80-100%.

Synthesis Method of ZSM-5/β Core-Shell Molecular Sieve

As described above, in a second aspect, the present application provides a method for the synthesis of a ZSM-5/β core-shell molecular sieve, comprising the steps of:

1) treating a particulate ZSM-5 molecular sieve (starting material) with a surfactant solution to obtain a ZSM-5 molecular sieve material I;

2) treating the ZSM-5 molecular sieve material I with a slurry comprising a particulate β molecular sieve to obtain a ZSM-5 molecular sieve material II with the β molecular sieve attached to its surface;

3) providing a synthesis liquid comprising a silicon source, an aluminum source, an optional alkali source, a template and water, and crystallizing the synthesis liquid at a temperature of 50-300° C. for 4-100 h (also referred to as first crystallization or pre-crystallization in the present application) to obtain a pre-crystallized synthesis liquid III; and 4) mixing the ZSM-5 molecular sieve material II with the pre-crystallized synthesis liquid III and crystallizing (also referred to as second crystallization in the present application) to obtain the ZSM-5/β core-shell molecular sieve.

In a preferred embodiment of the method for the synthesis of the ZSM-5/β core-shell molecular sieve of the present application, the treatment of step 1) is performed by: adding the particulate ZSM-5 molecular sieve (starting material) into the surfactant solution with a concentration by weight of 0.05-50%, preferably 0.1-30%, for example 0.1-5%, to perform contacting; preferably under stirring, and then filtering and drying to obtain the ZSM-5 molecular sieve material I.

In this preferred embodiment, said drying of step 1) is not particularly limited, and may be, for example, drying, flash drying, pneumatic drying. In a further preferred embodiment, the temperature of drying is 50 to 150° C. and the drying time is not limited as long as the sample can be dried, and may be, for example, 0.5 to 4 hours.

In a further preferred embodiment, the treatment in step 1) is carried out at 20-70° C. for 0.5 h or more, for example 0.5-48 h or 1-36 h.

In a preferred embodiment of the method for the synthesis of the ZSM-5/β core-shell molecular sieve of the present application, the weight ratio of the surfactant solution to the ZSM-5 molecular sieve on a dry basis in step 1) is 10-200:1.

In a preferred embodiment of the method for the synthesis of the ZSM-5/β core-shell molecular sieve of the present application, the surfactant solution may further comprise a salt that may promote the separation or dispersion of the surfactant and have an electrolyte property, such as one or more selected from the group consisting of alkali metal salt and ammonium salt soluble in water, preferably one or more selected from the group consisting of chloride of alkali metal, nitrate of alkali metal, chloride of ammonium, nitrate of ammonium, for example, the salt may be selected from the group consisting of sodium chloride, potassium chloride, ammonium chloride, ammonium nitrate or a combination thereof; the concentration of the salt in the surfactant solution is preferably 0.05 wt % to 10.0 wt %, for example 0.2 wt % to 2 wt %. The addition of the salt is beneficial to the adsorption of the surfactant.

In a preferred embodiment of the method for the synthesis of the ZSM-5/β core-shell molecular sieve of the present application, the surfactant may be selected from the group consisting of polymethyl methacrylate, polydiallyldimethylammonium chloride, dipicolinic acid, aqueous ammonia, ethylamine, n-butylamine, tetraethylammonium hydroxide, tetrapropylammonium hydroxide, tetraethylammonium bromide, tetrapropylammonium bromide, tetrabutylammonium hydroxide or a combination thereof.

In a preferred embodiment of the method for the synthesis of the ZSM-5/β core-shell molecular sieve of the present application, the silica-alumina ratio of the particulate ZSM-5 molecular sieve in step 1) is 10 to ∞; for example, the silica-alumina ratio of the particulate ZSM-5 molecular sieve in step 1) may be 20 to ∞, 50 to ∞, 30-300, 30-200, 40-70, 20-80, 25-70 or 30-60.

In a preferred embodiment of the method for the synthesis of the ZSM-5/β core-shell molecular sieve of the present application, the particles of the particulate ZSM-5 molecular sieve used in step 1) are composed of at least two crystal grains of the ZSM-5 molecular sieve.

In a further preferred embodiment, the ZSM-5 molecular sieve crystal grains have an average grain size of from 0.05 to 20 μm, for example from 0.1 to 10 μm.

In a preferred embodiment of the method for the synthesis of the ZSM-5/β core-shell molecular sieve of the present application, the particulate ZSM-5 molecular sieve has an average particle size of 0.1 to 30 μm, for example 0.5 to 25 μm, 1 to 20 μm, 1 to 5 μm or 2 to 4 μm.

In a preferred embodiment of the method for the synthesis of the ZSM-5/β core-shell molecular sieve of the present application, the ZSM-5 molecular sieve used in step 1) is a sodium-type, hydrogen-type or ion-exchanged ZSM-5 molecular sieve. The ion-exchanged ZSM-5 molecular sieve refers to an exchanged ZSM-5 molecular sieve obtained by subjecting a ZSM-5 molecular sieve (for example, a sodium-type ZSM-5 molecular sieve) to ion exchange with ions other than alkali metals, for example, transition metal ions, ammonium ions, alkaline earth metal ions, Group IIIA metal ions, Group IVA metal ions and Group VA metal ions.

In a preferred embodiment of the method for the synthesis of the ZSM-5/β core-shell molecular sieve of the present application, the treatment of step 2) is performed by: adding the ZSM-5 molecular sieve material I into the slurry comprising the particulate β molecular sieve (also referred to as β zeolite) to perform contacting; preferably under stirring, and then filtering and drying, to obtain the ZSM-5 molecular sieve material II.

In a further preferred embodiment, the treatment of step 2) is carried out at 20-60° C. for 0.5 h or more, for example 1-24 h.

In a preferred embodiment of the method for the synthesis of the ZSM-5/β core-shell molecular sieve of the present application, the concentration of the β molecular sieve in the slurry comprising the particulate β molecular sieve in step 2) is in a range of 0.1 to 10 wt %, for example 0.3 to 8 wt % or 0.2 to 1 wt %.

In a preferred embodiment of the method for the synthesis of the ZSM-5/β core-shell molecular sieve of the present application, in step 2), the weight ratio of the slurry comprising the β molecular sieve to the ZSM-5 molecular sieve material I on a dry basis is in a range of 10-50:1, preferably the weight ratio of the β molecular sieve on a dry basis to the ZSM-5 molecular sieve material I on a dry basis is in a range of 0.01-1:1, for example 0.02-0.35:1.

In a preferred embodiment of the method for the synthesis of the ZSM-5/β core-shell molecular sieve of the present application, the particles of the particulate β molecular sieve used in step 2) are composed of at least one β molecular sieve crystal grain. In a further preferred embodiment, the β molecular sieve grains have an average grain size of 10-500 nm, such as 50-400 nm, 100-300 nm, 10-300 nm or 200-500 nm.

In a further preferred embodiment, the average grain size of the β molecular sieve crystal grains is less than the average grain size of the ZSM-5 molecular sieve crystal grains. For example, the average grain size of the β molecular sieve grains is 10-500 nm smaller than the average grain size of the ZSM-5 molecular sieve grains, or the average grain size of the ZSM-5 molecular sieve grains is 1.5 times or more, for example 2-50 or 5-20 times, the average grain size of the β molecular sieve grains.

In a preferred embodiment of the method for the synthesis of the ZSM-5/β core-shell molecular sieve of the present application, the average particle size of the particulate β molecular sieve in step 2) is in a range of from 0.01 to 0.5 μm, for example from 0.05 to 0.5 μm. Preferably, the particles of the β molecular sieve are single-grain particles.

In a preferred embodiment of the method for the synthesis of the ZSM-5/β core-shell molecular sieve of the present application, the β molecular sieve used in step 2) has a silica-alumina ratio in a range of from 10 to 500, for example from 30 to 200 or from 25 to 200.

In a preferred embodiment of the method for the synthesis of the ZSM-5/β core-shell molecular sieve of the present application, in step 3), the molar ratio of the silicon source, the aluminum source, the optional alkali source, the template (represented by R), and water is: $R/SiO_2$=0.1-10, e.g. 0.1-3 or 0.2-2.2; $H_2O/SiO_2$=2-150, e.g. 10-120; $SiO_2/Al_2O_3$=10-800, e.g. 20-800; $Na_2O/SiO_2$=0-2, such as 0.01-1.7, 0.05-1.3 or 0.1-1.1, where R represents the template, $SiO_2$ represents the silicon source calculated as $SiO_2$, $Al_2O_3$ represents the aluminum source calculated as $Al_2O_3$, $Na_2O$ represents the alkali source calculated as $Na_2O$.

In a preferred embodiment of the method for the synthesis of the ZSM-5/β core-shell molecular sieve of the present application, in step 3), the silicon source may be selected from the group consisting of tetraethoxysilane, water glass, coarse silica gel, silica sol, silica white, activated clay, or a combination thereof; the aluminum source may be selected from the group consisting of aluminum sulfate, aluminum isopropoxide, aluminum nitrate, aluminum sol, sodium metaaluminate, γ-alumina, or a combination thereof; the alkali source may be selected from the group consisting of sodium hydroxide, potassium hydroxide, or a combination thereof; the template (R) is, for example, one or more selected from the group consisting of tetraethylammonium fluoride, tetraethylammonium hydroxide, tetraethylammonium chloride, tetraethylammonium bromide, polyvinyl alcohol, triethanolamine or sodium carboxymethylcellulose, and preferably, the template comprises tetraethylammonium hydroxide, tetraethylammonium chloride, tetraethylammonium bromide or a combination thereof.

In a preferred embodiment of the method for the synthesis of the ZSM-5/β core-shell molecular sieve of the present application, in step 3), the silicon source, the aluminum source, the optional alkali source, the template R, and deionized water are mixed to form a synthesis liquid, which is then crystallized at 75-250° C. for 10-80 hours to obtain a pre-crystallized synthesis liquid III; preferably, the crystallization temperature of the crystallization (i.e., the first crystallization) of step 3) is 80 to 180° C., and the crystallization time is 18 to 50 hours.

In the above preferred embodiment of the method for the synthesis of the ZSM-5/β core-shell molecular sieve of the present application, the crystallization of step 3) is performed so that the resulting pre-crystallized synthesis liquid III is present in a crystallization state, where crystal grains are to be appear but have not been appeared yet, that is near the end of the crystallization induction period and going to enter the rapid growth stage of crystal nucleus. Preferably, XRD analysis of the resulting pre-crystallized synthesitetraethoxysilanes liquid III shows a peak at $2\theta=22.4°$ and no peak at $2\theta=21.2°$, wherein $2\theta=22.4°$ means that it is in a range of $2\theta=22.4°±0.1°$ and $2\theta=21.2°$ means that it is in a range of $2\theta=21.2°±0.1°$. For example, in the XRD pattern of the synthesis liquid III, the ratio of the intensity of the peak at $2\theta=22.4°$ to the intensity of the peak at $2\theta=21.2°$ is infinite. The XRD analysis of the pre-crystallized synthesis liquid III can be carried out according to the following method: filtering the pre-crystallized synthesis liquid III, washing, drying and calcining at 550° C. for 4 hours, and then carrying out the XRD analysis, wherein the washing can be carried out using deionized water.

In a preferred embodiment of the method for the synthesis of the ZSM-5/β core-shell molecular sieve of the present application, in step 4), the ZSM-5 molecular sieve material II is mixed with the pre-crystallized synthesis liquid III, for example, the ZSM-5 molecular sieve material II is added to the pre-crystallized synthesis liquid III, wherein the weight ratio of the pre-crystallized synthesis liquid III to the ZSM-5 molecular sieve material II on a dry basis is 2-10:1, for example, 4-10:1. Preferably, the weight ratio of the ZSM-5 molecular sieve on a dry basis to the pre-crystallized synthesis liquid III on a dry basis is greater than 0.2:1, for example, 0.3-20:1, 1-15:1, 0.5-10:1, 0.5-5:1, 0.8-2:1 or 0.9-1.7:1, where the weight of the pre-crystallized synthesis liquid III on a dry basis refers to the weight of the solid product obtained after filtering the pre-crystallized synthesis liquid III, drying and calcining in air at 850° C. for 1 hour.

In a preferred embodiment of the method for the synthesis of the ZSM-5/β core-shell molecular sieve, the crystallization temperature of the crystallization (i.e., the second crystallization) in step 4) is 50-300° C. and the crystallization time is 10-400 h.

In a preferred embodiment of the method for the synthesis of the ZSM-5/β core-shell molecular sieve, in step 4), the ZSM-5 molecular sieve material II is mixed with the pre-crystallized synthesis liquid III and then crystallized for 30 to 350 hours at a temperature of 100° C. and 250° C. The crystallization temperature of the crystallization in step 4) is, for example, 100-200° C., and the crystallization time is, for example, 50-120 h.

In a preferred embodiment of the method for the synthesis of the ZSM-5/β core-shell molecular sieve of the present application, in step 4), after the crystallization is completed, a process of recovering the core-shell molecular sieve may be further performed, wherein the recovering typically comprises: one or more steps of filtering, washing, drying, and calcining, for example the crystallized product may be filtered, then washed and dried, and optionally calcined. The drying may be performed by conventional means and may be, for example, air drying, oven drying, pneumatic drying, flash drying. Preferably, the drying conditions may include a temperature of 50-150° C. and a time of 0.5-4 h. The washing may be performed by conventional means, for example by washing with water, and water can be one or more selected from the group consisting of deionized water, distilled water and decationized water, the weight ratio of the core-shell molecular sieve to water can be, for example, 1:5-20, and the washing can be carried out for one or more times until the pH value of water after washing is 8-9. The calcining conditions can include, for example, a calcining temperature of 400-600° C., and a calcining time of 2-10 h.

In a preferred embodiment of the method for the synthesis of the ZSM-5/β core-shell molecular sieve of the present application, the resulting ZSM-5/β core-shell molecular sieve has a core of ZSM-5 molecular sieve and a shell of β molecular sieve, and the silica-alumina ratio of the shell molecular sieve is 10 to 500, for example 25 to 200, calculated as $SiO_2/Al_2O_3$.

In a particularly preferred embodiment, the method for the synthesis of the ZSM-5/β core-shell molecular sieve of the present application comprises the steps of:

1) adding a ZSM-5 molecular sieve into a surfactant solution with a concentration of 0.05-50 wt %, and stirring for 0.5-48 h for treatment, wherein the weight ratio of the surfactant to the ZSM-5 molecular sieve is preferably 0.02-0.5:1, filtering and drying to obtain a ZSM-5 molecular sieve material I, wherein the ZSM-5 molecular sieve has a silica-alumina molar ratio calculated as $SiO_2/Al_2O_3$ of preferably 20 to ∞, such as 50 to ∞;

2) adding the ZSM-5 molecular sieve material I into the slurry comprising β molecular sieve, wherein the content of the β molecular sieve in the slurry is 0.2-8 wt %, and the weight ratio on a dry basis of the β molecular sieve to the ZSM-5 molecular sieve material I is preferably 0.03-0.30:1, stirring for at least 0.5 h, such as 0.5-24 h, then filtering and drying to obtain a ZSM-5 molecular sieve material II, 3) mixing a silicon source, an aluminum source, an optional alkali source, a template (represented by R) and water to form a mixed solution, and stirring the mixed solution at 50-300° C. for 4-100 h, preferably at 75-250° C. for 10-80 h to obtain the pre-crystallized synthesis liquid III; wherein the molar ratios are $R/SiO_2=0.1-10:1$, $H_2O/SiO_2=2-150:1$, $SiO_2/Al_2O_3=10-800:1$, $Na_2O/SiO_2=0-2:1$; the silicon source is, for example, selected from the group consisting of tetraethoxysilane, water glass, coarse silica gel, silica sol, silica white, activated clay or a combination thereof; the aluminum source is, for example, selected from the group consisting of aluminum sulfate, aluminum isopropoxide, aluminum nitrate, aluminum sol, sodium metaaluminate, γ-alumina, or a combination thereof, the alkali source is, for example, selected from the group consisting of sodium hydroxide, potassium hydroxide, or a combination thereof, the templating agent is, for example, one or more selected from the group consisting of tetraethylammonium fluoride, tetraethylammonium hydroxide, tetraethylammonium chloride, tetraethylammonium bromide, triethanolamine, or sodium carboxymethylcellulose; and 4) adding the ZSM-5 molecular sieve material II into the pre-crystallized synthesis liquid III, crystallizing for 10-400 h at 50-300° C., preferably, adding the ZSM-5 molecular sieve material II into the pre-crystallized synthesis liquid III, crystallizing for 30-350 h at 100-250° C., filtering, washing and drying after the completion of crystallization to obtain the ZSM-5/β core-shell molecular sieve; preferably, the silicon source and the aluminum source are used in such an amount that the resulting shell β molecular sieve has a silica-alumina molar ratio of 25-200 calculated as $SiO_2/Al_2O_3$.

Optionally, the method for the synthesis of the ZSM-5/β core-shell molecular sieve of the present application may further comprise: 5) subjecting the core-shell molecular sieve (namely, the sodium-type core-shell molecular sieve) obtained in step 4) to ammonium exchange, to reduce the content of $Na_2O$ in the core-shell molecular sieve to a level of less than 0.15 wt %; and 6) drying the core-shell molecular sieve obtained in step 5), and calcining at 400-600° C. for 2-h to remove the template, to obtain a hydrogen-type core-shell molecular sieve.

Preferably, the ammonium exchange described in step 5) comprises conducting the exchange at a weight ratio of the sodium-type core-shell molecular sieve:ammonium salt: $H_2O=1:(0.1-1):(5-15)$ at 50-100° C., and filtering, which process may be carried out one or more times; and the ammonium salt is one or more selected from the group consisting of ammonium chloride, ammonium sulfate and ammonium nitrate.

The present application also provides a ZSM-5/β core-shell molecular sieve material obtained by the method for the synthesis of the ZSM-5/β core-shell molecular sieve.

The present application also provides use of the ZSM-5/β core-shell molecular sieve or the ZSM-5/β core-shell molecular sieve obtained by the method of the present application in catalytic cracking or deep catalytic cracking of hydrocarbon oils. The ZSM-5/β core-shell molecular sieve can be used as a part or all of the active component for preparing a catalytic cracking catalyst, and then used for catalytic cracking or deep catalytic cracking of hydrocarbon oils, to improve the propylene yield and/or the ethylene yield of the resulting reaction product.

Catalyst Comprising ZSM-5/β Core-Shell Molecular Sieve

As indicated above, in a third aspect, the present application provides a catalyst comprising, on a dry basis and based on the weight of the catalyst, from 30 wt % to 90 wt % of a carrier, from 2 wt % to 50 wt % of the ZSM-5/β core-shell molecular sieve according to the present application, and from 0 wt % to 50 wt % of an additional molecular sieve.

In a preferred embodiment, the carrier may comprise one or more selected from the group consisting of clay, alumina carrier, silica carrier, silica-alumina carrier, aluminum phosphate gel/sol, and zirconia gel/sol.

According to the present application, the clay may be one or more selected from the group consisting of natural clays such as kaolin, montmorillonite, diatomite, halloysite, pseudohalloysite, saponite, rectorite, sepiolite, attapulgite, hydrotalcite, bentonite, and the like. According to the present application, the alumina carrier can be one or more selected from the group consisting of acidified pseudoboehmite, alumina sol, hydrated alumina and activated alumina. The hydrated alumina may be, for example, one or more selected from the group consisting of pseudo-boehmite (not acidified), boehmite, gibbsite, bayerite, nordstrandite, amorphous aluminum hydroxide. The activated alumina may be, for example, one or more selected from the group consisting of γ-alumina, η-alumina, χ-alumina, δ-alumina, θ-alumina, and κ-alumina.

According to the present application, the acidified pseudo-boehmite can be obtained by acidifying a pseudo-boehmite, wherein the acidification may be carried out in a manner well known to those skilled in the art, for example by slurrying the pseudo-boehmite with water to form a slurry, then adding an acid and stirring at 50-85° C. for 0.2-1.5 hours, wherein the molar ratio of the acid to the pseudo-boehmite, calculated as alumina, is, for example, 0.10-0.25.

According to the present application, the silica carrier may be, for example, one or more selected from the group consisting of silica sol, silica gel, and solid silica gel. The silica sol may be, for example, one or more selected from the group consisting of neutral silica sol, acidic silica sol, and basic silica sol.

According to the present application, the silica-alumina carrier may be, for example, one or more selected from the group consisting of silica-alumina material, silica-alumina sol, and silica-alumina gel.

According to the present application, the aluminum phosphate gel/sol can be, for example, aluminum phosphate sol, aluminum phosphate gel.

According to the present application, the zirconia gel/sol may be, for example, zirconia sol, zirconium gel.

In a preferred embodiment, the ZSM-5/β core-shell molecular sieve has a sodium content, calculated as $Na_2O$, of no more than 0.15 wt %.

According to this embodiment, a core-shell molecular sieve with reduced sodium oxide content can be obtained by ammonium exchange. The ammonium exchange may be carried by a known method, and for example, the ammonium exchange may be performed at a weight ratio of the sodium-type core-shell molecular sieve:ammonium salt: $H_2O=1:(0.1-1):(5-15)$ at 50-100° C., followed by filtering, which may be carried out one or more times; and the ammonium salt may be one or more selected from the group consisting of ammonium chloride, ammonium sulfate and ammonium nitrate.

According to the present application, the additional molecular sieve may be any of a variety of molecular sieves conventionally used in the preparation of catalytic cracking catalysts. In a preferred embodiment, the additional molecular sieve may be selected from the group consisting of Y molecular sieves and molecular sieves having a pore opening diameter of 0.65 to 0.70 nanometers, or a combination thereof.

In a further preferred embodiment, the Y molecular sieve is a rare earth-free Y molecular sieve or a low rare earth-containing Y molecular sieve having a rare earth content of less than 5 wt % calculated as $RE_2O_3$, and the Y molecular sieve has a silica-alumina ratio ($SiO_2/Al_2O_3$ mole ratio), for example, of 4 to 18 or 4.5 to 15. The Y molecular sieve is one or more selected from the group consisting of DASY molecular sieve, rare earth-containing DASY molecular sieve, HRY molecular sieve, rare earth-containing HRY molecular sieve, DOSY molecular sieve, USY molecular sieve, rare earth-containing USY molecular sieve, HY molecular sieve and REHY molecular sieve, and is preferably one or more selected from the group consisting of HY molecular sieve, DASY molecular sieve and USY molecular sieve.

In a further preferred embodiment, the molecular sieve having a pore opening diameter of 0.65 to 0.70 nanometers is one or more selected from the group consisting of molecular sieves having an AET, AFR, AFS, AFI, BEA, BOG, CFI, CON, GME, IFR, ISV, LTL, MEI, MOR, OFF or SAO structure; preferably selected from the group consisting of Beta, SAPO-5, SAPO-40, SSZ-13, CIT-1, ITQ-7, ZSM-18, mordenite, gmelinite, or a combination thereof, more preferably β molecular sieve, which may be, for example, a hydrogen-type β molecular sieve.

First Type of Embodiments

The first type of embodiments of the catalyst according to the present application is a hydrogenated VGO catalytic cracking catalyst comprising a carrier comprising a silica sol and a modifying element, and the core-shell molecular sieve according to the present application, wherein the content of the carrier is from 50 wt % to 90 wt %, preferably from 55 wt % to 75 wt % or from 60 wt % to 85 wt %, on a dry basis, and the content of the core-shell molecular sieve is from 10 wt % to 50 wt %, preferably from 20 wt % to 45 wt % or from 15 wt % to 40 wt %, on a dry basis, and the content of the silica sol is from 1 wt % to 15 wt %, for example from 5 wt % to 15 wt %, on a dry basis, and the content of the modifying element compound is from 0.1 wt % to 12 wt %, for example from 0.5 wt % to 10 wt %.

In the first type of embodiments of the catalyst of the present application, preferably, at least a portion of the modifying element is present in the silica sol, more preferably, all of the modifying element is present in the silica sol, and the modifying element is a rare earth element. Rare earth element-containing silica sol, herein referred to as modified silica sol, preferably has a weight ratio of rare earth calculated as $RE_2O_3$ to silica sol calculated as $SiO_2$ of 0.2 to 18:100 preferably 1 to 18:100.

In the first type of embodiments of the catalyst according to the present application, preferably, the carrier further comprises one or more selected from the group consisting of pseudo-boehmite, alumina sol, and clay. Further preferably, the catalyst comprises 1-15 wt % of silica sol, 5-25 wt % of pseudo-boehmite, 3-20 wt % of alumina sol and 25-50 wt % of clay on a dry basis. The rare earth oxide content of the carrier is greater than 0-15 wt %, e.g., 0.1-15 wt %, 1-15 wt %, 0.5-5 wt %, or 0.2-10 wt %, based on the dry weight of the carrier, calculated as $RE_2O_3$.

The hydrogenated VGO catalytic cracking catalyst according to the first type of embodiments of the catalyst of the present application shows higher heavy oil yield and higher ethylene and propylene yields when used for the catalytic conversion of hydrogenated VGO.

The catalysts of the first type of embodiments of the present application may be prepared by a method comprising the steps of: forming a first slurry comprising a silica sol, a modifying element compound, and the core-shell molecular sieve according to the present application, and spray drying, wherein the modifying element is a rare earth element.

Preferably, the method for preparing the catalyst of the first type of embodiments comprises the steps of:

i) preparing a sodium-type core-shell molecular sieve according to the method for the synthesis of the ZSM-5/β core-shell molecular sieve of the present application;

ii) subjecting the sodium-type core-shell molecular sieve obtained in step i) to ammonium exchange to reduce the $Na_2O$ content in the core-shell molecular sieve to a level of less than 0.15 wt %;

iii) drying the core-shell molecular sieve obtained in step ii), and calcining at 400-600° C. for 2-10 h to obtain a hydrogen-type core-shell molecular sieve; and iv) forming a first slurry comprising a rare earth salt, a silica sol and the hydrogen-type core-shell molecular sieve obtained in step iii) and spray drying to obtain the catalyst.

Further preferably, said ammonium exchange in step ii) comprises conducting the exchange at a weight ratio of the sodium-type core-shell molecular sieve:ammonium salt: $H_2O=1:(0.1-1):(5-15)$ at 50-100° C., and filtering, which process may be carried out one or more times; and the ammonium salt may be one or more selected from the group consisting of ammonium chloride, ammonium sulfate and ammonium nitrate.

In the first type of embodiments of the present application, the core-shell molecular sieve obtained in step ii) is dried and then calcined in step iii) to remove the template, so as to obtain a core-shell molecular sieve with reduced Na content (i.e., hydrogen-type core-shell molecular sieve).

In the first type of embodiments of the present application, the carrier may preferably comprise a carrier conventionally used in catalytic cracking catalysts in addition to the silica sol and the modifying element, and the present application has no particular limitation thereto. For example, the carrier may further comprise a natural clay/alumina carrier, a natural clay/alumina/silica carrier (a silica carrier other than the silica sol), and the alumina carrier may be, for example, an alumina sol and/or pseudo-boehmite. Preferably, the silica sol is added in an amount such that the silica sol content in the resulting catalyst is from 1 wt % to 15 wt %, on a dry basis.

Further preferably, the first slurry in step iv) comprises silica sol, the modifying element compound, and optionally one or more selected from the group consisting of clay, aluminum sol, and pseudo-boehmite. Particularly preferably, the pseudo-boehmite is acidified by acid and then mixed with silica sol, aluminum sol, the modifying element compound and clay and slurried to obtain the first slurry.

Further preferably, in step iv) the modifying element compound is first mixed with the silica sol to form a modified silica sol, which is then introduced into said first slurry. The modifying element compound is, for example, a rare earth salt. Preferably, the rare earth salt is first added into the silica sol to obtain a rare earth modified silica sol, and then mixed with other materials, such as the core-shell molecular sieve, other carriers and water, and slurried. More preferably, the core-shell molecular sieve is first mixed with the modified silica sol to form a second slurry, which is then mixed with other carriers, such as acidified pseudo-boehmite, alumina sol, clay, and optionally water to form the first slurry.

In the first type of embodiments of the present application, preferably, the rare earth element comprises lanthanum and/or cerium, wherein the amount of lanthanum and/or cerium is more than 50 wt % of the total amount of the rare earth. The rare earth salt may be a rare earth chloride and/or a rare earth nitrate.

In the first type of embodiments of the present application, preferably, the silica sol may be one or more selected from the group consisting of neutral silica sol, acidic silica sol, and basic silica sol.

In the first type of embodiments of the present application, the rare earth salt is preferably used in an amount such that the content of rare earth oxide in the carrier is 1 wt % to 15 wt % calculated as $RE_2O_3$.

In the first type of embodiments of the present application, preferably, the solid content of the first slurry obtained in step iv) is typically in a range of 10 wt % to 50 wt %, preferably 15 wt % to 30 wt %.

In the first type of embodiments of the present application, the conditions for spray drying in step iv) may be those commonly used in the preparation of catalytic cracking catalysts. Typically, the spray drying temperature is 100-350° C., preferably 200-300° C.

In the first type of embodiments of the present application, preferably, the catalyst obtained by spray drying may also be subjected to exchanging and washing, and may be subjected to exchange with an ammonium salt solution and washing. For example, the exchanging and washing may be performed at a weight ratio of the catalyst:ammonium salt: $H_2O=1:(0.01-1):(5-15)$ at 50-100° C., and filtering, which process may be carried out one or more times; and the ammonium salt may be one or more selected from the group consisting of ammonium chloride, ammonium sulfate, and ammonium nitrate. Preferably, the exchanging and washing results in a catalyst having a Na$_2$O content of less than 0.15 wt %. The exchange-washed catalyst may be dried.

In the first type of embodiments of the present application, preferably, the method for preparing the catalyst may further comprise a calcination step after step iv), and the calcination may be performed before the exchanging and washing and/or after the exchanging and washing. The calcination can be carried out by a conventional calcination method, for example, the calcination temperature may be 400-650° C., and the calcination time may be 2-10 hours, and in one embodiment, the calcination may be carried out for 2-6 hours at 450-580° C.

In the first type of embodiments of the present application, preferably, the step iv) further comprises: A) preparing a rare earth modified carrier; the rare earth may be in the whole carrier or in a part of the carrier, such as in one or more selected from the group consisting of silica sol, clay, pseudo-boehmite or aluminum sol; for example, the rare earth may be introduced by isovolumetric impregnation to modify part of the carrier, such as clay, and after drying, the carrier is calcined for 0.5 to 5 hours at a temperature of 350-600° C., a rare earth salt may be added to silica sol, alumina sol or a pseudo-boehmite slurry to obtain a modified silica sol, a modified alumina sol or a modified pseudo-boehmite, and then added to the first slurry; preferably, the rare earth salt is added to the silica sol; and B) mixing the rare earth modified carrier and optionally a carrier not modified by the modifying element with the core-shell molecular sieve and water, slurrying, and spray drying.

In the first type of embodiments of the present application, it is particularly preferred that the step iv) further comprises:

a) slurrying pseudo-boehmite with water to form a slurry, adding an acid such as hydrochloric acid or nitric acid, and aging;

b) mixing silica sol with rare earth salt to obtain a modified silica sol;

c) mixing the modified silica sol, the core-shell molecular sieve, the aged pseudo-boehmite, alumina sol, clay and water, and slurrying to obtain the first slurry; preferably, the core-shell molecular sieve is mixed with the modified silica sol first, and then the mixture is mixed with the aged pseudo-boehmite, alumina sol, clay and optionally water; and d) spray drying the first slurry to obtain catalyst microspheres.

Further preferably, the method for preparing the catalyst further comprises: v) calcining the catalyst obtained in step iv) at a temperature of 450-580° C. for 2-6 h; and vi) subjecting the calcined catalyst to ammonium exchange and washing, to reduce the Na$_2$O content in the catalyst to a level of less than 0.15 wt %.

In the first type of embodiments, the present application further provides a catalyst prepared according to the method for preparing the catalyst.

When the catalyst according to the first type of embodiments of the present application is used for catalytic cracking of hydrogenated VGO, more heavy oil can be produced, and the yield of ethylene and the yield of propylene can be improved, preferably C3$^=$/C3$^0$>8, as compared with existing catalysts.

Second Type of Embodiments

The second type of embodiments of the catalyst according to the present application is a catalyst for catalytic cracking of hydrogenated LCO to produce light olefins, the catalyst comprising, on a dry basis, from 50 wt % to 85 wt % of a carrier, from 10 wt % to 35 wt %, preferably from 10 wt % to 25 wt %, of the core-shell molecular sieve according to the present application, and from 5 wt % to 15 wt %, preferably from 8 wt % to 12 wt %, of a molecular sieve having a pore opening diameter in a range of from 0.65 to 0.70 nm (also referred to as a second molecular sieve).

According to the second type of embodiments of the catalyst of the present application, the carrier in the catalyst may be a carrier conventionally used in catalytic cracking catalysts, for example, the carrier may comprise one or more selected from the group consisting of clay, alumina carrier, silica carrier, silica-alumina carrier, and aluminum phosphate gel/sol; optionally, the carrier may comprise additives such as phosphorus oxides, alkaline earth metal oxides. Preferably, the carrier is a clay and alumina carrier, or a clay, alumina and silica carrier. Preferably, the carrier comprises a silica carrier. The silica carrier is, for example, a solid silica gel carrier and/or a silica sol carrier, and more preferably a silica sol carrier. Further preferably, the silica carrier content of the catalyst is 0-15 wt %, such as 1-15 wt % or 10-15 wt % or 5-15 wt %, calculated as SiO$_2$.

In the second type of embodiments of the catalyst according to the present application, the catalyst preferably comprises, on a dry basis, 15 wt % to 40 wt % of the core-shell molecular sieve, 35 wt % to 50 wt % of clay, 10 wt % to 30 wt % of acidified pseudo-boehmite (refer to as boehmite for short), 5 wt % to 15 wt % of alumina sol and 0 wt % to 15 wt %, for example 5 wt % to 15 wt % of silica sol.

The catalyst of the second type of embodiments of the present application may be prepared by a method comprising the steps of: forming a first slurry comprising the core-shell molecular sieve according to the present application, a second molecular sieve, a carrier and water, and spray drying, wherein the second molecular sieve is a molecular sieve having a pore opening diameter of 0.65 to 0.70 nanometers.

Preferably, when the core-shell molecular sieve is a sodium-type core-shell molecular sieve, the core-shell molecular sieve may be subjected to ammonium exchange first, and then slurried with the second molecular sieve, the carrier and water.

Preferably, the method for preparing the catalyst of the second type of embodiments comprises the following steps:

i) preparing a sodium-type core-shell molecular sieve according to the method for the synthesis of the ZSM-5/β core-shell molecular sieve of the present application;

ii) subjecting the resulting sodium-type core-shell molecular sieve to ammonium exchange to reduce the Na$_2$O content in the core-shell molecular sieve to a level of less than 0.15 wt %;

iii) drying the core-shell molecular sieve obtained in step ii), and calcining at 400-600° C. for 2-10 h to obtain a hydrogen-type core-shell molecular sieve; and iv) slurrying the hydrogen-type core-shell molecular sieve obtained in step iii), a molecular sieve with a pore opening diameter of 0.65-0.70 nanometers, a carrier and water to obtain the first slurry, spray drying and optionally calcining to obtain the catalyst.

Further preferably, the ammonium exchange in step ii) comprises: contacting the core-shell molecular sieve with an ammonium salt solution at 50-100° C. for exchanging at a weight ratio of the sodium-type core-shell molecular sieve: ammonium salt:H$_2$O=1:(0.1-1):(5-15), and then filtering, wherein the ammonium exchange process is carried out one or more than two times; and the ammonium salt is one or more selected from the group consisting of ammonium chloride, ammonium sulfate and ammonium nitrate.

In the second type of embodiments according to the present application, the carrier may be a carrier commonly used in catalytic cracking catalysts. Preferably, the carrier comprises one or more selected from the group consisting of clay, alumina carrier, silica carrier, aluminum phosphate gel/sol and silica-alumina carrier. In the slurry comprising the core-shell molecular sieve and the carrier, the weight ratio, on a dry basis, of the core-shell molecular sieve to the carrier is 15-50: 50-85, for example 25-45: 55-75. The slurry comprising the core-shell molecular sieve and the carrier typically has a solid content of 10 wt % to 50 wt %, preferably 15 wt % to 30 wt %.

In the second type of embodiments of the present application, preferably, the carrier comprises clay and a carrier with binding function. The carrier with binding function can be one or more selected from the group consisting of silica carrier, such as silica sol, alumina carrier, such as alumina sol and/or acidified pseudo-boehmite, and aluminum phosphate gel/sol. Further preferably, the carrier with binding function comprises one or more selected from the group consisting of acidified pseudo-boehmite, aluminum sol and silica sol. For example, the carrier with binding function may comprise alumina sol and/or acidified pseudo-boehmite; or the carrier with binding function comprises silica sol, optionally aluminum sol and/or acidified pseudo-boehmite; the silica sol is added in an amount such that the silica content (calculated as $SiO_2$) derived from the silica sol in the resulting catalyst is 1 wt % to 15 wt %.

In the second type of embodiments of the present application, preferably, in the first slurry comprising the core-shell molecular sieve, the second molecular sieve and the carrier, the weight ratio, on a dry basis, of the core-shell molecular sieve:the second molecular sieve:clay:aluminum sol:acidified pseudo-boehmite:silica sol is (15-40):(5-15):(35-50):(5-15):(10-30):(0-15).

In the second type of embodiments according to the present application, preferably, the second molecular sieve, i.e. the molecular sieve having a pore opening diameter of 0.65-0.70 nm, is selected from the group consisting of molecular sieves having an AET, AFR, AFS, AFI, BEA, BOG, CFI, CON, GME, IFR, ISV, LTL, MEI, MOR, OFF or SAO structure or a combination thereof, preferably selected from the group consisting of Beta, SAPO-5, SAPO-40, SSZ-13, CIT-1, ITQ-7, ZSM-18, mordenite, gmelinite, or a combination thereof. Further preferably, the second molecular sieve is a β molecular sieve, preferably an HP molecular sieve, with a preferred silica-alumina ratio ($SiO_2/Al_2O_3$ molar ratio) of 10 to 500.

In the second type of embodiments of the present application, preferably, the slurry comprising the core-shell molecular sieve, the second molecular sieve, the carrier and water may further comprise an additive. The additive may be added to a part of the carrier, or to the whole carrier, or may be added to or the first slurry formed by the core-shell molecular sieve, the second molecular sieve, the carrier and water. The additive is, for example, a phosphorus oxide additive, a metal oxide additive; the metal oxide additive is, for example, one or more selected from the group consisting of alkaline earth metal oxides or a precursor thereof.

In the second type of embodiments of the present application, preferably, step iv) comprises: mixing and slurrying the core-shell molecular sieve, the second molecular sieve, clay, a silica binder and/or alumina binder, optionally an inorganic oxide matrix and water to form a slurry, wherein the solid content of the resulting slurry is typically 10-50 wt %, and preferably 15-30 wt %; and then spray drying, optionally calcining, to obtain the catalyst. The spray drying conditions may be those commonly used in the preparation of catalytic cracking catalysts.

Typically, the spray drying temperature may be from 100° C. to 350° C., preferably from 150° C. to 300° C., for example from 200° C. to 300° C. When the carrier comprises an additive, said additive may be added to the slurry before drying or may be introduced after drying, for example by impregnation. The calcining condition include: a calcination temperature of, for example, 550° C., and a calcination time of, for example, 6 h.

In the second type of embodiments of the present application, a step of ion exchange may also be performed after the spray drying of step iv). Preferably, the exchange is performed such that the resulting catalytic cracking catalyst has a sodium oxide content of no more than 0.15 wt %. The exchange may be carried out using an ammonium salt solution. For example, the ammonium exchange may be performed by contacting the catalyst with the ammonium salt solution at a weight ratio of the catalyst:ammonium salt:$H_2O$=1:(0.1-1):(5-15) at 50-100° C., and filtering, which process may be performed one or more times, for example, at least two times; and the ammonium salt can be one or more selected from the group consisting of ammonium chloride, ammonium sulfate and ammonium nitrate. Optionally, a washing step is further comprised to wash off sodium ions exchanged out from the catalyst, and the catalyst may be washed with water, for example, decationized water, distilled water or deionized water.

In a second embodiment of the present application, a calcination step may be performed after the spray drying of step iv), which may be performed before or after the ion exchange described above. The calcining can be performed by existing calcining methods, and preferably, the calcining temperature is 400-600° C., and the calcining time is 2-6 hours.

In the second type of embodiments, the present application further provides a catalyst obtained by the method for preparing the catalyst.

The catalyst according to the second type of embodiments of the application shows excellent hydrogenated LCO cracking capability and higher yield of light olefins, and can provide higher conversion rate and higher yield of light olefins when used for hydrogenated LCO conversion.

Third Type of Embodiments

The third type of embodiments of the catalyst according to the present application is a catalytic cracking catalyst comprising, on a dry basis and based on the weight of the composition, from 30 wt % to 83 wt %, preferably from 55 wt % to 75 wt %, of a carrier, from 2 wt % to 20 wt %, preferably from 8 wt % to 15 wt %, of the ZSM-5/β core-shell molecular sieve according to the present application, and from 15 wt % to 50 wt %, preferably from 25 wt % to 35 wt %, of a Y molecular sieve.

In the third type of embodiments of the catalyst of the present application, preferably, the carrier may be one or more selected from the group consisting of clay, silica carrier and alumina carrier. Further preferably, the carrier comprises one or more selected from the group consisting of aluminum sol, pseudo-boehmite, silica sol and clay.

In the third type of embodiments of the catalyst of the present application, preferably, the catalyst comprises a silica sol carrier in an amount of 1 wt % to 15 wt %, for example 5 wt % to 15 wt %, calculated as $SiO_2$, and an additional carrier comprising one or more selected from the group consisting of alumina sol, pseudo-boehmite, and clay.

In the third type of embodiments of the catalyst of the present application, the Y molecular sieve may or may not comprise rare earth elements and phosphorus. The content of rare earth in the Y molecular sieve is 0-25 wt % calculated as $RE_2O_3$, and the content of phosphorus can be 0-10 wt % calculated as $P_2O_5$. The Y molecular sieve may be, for example, one or more selected from the group consisting of HY molecular sieve, REY molecular sieve, REHY molecular sieve, DASY molecular sieve, rare earth-containing DASY molecular sieve, USY molecular sieve, rare earth-containing USY molecular sieve, phosphorus and rare earth-containing DASY molecular sieve, phosphorus and rare earth-containing USY molecular sieve, PSRY molecular sieve, rare earth-containing HRY molecular sieve, and HRY molecular sieve.

The catalyst according to the third type of embodiments of the present application can be used for producing light olefins by heavy oil conversion, and can achieve a higher heavy oil conversion rate, a higher ethylene, propylene and butylene yield, and a higher liquefied gas yield. The catalyst of the third type of embodiments of the present application may be prepared by a method comprising the steps of: forming the first slurry comprising the core-shell molecular sieve according to the present application, a Y molecular sieve, the carrier, and water, and spray drying.

Preferably, the method for preparing the catalyst of the third type of embodiments comprises the following steps:

i) preparing a sodium-type core-shell molecular sieve according to the method for the synthesis of the ZSM-5/β core-shell molecular sieve of the present application;

ii) subjecting the sodium-type core-shell molecular sieve obtained in step i) to ammonium exchange to reduce the $Na_2O$ content in the core-shell molecular sieve to a level of less than 0.15 wt %;

iii) drying the core-shell molecular sieve obtained in step ii), and calcining at 400-600° C. for 2-10 h to obtain a hydrogen-type core-shell molecular sieve; and iv) forming a first slurry comprising the hydrogen-type core-shell molecular sieve obtained in step iii), a Y molecular sieve, a carrier and water, and spray drying to obtain the catalyst.

Further preferably, the ammonium exchange in step ii) comprises: conducting the exchange at a weight ratio of the core-shell molecular sieve:ammonium salt:$H_2O$=1:(0.1-1):(5-15) at 50-100° C., and filtering, which process may be carried out one or more times; and the ammonium salt is, for example, one or more selected from the group consisting of ammonium chloride, ammonium sulfate and ammonium nitrate.

Further preferably, the first slurry formed in step iv) typically has a solid content in a range of from 10 wt % to 50 wt %, preferably in a range of from 15 wt % to 30 wt %.

In the third type of embodiments of the present application, the spray drying in step iv) may be carried out by conventional spray drying methods under the conditions commonly used in the preparation of catalytic cracking catalysts. Typically, the spray drying temperature is 100-350° C., preferably 200-300° C.

In the third type of embodiments of the present application, the spray drying of step iv) produces microspheroidal particles which may be used directly as a catalytic cracking catalyst or may be further subjected to exchange, washing and drying. For example, the exchanging and washing may be performed with an ammonium salt solution. Preferably, the exchanging and washing is performed at a weight ratio of the catalyst:ammonium salt:$H_2O$=1:(0.01-1):(5-15) at 50-100° C., and filtering, which process may be carried out one or more times; and the ammonium salt may be one or more selected from the group consisting of ammonium chloride, ammonium sulfate and ammonium nitrate. Preferably, the exchanging and washing is performed to reduce the $Na_2O$ content of the catalytic cracking catalyst to a level of less than 0.15 wt %. The exchange-washed catalyst may be dried.

In the third type of embodiments of the present application, a calcination step may optionally be performed after the spray drying of step iv), which may be carried out before and/or after the exchanging and washing. The calcination may be carried out by a conventional calcination method, for example, the calcination temperature is 400-600° C. and the calcination time is 2-10 hours, for example, 2-4 hours, preferably, the calcination is performed at 580° C. for 2-6 hours. In the third type of embodiments, the present application further provides a catalyst obtained by the method for preparing the catalyst.

Fourth Type of Embodiments

The fourth type of embodiments of the catalyst according to the present application is a catalytic cracking catalyst for intermediate base crude oil, comprising, on a dry basis, 50 wt % to 79 wt % of a carrier, 15 wt % to 35 wt % of the ZSM-5/β core-shell molecular sieve according to the present application, 5 wt % to 10 wt % of a Y molecular sieve, 1 wt % to 5 wt % of a molecular sieve having a pore opening diameter of 0.65 to 0.70 nm.

In the fourth type of embodiments of the catalyst of the present application, preferably, the Y molecular sieve is a rare earth-free Y molecular sieve or a low rare earth-containing Y molecular sieve, the content of rare earth in the low rare earth-containing Y molecular sieve is less than 5 wt % calculated as $RE_2O_3$, and the silica-alumina ratio ($SiO_2$/$Al_2O_3$ mol ratio) of the Y molecular sieve is, for example, 4 to 18 or 4.5 to 15. The Y molecular sieve is one or more selected from the group consisting of DASY molecular sieve, rare earth-containing DASY molecular sieve, HRY molecular sieve, rare earth-containing HRY molecular sieve, DOSY molecular sieve, USY molecular sieve, rare earth-containing USY molecular sieve, HY molecular sieve and REHY molecular sieve, and is preferably one or more selected from the group consisting of HY molecular sieve, DASY molecular sieve and USY molecular sieve.

In the fourth type of embodiments of the catalyst of the present application, the molecular sieve having a pore opening diameter of 0.65 to 0.70 nanometers may be, for example, one or more selected from the group consisting of molecular sieves having an AET, AFR, AFS, AFI, BEA, BOG, CFI, CON, GME, IFR, ISV, LTL, MEI, MOR, OFF, or SAO structure; preferably selected from the group consisting of Beta, SAPO-5, SAPO-40, SSZ-13, CIT-1, ITQ-7, ZSM-18, mordenite, gmelinite, or a combination thereof, more preferably a β molecular sieve, which may be, for example, a hydrogen-type β molecular sieve.

In the fourth type of embodiments of the catalyst of the present application, the carrier may be a carrier conventionally used in catalytic cracking catalysts, and for example, may be one or more selected from the group consisting of aluminum sol carrier, zirconia gel/sol carrier, pseudo-boehmite carrier, silica sol, and clay carrier.

In the fourth type of embodiments of the catalyst of the present application, preferably, the catalyst comprises, on a dry basis and based on the weight of the catalyst, 50-79 wt %, preferably 55-75 wt %, of the carrier, 15-35 wt %, preferably 20-30 wt %, of the core-shell molecular sieve; 5-10 wt % of Y molecular sieve and 1-5 wt % of a molecular sieve having a pore opening diameter of 0.65-0.70 nm.

The catalyst according to the fourth type of embodiments of the application is richer in pore structure, and has more excellent intermediate base crude oil cracking capability and higher light olefin yield.

The catalyst of the fourth type of embodiments of the present application may be prepared by a method comprising the steps of: forming a first slurry comprising the core-shell molecular sieve according to the present application, a Y molecular sieve, a molecular sieve having a pore opening diameter of 0.65 to 0.70 nanometers, a carrier, and water, and spray drying.

Preferably, the method for preparing the catalyst of the fourth type of embodiments comprises the following steps:

i) preparing a sodium-type core-shell molecular sieve according to the method for the synthesis of the ZSM-5/β core-shell molecular sieve of the present application;

ii) subjecting the sodium-type core-shell molecular sieve obtained in step i) to ammonium exchange to reduce the $Na_2O$ content in the core-shell molecular sieve to a level of less than 0.15 wt %;

iii) drying the core-shell molecular sieve obtained in step ii), and calcining at 350-600° C. for 2-6 h, to obtain a hydrogen-type core-shell molecular sieve; and iv) forming a first slurry comprising the hydrogen-type core-shell molecular sieve obtained in step iii), the Y molecular sieve, the molecular sieve having a pore opening diameter of 0.65-0.70 nm, the carrier and water, and spray drying, to obtain the catalyst.

In the fourth type of embodiments of the present application, the carrier in step iv) may be one or more selected from the group consisting of clay, alumina carrier and silica carrier. The alumina carrier is one or more selected from the group consisting of pseudo-boehmite and alumina sol, wherein the pseudo-boehmite is preferably mixed with other components after being acidified. Preferably, the silica carrier is one or more selected from the group consisting of neutral silica sol, acidic silica sol or basic silica sol; preferably, the silica sol content of the catalyst is 1-15 wt % calculated as $SiO_2$.

In the fourth type of embodiments of the present application, preferably, the first slurry formed in step iv) typically has a solid content of 10 wt % to 50 wt %, preferably 15 wt % to 30 wt %. In the fourth type of embodiments of the present application, the spray drying conditions in step iv) may be those commonly used in the preparation of catalytic cracking catalysts. Typically, the spray drying temperature is 100-350° C., preferably 200-300° C.

In the fourth type of embodiments of the present application, the spray dried catalyst obtained step iv) may be further subjected to exchanging and washing, for example, to exchanging and washing with an ammonium salt solution. Preferably, the exchanging and washing is performed at a weight ratio of the catalyst:ammonium salt:$H_2O$=1:(0.01-1):(5-15) at 50-100° C., and filtering, which process may be carried out one or more times; and the ammonium salt may be one or more selected from the group consisting of ammonium chloride, ammonium sulfate and ammonium nitrate. Preferably, the exchanging and washing performed to reduce the content of $Na_2O$ in the catalytic cracking catalyst to a level of less than 0.15 wt %. The exchange-washed catalyst may be dried.

In the fourth type of embodiments of the present application, the method for preparing the catalyst may further comprise a calcination step after step iv), which calcination may be carried out before and/or after the exchanging and washing described above. The calcination can be carried out by a conventional calcination method, for example, the calcination temperature is 350-650° C., the calcination time is 1-4 hours, and preferably, the calcination is performed at 400-600° C. for 2-6 hours.

In the fourth type of embodiments of the present application, preferably, the spray drying of step iv) produces catalyst microspheres; the catalyst microsphere can be directly used as a catalytic cracking catalyst.

Optionally, in the fourth type of embodiments of the present application, the method for preparing the catalyst may further comprise:

v) calcining the catalyst microspheres obtained in step iv) at a temperature of 400-600° C. for 2-6 h; and vi) subjecting the calcined catalyst obtained in step v) to ammonium exchange and washing, to reduce the content of $Na_2O$ in the catalyst to a level of less than 0.15 wt %.

In the fourth type of embodiments, the present application further provides a catalyst obtained by the method for preparing the catalyst.

When the catalyst according to the fourth type of embodiments of the present application is used for catalytic cracking of the intermediate base crude oil, the heavy oil cracking capability is stronger, the yield of light olefins is higher, and the yield of liquefied gas is higher.

Process for Catalytic Conversion of Hydrocarbon Oils

As described above, in the fourth aspect, the present application provides a process for catalytic conversion of hydrocarbon oils, comprising the step of contacting a hydrocarbon oil feedstock with a catalyst according to the present application for reaction.

In some preferred embodiments, the process is used for catalytic cracking of hydrogenated VGO, comprising the step of contacting the hydrogenated VGO with a catalyst according to the first type of embodiments of the present application.

Further preferably, the reaction conditions of the process for catalytic cracking of hydrogenated VGO include: a reaction temperature of 500-550° C., preferably 510-540° C., a weight hourly space velocity of 5-30 $h^{-1}$, preferably 8-20 $h^{-1}$, and a catalyst-to-oil ratio of 1-15, preferably 2-12.

The process for catalytic cracking of hydrogenated VGO according to preferred embodiments of the present application can provide a higher yield of fuel oil, a higher production of light olefins, and high yields of ethylene and propylene, as compared to existing processes for conversion of hydrogenated VGO. The performance of the resulting heavy oil can meet the requirements of the standard for low-sulfur marine fuel, and the resulting heavy oil can be used as a low-sulfur heavy marine fuel or a marine fuel blending component. Preferably, $C3^=$ (propene)/$C3^0$ (propane)>8.

In some other preferred embodiments, the process is used for the deep catalytic cracking of hydrogenated LCO, comprising the step of contacting a hydrogenated LCO with a catalyst according to the second type of embodiments of the present application for reaction.

Further preferably, the reaction conditions of the process for catalytic cracking of hydrogenated LCO include: a reaction temperature of 550-620° C., preferably 560-600° C.; a weight hourly space velocity of 5-30 $h^{-1}$, preferably 8-20 $h^{-1}$; and a catalyst-to-oil ratio of 1-15, preferably 2-12.

In some other preferred embodiments, the process is used for catalytic cracking of heavy oils, comprising the step of contacting a heavy oil feedstock with a catalyst according to the third type of embodiments of the present application for reaction under catalytic cracking conditions. Further preferably, the catalytic cracking conditions include: a reaction temperature of 450-600° C., preferably 500-550° C.; a weight hourly space velocity of 5-30 hr$^{-1}$, preferably 8-20 hr$^{-1}$; and a catalyst-to-oil ratio of 1-15, preferably 2-12.

In some other preferred embodiments, the method is used for producing light olefins by catalytic cracking of an intermediate base crude oil, and comprises the step of contacting the intermediate base crude oil with a catalyst according to the fourth type of embodiments of the present application for reaction.

The reaction conditions of the process for producing light olefins by catalytic cracking of the intermediate base crude oil may be those commonly used for catalytic cracking of heavy oil, and preferably, the reaction conditions include: a reaction temperature of 550-620° C., for example 560-600° C., a weight hourly space velocity of 0.5-30 h$^{-1}$, preferably 1-20 h$^{-1}$, and a catalyst-to-oil ratio of 1-15, preferably 2-12.

In some preferred embodiments, the present application provides the following technical solutions:

A1, a ZSM-5/β core-shell molecular sieve, characterized in that, in an X-ray diffraction pattern of the ZSM-5/β core-shell molecular sieve, the ratio of a height of a diffraction peak at 2θ=22.4° to a height of a diffraction peak at 2θ=23.1° is 0.1-10:1.

A2, the ZSM-5/β core-shell molecular sieve of Item A1, wherein the ratio of the height of the diffraction peak at 2θ=22.4° to the height of the diffraction peak at 2θ=23.1° is 0.1-5:1.

A3, the ZSM-5/β core-shell molecular sieve of Item A1, wherein the mass ratio of the core to the shell of the ZSM-5/β core-shell molecular sieve is 0.2-20:1 or 1-15:1.

A4, the ZSM-5/β core-shell molecular sieve of Item A1, wherein the ZSM-5/β core-shell molecular sieve has a total specific surface area of more than 420 m$^2$/g, such as 450-620 or 490-580 m$^2$/g, and the proportion of mesopore surface area to the total surface area is preferably 10-40%, such as 12-35%.

A5, the ZSM-5/β core-shell molecular sieve of Item A1, wherein the shell molecular sieve of the ZSM-5/β core-shell molecular sieve has an average grain size of 10-500 nm, such as 50-500 nm.

A6, the ZSM-5/β core-shell molecular sieve of Item A1, wherein the ZSM-5/β core-shell molecular sieve has a shell thickness of 10-2000 nm, for example 50-2000 nm.

A7, the ZSM-5/β core-shell molecular sieve of Item A1, wherein the ZSM-5/β shell molecular sieve has a silica-alumina molar ratio calculated as SiO$_2$/Al$_2$O$_3$ of 10 to 500, for example 25 to 200.

A8, the ZSM-5/β core-shell molecular sieve of Item A1, wherein the core molecular sieve of the ZSM-5/β core-shell molecular sieve has a silica-alumina ratio, calculated as SiO$_2$/Al$_2$O$_3$, of 10 to ∞, e.g. 30-200.

A9, the ZSM-5/β core-shell molecular sieve of Item A1, wherein the core molecular sieve of the ZSM-5/β core-shell molecular sieve has an average grain size of 0.05-15 μm, preferably 0.1-10 μm.

A10, the ZSM-5/β core-shell molecular sieve of Item A1 or A9, wherein the number of crystal grains in a single particle of the core molecular sieve is not less than 2, and the average particle size of the core molecular sieve is preferably 0.1 to 30 μm.

A11, the ZSM-5/β core-shell molecular sieve of Item A1, wherein the ZSM-5/β core-shell molecular sieve has a shell coverage of 50-100%, such as 80-100%.

A12, the ZSM-5/β core-shell molecular sieve of Item A1, wherein the pore volume of pores with a pore diameter of 2 to 80 nm in the core-shell molecular sieve accounts for 10 to 30% of the total pore volume.

A13, the ZSM-5/β core-shell molecular sieve of Item A1 or A12, wherein the pore volume of pores with a pore diameter of 20-80 nm accounts for 50-70% of the pore volume of pores with a pore diameter of 2-80 nm.

A14, the ZSM-5/β core-shell molecular sieve of any one of Items A1-A13, wherein, in the ZSM-5/β core-shell molecular sieve, the pore volume of pores with a pore diameter of 0.3-0.6 nm accounts for 40-88% of the total pore volume, the pore volume of pores with a pore diameter of 0.7-1.5 nm accounts for 3-20% of the total pore volume, the pore volume of pores with a pore diameter of 2-4 nm accounts for 4-50% of the total pore volume, and the pore volume of pores with a pore diameter of 20-80 nm accounts for 5-40% of the total pore volume.

A15, a method for the synthesis of ZSM-5/β core-shell molecular sieve, comprising the following steps:

(1) contacting a ZSM-5 molecular sieve with a surfactant solution to obtain a ZSM-5 molecular sieve material I;

(2) contacting the ZSM-5 molecular sieve material I with a slurry comprising a β molecular sieve to obtain a ZSM-5 molecular sieve material II;

(3) crystallizing a synthesis liquid comprising a silicon source, an aluminum source, a template and water at 50-300° C. for 4-100 h to obtain a pre-crystallized synthesis liquid III; (4) mixing the ZSM-5 molecular sieve material II with the pre-crystallized synthesis liquid III, and crystallizing.

A16, the method of Item A15, wherein the contacting in step 1) is performed by: adding a ZSM-5 molecular sieve into a surfactant solution with a concentration of 0.05-50 wt % and contacting for at least 0.5 h, filtering and drying, to obtain the ZSM-5 molecular sieve material I.

A17, the method of Item A15 or A16, wherein the contacting in step 1) is conducted for a contact time of 1-36 h at a contact temperature of 20-70° C.

A18, the method of Item A15 or A16, wherein the surfactant solution further comprises a salt, the concentration of the salt in the surfactant solution is 0.05-10.0 wt %; the salt is, for example, selected from the group consisting of sodium chloride, potassium chloride, ammonium chloride, ammonium nitrate or a combination thereof.

A19, the method of any one of Items A15-A18, wherein the weight ratio of the surfactant solution to the ZSM-5 molecular sieve, on a dry basis, in step 1) is 10-200:1.

A20, the method of Item A15, wherein the surfactant is selected from the group consisting of polymethyl methacrylate, polydiallyldimethylammonium chloride, dipicolinate, aqueous ammonia, ethylamine, n-butylamine, tetraethylammonium hydroxide, tetrapropylammonium hydroxide, tetraethylammonium bromide, tetrapropylammonium bromide, tetrabutylammonium hydroxide, or a combination thereof.

A21, the method of Item A15, wherein the ZSM-5 molecular sieve of step 1) is a sodium-type, hydrogen-type or ion-exchanged ZSM-5 molecular sieve.

A22, the method of Item A15 or A16, wherein the ZSM-5 molecular sieve of step 1) has a silica-alumina molar ratio of 10 to ∞, calculated as $SiO_2/Al_2O_3$; for example, the ZSM-5 molecular sieve in step 1) has a silica-alumina molar ratio of 30-200, calculated as $SiO_2/Al_2O_3$.

A23, the method of Item A15, wherein, the ZSM-5 molecular sieve in step 1) has an average grain size of 0.05-20 μm; for example, the ZSM-5 molecular sieve in step 1) has an average grain size of 0.1-10 μm; the ZSM-5 molecular sieve preferably has an average particle size of 0.1-30 μm.

A24, the method of Item A15, wherein the contacting in step 2) comprises: adding the ZSM-5 molecular sieve material I into the slurry comprising the β molecular sieve, stirring for at least 0.5 hour at a temperature of between 20 and 60° C., and then filtering and drying, to obtain the ZSM-5 molecular sieve material II.

A25, the method of Item A15, wherein the concentration of β molecular sieve in the slurry comprising the β molecular sieve of step 2) is 0.1-10 wt %, such as 0.3-8 wt %.

A26, the method of Items A15 or A25, wherein, in step 2), the weight ratio of the slurry comprising β molecular sieve to ZSM-5 molecular sieve material I, on a dry basis, is 10-50:1.

A27, the method of Item A15, wherein, in the slurry comprising β molecular sieve of step 2), the average grain size of the β molecular sieve is 0.01-0.5 μm, such as 0.05-0.5 μm; the average particle size of the β molecular sieve is preferably 0.01 to 0.5 μm.

A28, the method of Item A15, wherein the silica-alumina molar ratio, calculated as $SiO_2/Al_2O_3$, of the β molecular sieve in the slurry comprising the β molecular sieve of step 2) is 10-500.

A29, the method of Item A15, wherein, in step 3), the molar ratio of the silicon source, the aluminum source, the template and water is: $R/SiO_2$=0.1-10:1, e.g. 0.1-3:1, $H_2O/SiO_2$=2-150:1, e.g. 10-120:1, $SiO_2/Al_2O_3$=10-800:1, $Na_2O/SiO_2$=0-2:1, e.g. 0.01-1.7:1, where R represents the template.

A30, the method of Item A15 or A29, wherein, in step 3), the silicon source is selected from the group consisting of tetraethoxysilane, water glass, coarse silica gel, silica sol, silica white, activated clay or a combination thereof; the aluminum source is selected from the group consisting of aluminum sulfate, aluminum isopropoxide, aluminum nitrate, aluminum sol, sodium metaaluminate, γ-alumina or a combination thereof; the template is selected from the group consisting of tetraethylammonium fluoride, tetraethylammonium hydroxide, tetraethylammonium bromide, tetraethylammonium chloride, polyvinyl alcohol, triethanolamine or sodium carboxymethylcellulose, or a combination thereof.

A31, the method of Item A15, wherein, in step 3), the silicon source, the aluminum source, the template and deionized water are mixed to form a synthesis liquid, and then the synthesis liquid is crystallized at 75-250° C. for 10-80 h, to obtain a pre-crystallized synthesis liquid III.

A32, the method of Item A31, wherein for the crystallization in step 3): the crystallization temperature is 80-180° C., and the crystallization time is 18-50 hours.

A33, the method of Item A15 or A32, wherein, XRD analysis of the pre-crystallized synthesis liquid III obtained in step 3) shows a peak at 2θ=22.4° and no peak at 2θ=21.2°.

A34, the method of Item A15, wherein, in step 4), the ZSM-5 molecular sieve material II is mixed with the pre-crystallized synthesis liquid III, and the weight ratio of the pre-crystallized synthesis liquid III to the ZSM-5 molecular sieve material II, on a dry basis, is 2-10:1, such as 4-10:1.

A35, the method of Item A15 or A31 or A32, wherein for the crystallization in step 4): the crystallization temperature is 50-300° C., and the crystallization time is 10-400 h.

A36, the method of Item A15, wherein for the crystallization in step 4): the crystallization temperature is 100-250° C., the crystallization time is 30-350 h; for example, for the crystallization in step 4): the crystallization temperature is 100-200° C., and the crystallization time is 50-120 h.

A37, the ZSM-5/β core-shell molecular sieve obtained by the method for the synthesis of the ZSM-5/β core-shell molecular sieve of any one of Items A12-A36.

A38, use of the ZSM-5/β core-shell molecular sieve of any one of Items A1-A14 and A37.

A39, use of the ZSM-5/β core-shell molecular sieve of any one of Items A1-A14 and A37 in the catalytic cracking or deep catalytic cracking of hydrocarbon oils.

B1, a hydrogenated VGO catalytic cracking catalyst, comprising a carrier comprising silica sol and a modifying element and a core-shell molecular sieve; of which the core is ZSM-5 molecular sieve, the shell is β molecular sieve, the ratio of a height of a diffraction peak at 2θ=22.4° to a height of a diffraction peak at 2θ=23.1° in its X-ray diffraction pattern is 0.1-10:1, and the modifying element is rare earth element.

B2, the catalyst of Item B1, wherein the catalyst has a carrier content of 50-90 wt %, such as 60-85 wt %, on a dry basis, a core-shell molecular sieve content of 10-50 wt %, such as 15-40 wt %, on a dry basis, and a silica sol content of 1-15 wt %, such as 5-15 wt %, on a dry basis.

B3, the catalyst of Item B1 or B2, wherein the carrier further comprises one or more selected from the group consisting of pseudo-boehmite, aluminum sol, and clay.

B4, the catalyst of Item B3, wherein, on a dry basis, the catalyst has a silica sol content of 1-15 wt %, a pseudo-boehmite content of 5-25 wt %, an alumina sol content of 3-20 wt %, and a clay content of 25-50 wt %; preferably, the rare earth oxide content in the carrier is 0.1-15 wt %, calculated as $RE_2O_3$ and based on the dry weight of the carrier.

B5, the catalyst of Item B1 or B2, wherein the modifying element is partially or fully present in the silica sol, the weight ratio of rare earth, calculated as $RE_2O_3$, to $SiO_2$ in the silica sol is 0.2:100 to 18:100 preferably 1:100 to 18:100.

B6, the catalyst of Item B1, wherein the mass ratio of the core to the shell of the core-shell molecular sieve is 0.2-20:1 or 1-15:1.

B7, the catalyst of Item B1, wherein the total specific surface area of the core-shell molecular sieve is more than 420 $m^2/g$, for example 490-580 $m^2/g$, the proportion of the mesopore surface area to the total surface area of the core-shell molecular sieve is preferably between 10% and 40%.

B8, the catalyst of Item B1, wherein the shell molecular sieve of the core-shell molecular sieve has an average grain size of 10-500 nm, such as 50-500 nm.

B9, the catalyst of Item B1, wherein the shell of the core-shell molecular sieve has a thickness of 50-2000 nm.

B10, the catalyst of Item B1, wherein the core-shell molecular sieve has a silica-alumina molar ratio, calculated as $SiO_2/Al_2O_3$, of 10 to 500, for example, 25 to 200.

B11, the catalyst of Item B1, wherein the core molecular sieve of the core-shell molecular sieve has a silica-alumina ratio, calculated as $SiO_2/Al_2O_3$, of 10 to $\infty$, e.g. 30-200.

B12, the catalyst of Item B1, wherein the core molecular sieve of the core-shell molecular sieve has an average grain size of 0.05-15 μm.

B13, the catalyst of Item B1, wherein the number of crystal grains in a single particle of the core molecular sieve of the core-shell molecular sieve is not less than 2, and the average particle size of the core molecular sieve of the core-shell molecular sieve is preferably 0.1 to 30 μm.

B14, the catalyst according to any of Items B1-B13, wherein the shell coverage of the core-shell molecular sieve is 50-100%, and the pore volume of pores with a pore diameter of 20-80 nm accounts for 50-70% of the pore volume of pores with a pore diameter of 2-80 nm.

B15, a method for preparing a catalytic cracking catalyst, comprising: forming a first slurry comprising silica sol, a modifying element compound and a core-shell molecular sieve, and spray drying; wherein the modifying element is a rare earth element.

B16, the method of Item B15, wherein the method for the synthesis of the core-shell molecular sieve comprises the steps of:

(1) contacting a ZSM-5 molecular sieve with a surfactant solution to obtain a ZSM-5 molecular sieve material I;

(2) contacting the ZSM-5 molecular sieve material I with a slurry comprising a β molecular sieve to obtain a ZSM-5 molecular sieve material II;

(3) crystallizing a synthesis liquid comprising a silicon source, an aluminum source, a template and water at 50-300° C. for 4-100 h to obtain a pre-crystallized synthesis liquid III;

(4) mixing the ZSM-5 molecular sieve material II with the pre-crystallized synthesis liquid III, and crystallizing; recovering to obtain a sodium-type core-shell molecular sieve;

(5) subjecting the sodium-type core-shell molecular sieve to ammonium exchange to reduce the content of $Na_2O$ in the core-shell molecular sieve to a level of less than 0.15 wt %;

(6) drying and calcining the core-shell molecular sieve obtained in step (5).

B17, the method of Item B16, wherein the contacting in step 1) is performed by: adding a ZSM-5 molecular sieve into a surfactant solution with a concentration of 0.05-50 wt % and contacting for at least 0.5 h, filtering and drying, to obtain the ZSM-5 molecular sieve material I, wherein the contact time is 1-36 h, and the contact temperature is 20-70° C.

B18, the method of Item B16, wherein the surfactant is selected from the group consisting of polymethyl methacrylate, polydiallyldimethylammonium chloride, dipicolinate, aqueous ammonia, ethylamine, n-butylamine, tetraethylammonium hydroxide, tetrapropylammonium hydroxide, tetraethylammonium bromide, tetrapropylammonium bromide, tetrabutylammonium hydroxide, or a combination thereof.

B19, the method of Item B16, wherein the ZSM-5 molecular sieve of step 1) has a silica-alumina molar ratio of 10 to $\infty$, calculated as $SiO_2/Al_2O_3$, and an average grain size of 0.05-20 μm.

B20, the method of Item B16, wherein the contacting in step 2) comprises: adding the ZSM-5 molecular sieve material I into the slurry comprising β molecular sieve, stirring at 20-60° C. for at least 0.5 hour, filtering and drying, to obtain the ZSM-5 molecular sieve material II, wherein the concentration of the β molecular sieve in the slurry comprising β molecular sieve is 0.1-10 wt %, such as 0.3-8 wt %, and the weight ratio of the slurry comprising β molecular sieve to the ZSM-5 molecular sieve material I, on a dry basis, is 10-50:1.

B21, the method of Item B16, wherein in step 3), the molar ratio of the silicon source, the aluminum source, the template (represented by R), and water is: $R/SiO_2$=0.1-10:1, e.g. 0.1-3:1, $H_2O/SiO_2$=2-150:1, e.g. 10-120:1, $SiO_2/Al_2O_3$=10-800:1, $Na_2O/SiO_2$=0-2:1, e.g. 0.01-1.7:1.

B22, the method of Item B16, wherein in step 3), the silicon source is selected from the group consisting of tetraethoxysilane, water glass, silica white, coarse silica gel, silica sol or activated clay or a combination thereof; the aluminum source is selected from the group consisting of aluminum sulfate, aluminum isopropoxide, sodium metaaluminate, aluminum nitrate, aluminum sol or γ-alumina or a combination thereof; the template is one or more selected from the group consisting of tetraethyl ammonium fluoride, tetraethyl ammonium chloride, tetraethyl ammonium bromide, polyvinyl alcohol, tetraethyl ammonium hydroxide, triethanolamine or sodium carboxymethylcellulose.

B23, the method of Item B16, wherein, in step 3), the silicon source, the aluminum source, the template and deionized water are mixed to form a synthesis liquid, and then the synthesis liquid is crystallized at 75-250° C. for 10-80 h to obtain the pre-crystallized synthesis liquid III.

B24, the method of Item B23, wherein for the crystallization in step 3): the crystallization temperature is 80-180° C., and the crystallization time is 18-50 hours.

B25, the method of Item B16, B23 or B24, wherein XRD analysis of the pre-crystallized synthesis liquid III obtained in step 3) shows a peak at 2θ=22.4° and no peak at 2θ=21.2°.

B26, the method of Item B16, wherein for the crystallization in step 4): the crystallization temperature is 100-250° C., and the crystallization time is 30-350 h; for example for the crystallization in step 4): the crystallization temperature is 100-200° C., and the crystallization time is 50-120 h.

B27, the method of Item B16, wherein the ammonium exchange of step (5) is carried out by exchanging at a weight ratio of the sodium-type core-shell molecular sieve:ammonium salt:$H_2O$=1:(0.1-1):(5-15) at 50-100° C. and filtering, wherein the process is carried out one or more times; and the ammonium salt is one or more selected from the group consisting of ammonium chloride, ammonium sulfate and ammonium nitrate.

B28, the method of Item B15, wherein the first slurry comprises silica sol, the modifying element compound and the core-shell molecular sieve, optionally comprising one or more selected from the group consisting of clay, aluminum sol, pseudo-boehmite; preferably, the pseudo-boehmite is added after being acidified with an acid.

B29, the method of Item B15, wherein the silica sol is a neutral silica sol, an acidic silica sol or an basic silica sol.

B30, the method of Item B15, wherein the rare earth oxide content, calculated as $RE_2O_3$, in the carrier is 1 wt % to 15 wt %, the modifying element compound is a rare earth salt, and the rare earth salt is a rare earth chloride or rare earth nitrate; preferably, the rare earth salt is added to the silica sol first to obtain a rare earth modified silica sol.

B31, the method of Item B15, wherein the rare earth element comprises lanthanum and/or cerium in an amount of greater than 50 wt % of the total amount of the rare earth.

B32, the method of Item B15, wherein the spray dried catalyst is further subjected to exchanging and washing at a weight ratio of the catalyst:ammonium salt:$H_2O$=1: (0.01-1):(5-15) at 50-100° C. and filtering, wherein the exchanging and filtering processes are carried out one or more times; and the ammonium salt is one or more selected from the group consisting of ammonium chloride, ammonium sulfate and ammonium nitrate.

B33, a catalytic cracking catalyst obtained by the method of any one of Items B15-B32.

B34, a process for catalytic cracking of hydrogenated VGO, comprising the step of contacting a hydrogenated VGO with the catalytic cracking catalyst of any one of Items B1-B14 and B33 for reaction.

C1, a catalytic cracking catalyst for producing light olefins from hydrogenated LCO, comprising 60-85 wt % of a carrier, 10-35 wt % of a core-shell molecular sieve and 5-15 wt % of a second molecular sieve, on a dry basis; the core of the core-shell molecular sieve is a ZSM-5 molecular sieve, and its shell is a R molecular sieve; the ratio of a height of a diffraction peak at 2θ=22.4° to a height of a diffraction peak at 2θ=23.1° in an X-ray diffraction pattern of the core-shell molecular sieve is 0.1-10:1; the second molecular sieve is a molecular sieve having a pore opening diameter of 0.65-0.70 nanometer.

C2, the catalytic cracking catalyst of Item C1, wherein the mass ratio of the core to the shell of the core-shell molecular sieve is 0.2-20:1 or 1-15:1.

C3, catalytic cracking catalyst of Item C1, wherein the total specific surface area of the core-shell molecular sieve is more than 420 $m^2$/g, such as 450-620 or 490-580 $m^2$/g, and the proportion of mesopore surface area to the total surface area is preferably 10-40%, such as 12-35%.

C4, the catalytic cracking catalyst of Item C1, wherein the shell molecular sieve of the core-shell molecular sieve has a silica-alumina molar ratio, calculated as $SiO_2$/$Al_2O_3$, of 10 to 500, such as 25 to 200.

C5, the catalytic cracking catalyst of Item C1, wherein the core molecular sieve of the core-shell molecular sieve has a silica-alumina ratio, calculated as $SiO_2$/$Al_2O_3$, of 10 to ∞, e.g. 30-200.

C6, the catalytic cracking catalyst of Item C1, wherein the shell molecular sieve of the core-shell molecular sieve has an average grain size of 10-500 nm, such as 50-500 nm.

C7, the catalytic cracking catalyst of Item C1, wherein the shell of the core-shell molecular sieve has a thickness of 10-2000 nm, such as 50-2000 nm.

C8, the catalytic cracking catalyst of Item C1, wherein the core molecular sieve of the core-shell molecular sieve has an average grain size of 0.05-15 μm, preferably 0.1 to 10 μm.

C9, the catalytic cracking catalyst of Item C1 or C8, wherein the average particle size of the core molecular sieve is preferably 0.1-30 μm, and the number of crystal grains in a single particle of the core molecular sieve is not less than 2.

C10, the catalytic cracking catalyst of Item C1, wherein the core-shell molecular sieve has a shell coverage of 50-100%.

C11, the catalytic cracking catalyst according to any of Items C1-10, wherein in the core-shell molecular sieve, the pore volume of pores with a pore diameter of 20-80 nm accounts for 50-70% of the pore volume of pores with a pore diameter of 2-80 nm.

C12, the catalytic cracking catalyst of Item C 1, wherein the molecular sieve having a pore opening diameter of 0.65-0.70 nanometers is one or more selected from the group consisting of molecular sieves having an AET, AFR, AFS, AFI, BEA, BOG, CFI, CON, GME, IFR, ISV, LTL, MEI, MOR, OFF or SAO structure; preferably selected from the group consisting of Beta, SAPO-5, SAPO-40, SSZ-13, CIT-1, ITQ-7, ZSM-18, mordenite, gmelinite, or a combination thereof.

C13, the catalytic cracking catalyst of Item C1, wherein the carrier comprises one or more selected from the group consisting of clay, silica carrier, alumina carrier, aluminum phosphate gel/sol, optionally comprising an additive such as phosphorous oxide, alkaline earth metal oxide.

C14, the catalytic cracking catalyst of Item C1, wherein the core-shell molecular sieve has a sodium oxide content of no more than 0.15 wt %.

C15, a method for preparing a catalytic cracking catalyst, comprising the following steps: forming a slurry comprising the core-shell molecular sieve, the second molecular sieve, the carrier and water, and spray drying; the second molecular sieve is a molecular sieve having a pore opening diameter of 0.65-0.70 nanometer.

C16, the method of Item C15, wherein the method for the synthesis of the core-shell molecular sieve comprises the steps of:

(1) contacting a ZSM-5 molecular sieve with a surfactant solution to obtain a ZSM-5 molecular sieve material I;

(2) contacting the ZSM-5 molecular sieve material I with a slurry comprising a β molecular sieve to obtain a ZSM-5 molecular sieve material II;

(3) crystallizing a synthesis liquid comprising a silicon source, an aluminum source, a template and water at 50-300° C. for 4-100 h to obtain a pre-crystallized synthesis liquid III;

(4) mixing the ZSM-5 molecular sieve material II with the pre-crystallized synthesis liquid III, and crystallizing; and (5) recovering the core-shell molecular sieve.

C17, the method of Item C16, wherein the contacting in step 1) is performed by: adding a ZSM-5 molecular sieve into a surfactant solution with a concentration of 0.05-50 wt % and contacting for at least 0.5 h, filtering and drying, to obtain the ZSM-5 molecular sieve material I, wherein the contact time is 1-36 h, and the contact temperature is 20-70° C.

C18, the method of Item C16, wherein the surfactant is selected from the group consisting of polymethyl methacrylate, polydiallyldimethylammonium chloride, dipicolinate, aqueous ammonia, ethylamine, n-butylamine, tetraethylammonium hydroxide, tetrapropylammonium hydroxide, tetraethylammonium bromide, tetrapropylammonium bromide, tetrabutylammonium hydroxide, or a combination thereof.

C19, the method of Item C16, wherein the ZSM-5 molecular sieve of step 1) has a silica-alumina molar ratio, calculated as $SiO_2/Al_2O_3$, of 10 to ∞, and the ZSM-5 molecular sieve has an average grain size of 0.05-20 μm.

C20, the method of Item C16, wherein the contacting in step 2) comprises: adding the ZSM-5 molecular sieve material I into the slurry comprising β molecular sieve, stirring at 20-60° C. for at least 0.5 hour, filtering and drying, to obtain the ZSM-5 molecular sieve material II, wherein the concentration of the β molecular sieve in the slurry comprising β molecular sieve is 0.1-10 wt %, such as 0.3-8 wt %, and the weight ratio of the slurry comprising β molecular sieve to the ZSM-5 molecular sieve material I, on a dry basis, is 10-50:1.

C21, the method of Item C16, wherein in step 3), the molar ratio of the silicon source, the aluminum source, the template (represented by R), and water is: $R/SiO_2=0.1-10:1$, e.g. 0.1-3:1, $H_2O/SiO_2=2-150:1$, e.g. 10-120:1, $SiO_2/Al_2O_3=10-800:1$, $Na_2O/SiO_2=0-2:1$, e.g. 0.01-1.7:1.

C22, the method of Item C16, characterized in that, in step 3), the silicon source is selected from the group consisting of tetraethoxysilane, water glass, coarse silica gel, silica sol, silica white, activated clay, or a combination thereof; the aluminum source is selected from the group consisting of aluminum sulfate, aluminum isopropoxide, aluminum nitrate, aluminum sol, sodium metaaluminate, γ-alumina or a combination thereof; the template is selected from the group consisting of tetraethylammonium fluoride, tetraethylammonium hydroxide, tetraethylammonium bromide, tetraethylammonium chloride, polyvinyl alcohol, triethanolamine or sodium carboxymethylcellulose, or a combination thereof.

C23, the method of Item C16, wherein, in step 3), the silicon source, the aluminum source, the template, and deionized water are mixed to form a synthesis liquid, which is then crystallized at 75-250° C. for 10-80 h to obtain the pre-crystallized synthesis liquid III.

C24, the method of Item C16, wherein for the crystallization in step 3): the crystallization temperature is 80-180° C., and the crystallization time is 18-50 hours.

C25, the method of Item C16, C23 or C24, characterized in that, XRD analysis of the pre-crystallized synthesis liquid III obtained in step 3) shows a peak at 2θ=22.4° and no peak at 2θ=21.2°.

C26, the method of Item C16, wherein for the crystallization in step 4): the crystallization temperature is 100-250° C., and the crystallization time is 30-350 h; for example, for the crystallization in step 4): the crystallization temperature is 100-200° C., and the crystallization time is 50-120 h.

C27, the method according to any of Items C16-C26, comprising the steps of:

(S1) contacting the recovered core-shell molecular sieve with ammonium salt for ion exchange to obtain an ammonium exchanged core-shell molecular sieve, wherein the content of sodium oxide in the ammonium exchanged core-shell molecular sieve is less than 0.15 wt %;

(S2) calcining the ammonium exchanged core-shell molecular sieve to obtain a hydrogen-type core-shell molecular sieve;

(S3) slurrying the hydrogen-type core-shell molecular sieve, the molecular sieve with a pore opening diameter of 0.65-0.70 nanometer, the carrier and water, and spray drying.

C28, the method of Item C27, wherein the ammonium exchange of step (S1) comprises: contacting the core-shell molecular sieve with an ammonium salt solution at a weight ratio of the core-shell molecular sieve: ammonium salt:$H_2O$=1:(0.1-1):(5-15) at 50-100° C. for exchanging, and filtering, wherein the ammonium exchange process is carried out one, two or more times; the ammonium salt is one or more selected from the group consisting of ammonium chloride, ammonium sulfate and ammonium nitrate; and the calcining of step (S2) is carried out at 400-600° C. for 2-10 h.

C29, the method of Item C15, C16, C27 or C28, characterized in that an ammonium exchange and/or calcining step is further performed after spray drying; the ammonium exchange is performed to obtain a sodium oxide content of less than 0.15 wt % in the resulting catalytic cracking catalyst.

C30, the method of Item C29, wherein the carrier is, for example, a clay and alumina carrier, or a clay, silica and optionally alumina support; preferably, the carrier comprises a silica carrier, wherein the content of the silica carrier is 1-15 wt %, calculated as $SiO_2$, and the silica carrier is one or more selected from the group consisting of neutral silica sol, acidic silica sol or basic silica sol.

C31, a catalytic cracking catalyst obtained by the method of any one of Items C15-C30. C32, a process for catalytic cracking of hydrogenated LCO, comprising the step of contacting a hydrogenated LCO with the catalytic cracking catalyst of any one of Items C1-C14 and C31.

D1, a method for using a core-shell molecular sieve, comprising:

(1) reducing the content of sodium oxide in the core-shell molecular sieve, and optionally calcining to obtain a modified core-shell molecular sieve, wherein the core of the core-shell molecular sieve is a ZSM-5 molecular sieve, and the shell of the core-shell molecular sieve is a β molecular sieve; the ratio of a height of a diffraction peak at 2θ=22.4° to a height of a diffraction peak at 2θ=23.1° in an X-ray diffraction pattern of the core-shell molecular sieve is 0.1-10:1, and the total specific surface area of the core-shell molecular sieve is more than 420 m²/g;

(2) forming a slurry of the modified core-shell molecular sieve, a Y molecular sieve, a carrier and water; and (3) spray drying.

D2, a method for preparing a catalytic cracking catalyst, comprising:

S1: preparing a core-shell molecular sieve by a method comprising the following steps:

(1) contacting a ZSM-5 molecular sieve with a surfactant solution to obtain a ZSM-5 molecular sieve material I;

(2) contacting the ZSM-5 molecular sieve material I with a slurry comprising a β molecular sieve to obtain a ZSM-5 molecular sieve material II;

(3) crystallizing a synthesis liquid comprising a silicon source, an aluminum source, a template and water at 50-300° C. for 4-100 h to obtain a pre-crystallized synthesis liquid III;

(4) mixing the ZSM-5 molecular sieve material II with the pre-crystallized synthesis liquid III, crystallizing, and recovering the core-shell molecular sieve;

S2: reducing the sodium oxide content of the core-shell molecular sieve, and calcining to obtain a modified core-shell molecular sieve;

S3: forming a slurry of the modified core-shell molecular sieve, a Y molecular sieve, a carrier and water; and S4: spray drying.

D3, the method of Item D2, wherein the contacting in step 1) is performed by: adding a ZSM-5 molecular sieve into a surfactant solution with a concentration of 0.05-50 wt % and contacting for at least 0.5 h, filtering and drying, to obtain the ZSM-5 molecular sieve material I, wherein the contact time is 1-36 h, and the contact temperature is 20-70° C.

D4, the method of Item D2, wherein the ZSM-5 molecular sieve of step 1) has a silica-alumina molar ratio of 10 to ∞, calculated as $SiO_2/Al_2O_3$, and an average grain size of 0.05-20 μm.

D5, the method of Item D2, wherein the contacting in step 2) comprises: adding the ZSM-5 molecular sieve material I into the slurry comprising β molecular sieve, stirring at 20-60° C. for at least 0.5 hour, then filtering and drying, to obtain the ZSM-5 molecular sieve material II, wherein the weight ratio of the slurry comprising β molecular sieve to the ZSM-5 molecular sieve material I, on a dry basis, is 10-50:1, and the concentration of the β molecular sieve in the slurry comprising β molecular sieve is 0.1-10 wt %, such as 0.3-8 wt %.

D6, the method of Item D2, wherein in step 3), the molar ratio of the silicon source, the aluminum source, the template and water is: $R/SiO_2=0.1$-10:1, $H_2O/SiO_2=2$-150:1, $SiO_2/Al_2O_3=10$-800:1, $Na_2O/SiO_2=0$-2:1, wherein R represents the template.

D7, the method of Item D6, wherein, in step 3), the $R/SiO_2$ is 0.1-3:1, the $H_2O/SiO_2$ is 10-120:1; the $Na_2O/SiO_2=0.01$-1.7:1.

D8, the method of Item D2, wherein in step 1) the surfactant is selected from the group consisting of aqueous ammonia, polymethyl methacrylate, n-butylamine, polydiallyldimethylammonium chloride, dipicolinic acid, ethylamine, tetraethylammonium hydroxide, tetrapropylammonium hydroxide, tetraethylammonium bromide, tetrapropylammonium bromide, tetrabutylammonium hydroxide or a combination thereof; in step 3), the silicon source is one or more selected from the group consisting of water glass, silica sol, coarse silica gel, tetraethoxysilane, silica white or activated clay; the aluminum source is selected from the group consisting of aluminum sulfate, aluminum nitrate, aluminum isopropoxide, aluminum sol, sodium metaaluminate, γ-alumina or a combination thereof; the template is one or more selected from the group consisting of tetraethyl ammonium fluoride, tetraethyl ammonium chloride, tetraethyl ammonium hydroxide, polyvinyl alcohol, tetraethyl ammonium bromide, triethanolamine or sodium carboxymethylcellulose.

D9, the method of Item D2, wherein, in step 3), the silicon source, the aluminum source, the template and deionized water are mixed to form a synthesis liquid, and then the synthesis liquid is crystallized at 75-250° C. for 10-80 h to obtain the pre-crystallized synthesis liquid III.

D10, the method of Item D9, wherein for the crystallization in step 3): the crystallization temperature is 80-180° C., and the crystallization time is 18-50 hours.

D11, the method of Item D8, D9 or D10, wherein XRD analysis of the pre-crystallized synthesis liquid III obtained in step 3) shows a peak at 2θ=22.4° and no peak at 2θ=21.2°.

D12, the method of Item D2, wherein for the crystallization in step 4): the crystallization temperature is 100-250° C., and the crystallization time is 30-350 h; preferably, for the crystallization in step 4): the crystallization temperature is 100-200° C., and the crystallization time is 50-120 h.

D13, the method of Items D1 or D2, wherein the $Na_2O$ content in the modified core-shell molecular sieve is less than 0.15 wt %.

D14, the method of Item D1 or D2, wherein the carrier is one or more selected from the group consisting of clay, alumina carrier, or silica carrier.

D15, the method of Item D14, wherein the silica carrier is one or more selected from the group consisting of neutral silica sol, acidic silica sol or basic silica sol; the alumina carrier is one or more selected from the group consisting of pseudo-boehmite and alumina sol.

D16, the method of Item D1 or D2, wherein the spray dried catalyst is further subjected to exchanging and washing and/or calcining, the exchanging and washing is performed by exchanging at a weight ratio of the catalyst:ammonium salt:$H_2O$=1:(0.01-1):(5-15) at 50-100° C. and filtering, wherein the process can be carried out one, two or more times; the ammonium salt may be one or more selected from the group consisting of ammonium chloride, ammonium nitrate, ammonium sulfate.

D17, a heavy oil catalytic cracking catalyst, comprising 30-83 wt % of a carrier, 2-20 wt % of a modified core-shell molecular sieve and 15-50 wt % of a Y type molecular sieve, on a dry basis and based on the weight of the catalyst; wherein the modified core-shell molecular sieve is obtained by modifying a core-shell molecular sieve, of which the core is a ZSM-5 molecular sieve, the shell is a β molecular sieve, and the ratio of a height of a diffraction peak at 2θ=22.4° to a height of a diffraction peak at 2θ=23.1° in an X-ray diffraction pattern is 0.1-10:1, and the total specific surface area is more than 420 m²/g.

D18, the catalyst of Item D17, wherein the mass ratio of the core to the shell of the core-shell molecular sieve is 0.2-20:1 or 1-15:1.

D19, the catalyst of Item D17, wherein the total specific surface area of the core-shell molecular sieve is greater than 420 m²/g, for example 450-620 or 490-580 m²/g, and the proportion of mesopore surface area to total surface area is preferably 10-40%, for example 12-35%.

D20, the catalyst of Item D17, wherein the shell molecular sieve of the core-shell molecular sieve has an average grain size of 10-500 nm, such as 50-500 nm.

D21, the catalyst of Item D17, wherein the shell of the core-shell molecular sieve has a thickness of 50-2000 nm or 10-2000 nm.

D22, the catalyst of Item D17, wherein the shell molecular sieve of the core-shell molecular sieve has a silica-alumina molar ratio, calculated as $SiO_2/Al_2O_3$, of 10 to 500, e.g., 25 to 200.

D23, the catalyst of Item D17, wherein the core molecular sieve of the core-shell molecular sieve has a silica-alumina ratio, calculated as $SiO_2/Al_2O_3$, of 10 to ∞, e.g., 30-200.

D24, the catalyst of Item D17, wherein the core molecular sieve of the core-shell molecular sieve has an average grain size of 0.05-15 µm or 0.1-10 µm.

D25, the catalyst of Item D17, wherein the number of crystal grains in a single particle of the core molecular sieve is not less than 2, and the average particle size of the core molecular sieve is preferably 0.1-30 µm.

D26, the catalyst of any of Items D17-D25, wherein the core-shell molecular sieve has a shell coverage of 50-100%, for example 80-100%.

D27, the catalyst of any of Items D17-D25, wherein the pore volume of pores with a pore diameter of 20-80 nm accounts for 50-70% of the pore volume of pores with a pore diameter of 2-80 nm of the core-shell molecular sieve.

D28, the catalyst of Item D17, wherein the carrier is one or more selected from the group consisting of clay, silica carrier, and alumina carrier.

D29, the catalyst of Item D17, wherein the carrier comprises one or more selected from the group consisting of aluminum sol, pseudo-boehmite, silica sol, and clay.

D30, the catalyst of Item D29, wherein the catalyst comprises a silica sol carrier in an amount of 1 wt % to 15 wt %, such as 5 wt % to 15 wt %, calculated as $SiO_2$, and an additional carrier comprising one or more selected from the group consisting of alumina sol, pseudo-boehmite, and clay.

D31, a catalytic cracking catalyst obtained by the method of any one of Items D1-D16.

D32, use of the catalytic cracking catalyst of any of Item D17-D31 in the catalytic cracking of heavy oils for producing light olefins.

D33, the use of Item D32, comprising contacting a heavy oil with the catalytic cracking for reaction at a reaction temperature of 500-550° C.; a weight hourly space velocity of 5-30 h$^{-1}$, a catalyst-to-oil ratio of 1-15, wherein the heavy oil is one or more selected from the group consisting of atmospheric residue, atmospheric gas oil, vacuum residue, vacuum gas oil, coker gas oil and light/heavy deasphalted oil.

E1, a catalytic cracking catalyst for the conversion of intermediate base crude oil, comprising 50-79 wt % of a carrier, 15-35 wt % of a core-shell molecular sieve, 5-10 wt % of a Y type molecular sieve, and 1-5 wt % of a molecular sieve having a pore opening diameter of 0.65-0.70 nanometer, on a dry basis; wherein the core of the core-shell molecular sieve is a ZSM-5 molecular sieve, the shell is a β molecular sieve, the ratio of a height of a diffraction peak at 2θ=22.4° to a height of a diffraction peak at 2θ=23.1° in an X-ray diffraction pattern of the core-shell molecular sieve is 0.1-10:1, and a total specific surface area of the core-shell molecular sieve is more than 420 m$^2$/g.

E2, the catalyst of Item E1, wherein the mass ratio of the core to the shell of the core-shell molecular sieve is 0.2-20:1 or 1-15:1.

E3, the catalyst of Item E1, wherein the total specific surface area of the core-shell molecular sieve is greater than 420 m$^2$/g, for example 490-580 m$^2$/g, and the proportion of mesopore surface area in the total surface area is preferably 10-40%.

E4, the catalyst of Item E1, wherein the shell molecular sieve of the core-shell molecular sieve has an average grain size of 10-500 nm, such as 50-500 nm.

E5, the catalyst of Item E1, wherein the shell of the core-shell molecular sieve has a thickness of 50-2000 nm.

E6, the catalyst of Item E1, wherein the shell molecular sieve of the core-shell molecular sieve has a silica-alumina molar ratio, calculated as $SiO_2/Al_2O_3$, of 10 to 500, for example, 25 to 200.

E7, the catalyst of Item E1, wherein the core molecular sieve of the core-shell molecular sieve has a silica-alumina ratio, calculated as $SiO_2/Al_2O_3$, of 10 to ∞, e.g. 30-200.

E8, the catalyst of Item E1, wherein the core molecular sieve of the core-shell molecular sieve has an average grain size of 0.05-15 µm.

E9, the catalyst of Item E1, wherein the number of crystal grains in a single particle of the core molecular sieve is not less than 2, and the average particle size of the core molecular sieve is preferably 0.1-30 µm.

E10, the catalyst of any of Items E1-E10, wherein the core-shell molecular sieve has a shell coverage of 50-100%.

E11, the catalyst of any one of Items E1-E10, wherein the pore volume of pores with a pore diameter of 20-80 nm is 50-70% of the pore volume of pores with a pore diameter of 2-80 nm of the core-shell molecular sieve.

E12, the catalyst of Item E1, wherein the Y molecular sieve is a rare earth-free Y molecular sieve or a Y molecular sieve with a rare earth content of less than 5 wt %, the content of the rare earth in the Y molecular sieve is 0-5 wt %, calculated as $RE_2O_3$, and the silica-alumina ratio of the Y molecular sieve is 4-18, calculated as $SiO_2/Al_2O_3$ molar ratio.

E13, the catalyst of Item E1 or E12, wherein the molecular sieve having a pore opening diameter of 0.65-0.70 nm is a β molecular sieve.

E14, the catalyst of Item E1 or E12, wherein the carrier is one or more selected from the group consisting of aluminum sol, zirconia gel/sol, pseudo-boehmite, and clay.

E15, a method for preparing a catalytic cracking catalyst, comprising: forming a slurry of a first molecular sieve, a second molecular sieve, a third molecular sieve and a carrier, and spray drying; wherein the first molecular sieve is a core-shell molecular sieve, the second molecular sieve is a molecular sieve having a pore opening diameter of 0.65-0.70 nanometer, and the third molecular sieve is a Y molecular sieve.

E16, the method of Item E15, wherein the method for the synthesis of the core-shell molecular sieve comprises the steps of:

(1) contacting a ZSM-5 molecular sieve with a surfactant solution to obtain a ZSM-5 molecular sieve material I;

(2) contacting the ZSM-5 molecular sieve material I with a slurry comprising a β molecular sieve to obtain a ZSM-5 molecular sieve material II;

(3) crystallizing a synthesis liquid comprising a silicon source, an aluminum source, a template and water at 50-300° C. for 4-100 h to obtain a pre-crystallized synthesis liquid III;

(4) mixing the ZSM-5 molecular sieve material II with the pre-crystallized synthesis liquid III, and crystallizing; separating to obtain a sodium-type core-shell molecular sieve;

(5) subjecting the sodium-type core-shell molecular sieve to ammonium exchange to reduce the content of $Na_2O$ in the core-shell molecular sieve to a level of less than 0.15 wt %; and (6) drying and calcining the core-shell molecular sieve obtained in step (5).

E17, the method of Item E16, wherein the contacting in step 1) is carried out by: adding a ZSM-5 molecular sieve into a surfactant solution with a concentration of 0.05-50 wt % and contacting for at least 0.5 h, filtering and drying, to obtain the ZSM-5 molecular sieve material I, wherein the contact time is 1-36 h, and the contact temperature is 20-70° C.

E18, the method of Item E16, wherein the surfactant is selected from the group consisting of polymethyl methacrylate, polydiallyldimethylammonium chloride, dipicolinate, aqueous ammonia, ethylamine, n-butylamine, tetraethylammonium hydroxide, tetrapropylammonium hydroxide, tetraethylammonium bromide, tetrapropylammonium bromide, tetrabutylammonium hydroxide, or a combination thereof.

E19, the method of Item E16, wherein the ZSM-5 molecular sieve of step 1) has a silica-alumina molar ratio of 10 to ∞, calculated as $SiO_2/Al_2O_3$, and an average grain size of the ZSM-5 molecular sieve is 0.05-20 μm.

E20, the method of Item E16, wherein the contacting in step 2) comprises: adding the ZSM-5 molecular sieve material I into the slurry comprising β molecular sieve, stirring at 20-60° C. for at least 0.5 hour, filtering and drying, to obtain the ZSM-5 molecular sieve material II, wherein the concentration of the β molecular sieve in the slurry comprising β molecular sieve is 0.1-10 wt %, such as 0.3-8 wt %, and the weight ratio of the slurry comprising β molecular sieve to the ZSM-5 molecular sieve material I is 10-50:1.

E21, the method of Item E16, wherein, in step 3), the molar ratio of the silicon source, the aluminum source, the template (represented by R), and water is: $R/SiO_2$=0.1-10:1, e.g. 0.1-3:1, $H_2O/SiO_2$=2-150:1, e.g. 10-120:1, $SiO_2/Al_2O_3$=10-800:1, $Na_2O/SiO_2$=0-2:1, e.g. 0.01-1.7:1.

E22, the method of Item E16, wherein, in step 3), the silicon source is selected from the group consisting of tetraethoxysilane, water glass, silica sol, coarse silica gel, silica white, activated clay or a combination thereof; the aluminum source is selected from the group consisting of aluminum sulfate, aluminum nitrate, aluminum isopropoxide, aluminum sol, sodium metaaluminate, γ-alumina or a combination thereof; the template is one or more selected from the group consisting of tetraethyl ammonium fluoride, tetraethyl ammonium bromide, tetraethyl ammonium chloride, tetraethyl ammonium hydroxide, polyvinyl alcohol, triethanolamine or sodium carboxymethylcellulose.

E23, the method of Item E16, wherein, in step 3), the silicon source, the aluminum source, the template and deionized water are mixed to form a synthesis liquid, and then the synthesis liquid is crystallized at 75-250° C. for 10-80 h to obtain the pre-crystallized synthesis liquid III.

E24, the method of Item E22, wherein for the crystallization in step 3): the crystallization temperature is 80-180° C., and the crystallization time is 18-50 hours.

E25, the method of Item E16, E22 or E23, wherein XRD analysis of the pre-crystallized synthesis liquid III obtained in step 3) shows a peak at 2θ=22.4° and no peak at 2θ=21.2°.

E26, the method of Item E16, wherein for the crystallization in step 4): the crystallization temperature is 100-250° C., and the crystallization time is 30-350 h; for example, for the crystallization in step 4): the crystallization temperature is 100-200° C., and the crystallization time is 50-120 h.

E27, the method of Item E16, wherein the ammonium exchange of step (5) is carried out by exchanging at a weight ratio of the core-shell molecular sieve:ammonium salt:$H_2O$=1:(0.1-1):(5-15) at 50-100° C., and filtering, wherein the process can be carried out one or more times; and the ammonium salt is one or more selected from the group consisting of ammonium chloride, ammonium sulfate and ammonium nitrate.

E28, the method of Item E16, wherein, the calcining in step (6) is performed at 350-600° C. for 2-6 h to remove the template.

E29, the method of Item E15, wherein the rare earth content in the Y molecular sieve is 0-5 wt %, calculated as $RE_2O_3$; and the second molecular sieve is preferably a β molecular sieve.

E30, the method of Item E15, wherein the carrier is one or more selected from the group consisting of clay, alumina carrier, silica carrier.

E31, the method of Item E15, wherein the silica carrier is one or more selected from the group consisting of neutral silica sol, acidic silica sol or basic silica sol; preferably, the silica sol content of the catalyst is 1-15 wt %, calculated as $SiO_2$.

E32, a catalytic cracking obtained by the method of any of Items E16-E31.

E33, a process for catalytic cracking of heavy oil, comprising the step of contacting a heavy oil with the catalyst of any one of Items E1-E14 and E32.

E34, a process for catalytic cracking of an intermediate base crude oil, comprising the step of contacting the intermediate base crude oil with the catalyst of any one of Items E1-E14 and E33 for reaction at a reaction temperature of 550-620° C.

EXAMPLES

The present application will be further described with reference to the following examples, but the present application is not limited thereto.

In the following examples and comparative examples, XRD analysis was performed using the following instruments and test conditions: the instrument was Empyrean; and testing conditions included: tube voltage 40 kV, tube current 40 mA, Cu target and Kα radiation, 20 scanning range 5-35°, scanning speed 2(°)/min. The mass ratio of the core to the shell was calculated based on the diffraction peak obtained in X-ray diffraction analysis, and the fitting calculation was performed using the JADE software by means of the fitting function pseudo-voigt.

The grain size and particle size of the molecular sieve was measured by SEM, in which the sizes of 10 crystal grains were randomly measured, of which the average value was taken as the average grain size of the molecular sieve sample; the sizes of 10 particles were randomly measured, of which the average value was taken as the average particle size of the molecular sieve sample. The grain size refers to the size of the widest part of the crystal grain, and is obtained by measuring the diameter of the maximum circumscribed circle of the projection of the crystal grain. The particle size refers to the size of the widest part of the particle, and is obtained by measuring the diameter of the maximum circumscribed circle of the projection of the particle.

The thickness of the shell is measured by TEM method, in which the thickness of the shell at a position of a core-shell molecular sieve particle is randomly measured, 10 particles were measured, and the average value of the 10 particles was taken.

The coverage of the molecular sieve was measured by SEM method, in which the proportion of the outer surface area of the shell on a core particle to the outer surface area of the core particle was calculated as the coverage of the particle, 10 particles were randomly measured, and the average value was taken.

The mesopore surface area (mesopore specific surface area), specific surface area, pore volume (total pore volume) and pore diameter distribution were measured by low-temperature nitrogen adsorption volume method, using an ASAP2420 adsorption apparatus from Micromeritics Instrument Corp, USA. The samples were vacuum degassed at 100° C. and 300° C. for 0.5 h and 6 h, respectively, and subjected to an N2 adsorption/desorption test at 77.4K, and the adsorption amount and desorption amount of the samples for nitrogen were measured under different specific pressures, to obtain a N2 adsorption-desorption isotherm curve. The BET specific surface area (total specific surface area) was calculated using the BET formula, and the micropore area was calculated using t-plot.

The silica-alumina ratio of the ZSM-5 molecular sieve used as the starting material was determined by XRF fluorescence measurement, and the silica-alumina ratio of the shell molecular sieve was measured by TEM-EDS method.

XRD analysis of the pre-crystallized synthesis liquid III was performed by: filter the pre-crystallized synthesis liquid III, washing with deionized water in an amount of 8 times the weight of the solid, drying at 120° C. for 4 hours, calcining at 550° C. for 4 hours, cooling and then conducting the XRD measurement (the XRD measurement was performed using the instrument and method as described above).

I. Preparation and Evaluation of Molecular Sieves

Example I-1

Figure 3:
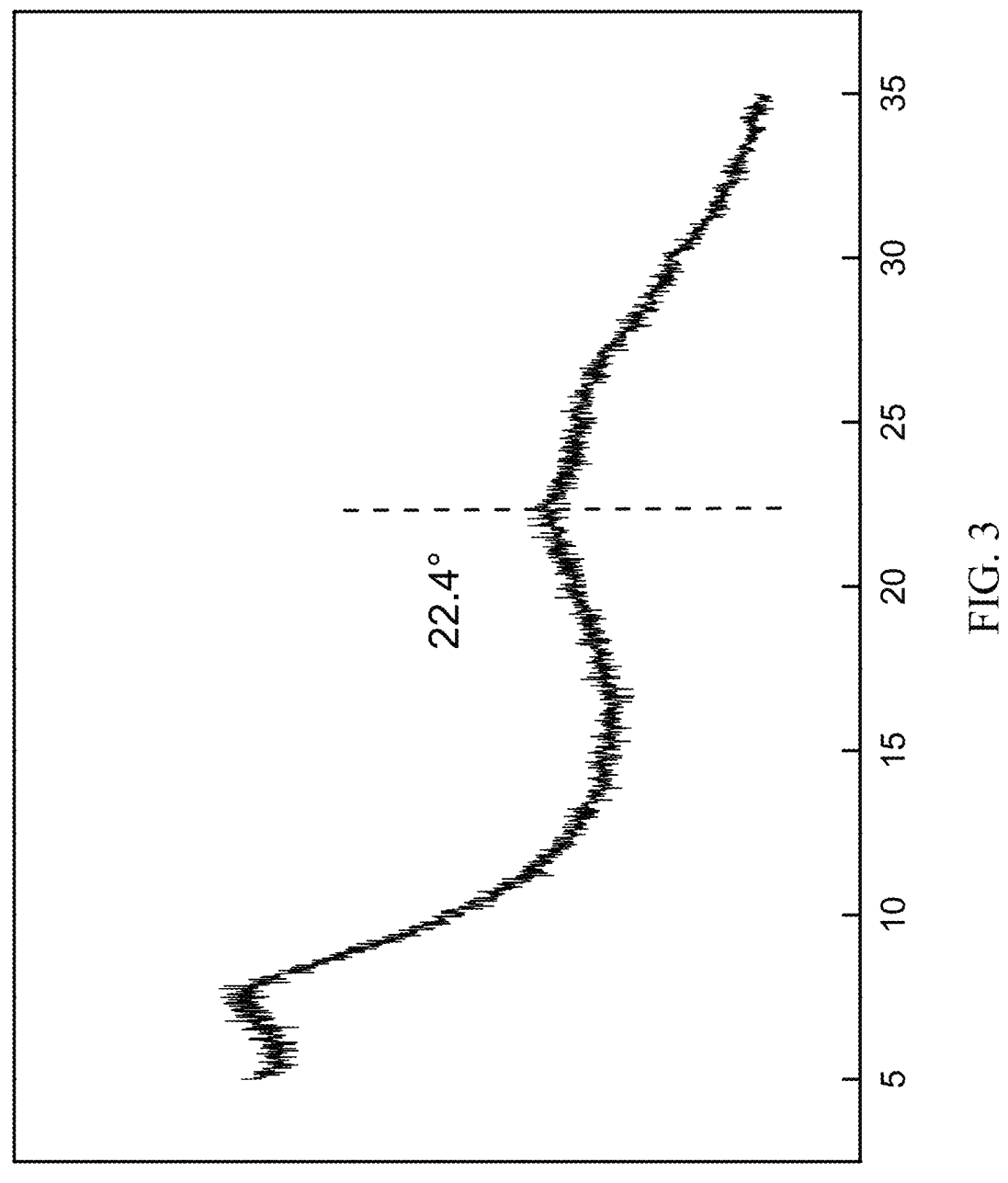
FIG. 3 shows an XRD diffraction pattern of a pre-crystallized synthesis liquid III obtained in Example I-1 of the present application.

(1) 5.0 g of a hydrogen-type ZSM-5 molecular sieve (with a silica-alumina ratio of 30, an average grain size of 1.2 μm, an average particle size of 15 μm and a crystallinity of 93.0%) was added a core into 50.0 g of an aqueous solution of methyl methacrylate and sodium chloride (with the concentration by mass of the methyl methacrylate being 0.2% and the concentration by mass of the sodium chloride being 5.0%) at room temperature (25° C.), stirred for 1 h, filtered, and dried at 50° C. in an air atmosphere to obtain a ZSM-5 molecular sieve material I;

(2) the ZSM-5 molecular sieve material I was added into a β molecular sieve suspension (a suspension formed by a hydrogen-type β molecular sieve and water, wherein the concentration by weight of the β molecular sieve in the β molecular sieve suspension is 0.3 wt %, the β molecular sieve has an average grain size of 0.2 micron, a silica-alumina ratio of 30, and a crystallinity of 89%, and the particles of the β molecular sieve are particles comprising a single crystal grain), at a mass ratio of the ZSM-5 molecular sieve material I to the β molecular sieve suspension of 1:10, stirred for 1 hour at a temperature of 50° C., filtered, and the resulting filter cake was dried in an air atmosphere at a temperature of 90° C. to obtain a ZSM-5 molecular sieve material II;

(3) 1.0 g of aluminum isopropoxide was dissolved in 15 g of deionized water, 0.65 g of NaOH particles was added thereto, then 10.0 g of silica sol (with $SiO_2$ content of 25.0 wt %, pH value of 10.0 and sodium oxide content of 0.10 wt %) and 20 g of tetraethylammonium hydroxide solution (with tetraethylammonium hydroxide content in the tetraethylammonium hydroxide solution of 25 wt %) were added, uniformly stirred, then transferred into a reaction kettle with a polytetrafluoroethylene lining for crystallization, and crystallized at 80° C. for 48 hours to obtain a pre-crystallized synthetic solution III; a sample of the pre-crystallized synthesis liquid III was filtered, washed, dried and calcined, and its XRD diffraction pattern was measured. As shown in FIG. 3, the XRD diffraction pattern shows a peak at 2θ=22.4° and no peak at 2θ=21.2°, and it is obvious that there is an upcoming peak at 22.4°, which indicates that the pre-crystallization of the shell β molecular sieve has been completed;

(4) the ZSM-5 molecular sieve material II was added into the pre-crystallized synthesis liquid III (the weight ratio of the ZSM-5 molecular sieve material II (calculated on a dry basis) to the pre-crystallized synthesis liquid III is 1:10), and crystallized for 60 hours at 120° C. After crystallization, the resultant was filtered, washed, dried, and calcined at 550° C. for 4 hours, to obtain a sodium-type ZSM-5/β core-shell molecular sieve.

FIG. 1 shows an SEM image of the ZSM-5/β core-shell molecular sieve obtained in Example I-1. As shown in the figure, the core-shell molecular sieve has a good coverage of the shell β molecular sieve; at high magnification (see right half of FIG. 1), it can be seen that the core molecular sieve has a structure composed of a plurality of crystal grains.

Figure 2A:
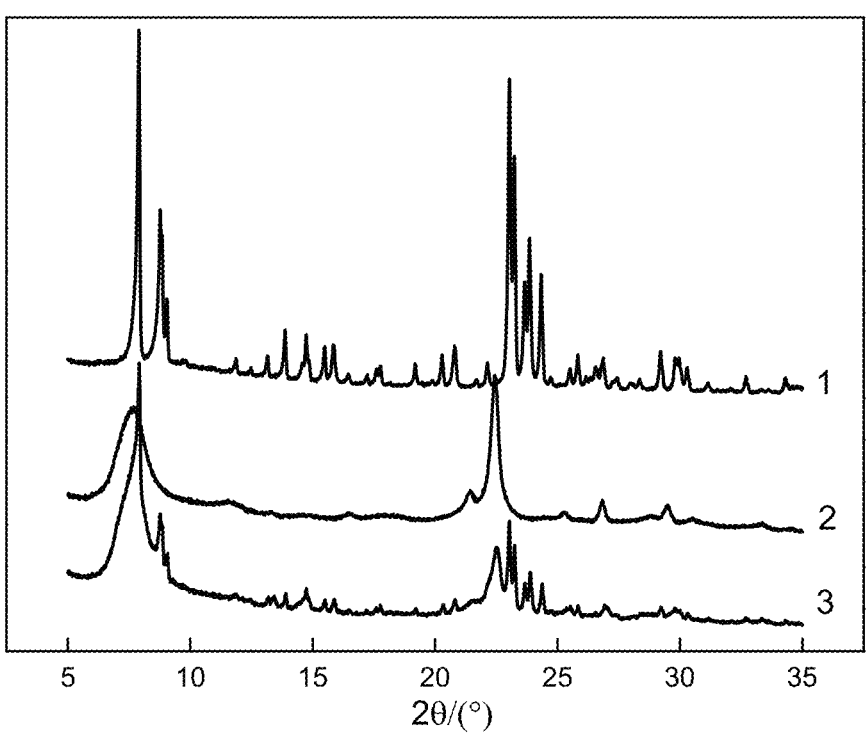
FIG. 2A shows XRD diffraction patterns of molecular sieves, wherein 1 is an XRD diffraction pattern of ZSM-5 molecular sieve, 2 is an XRD diffraction pattern of β molecular sieve, and 3 is an XRD diffraction pattern of the ZSM-5/β core-shell molecular sieve obtained in Example I-1 of the present application.
Figure 2B:
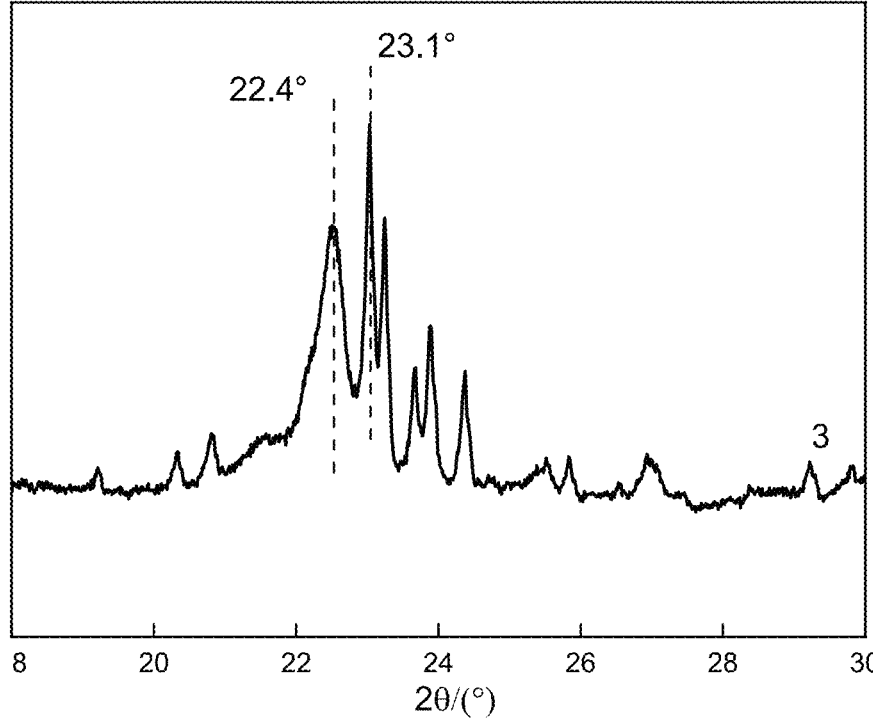
FIG. 2B shows a partial enlarged view of the XRD diffraction pattern of the ZSM-5/β core-shell molecular sieve obtained in Example I-1 of the present application.

The pattern 3 in FIG. 2A shows the XRD diffraction pattern of the ZSM-5/β core-shell molecular sieve obtained in Example I-1, and FIG. 2B shows a partial enlarged view of the XRD diffraction pattern, in which diffraction peaks at 2θ of 22.4° and 23.1° are characteristic peaks of the shell and cores, respectively.

Figure 4:
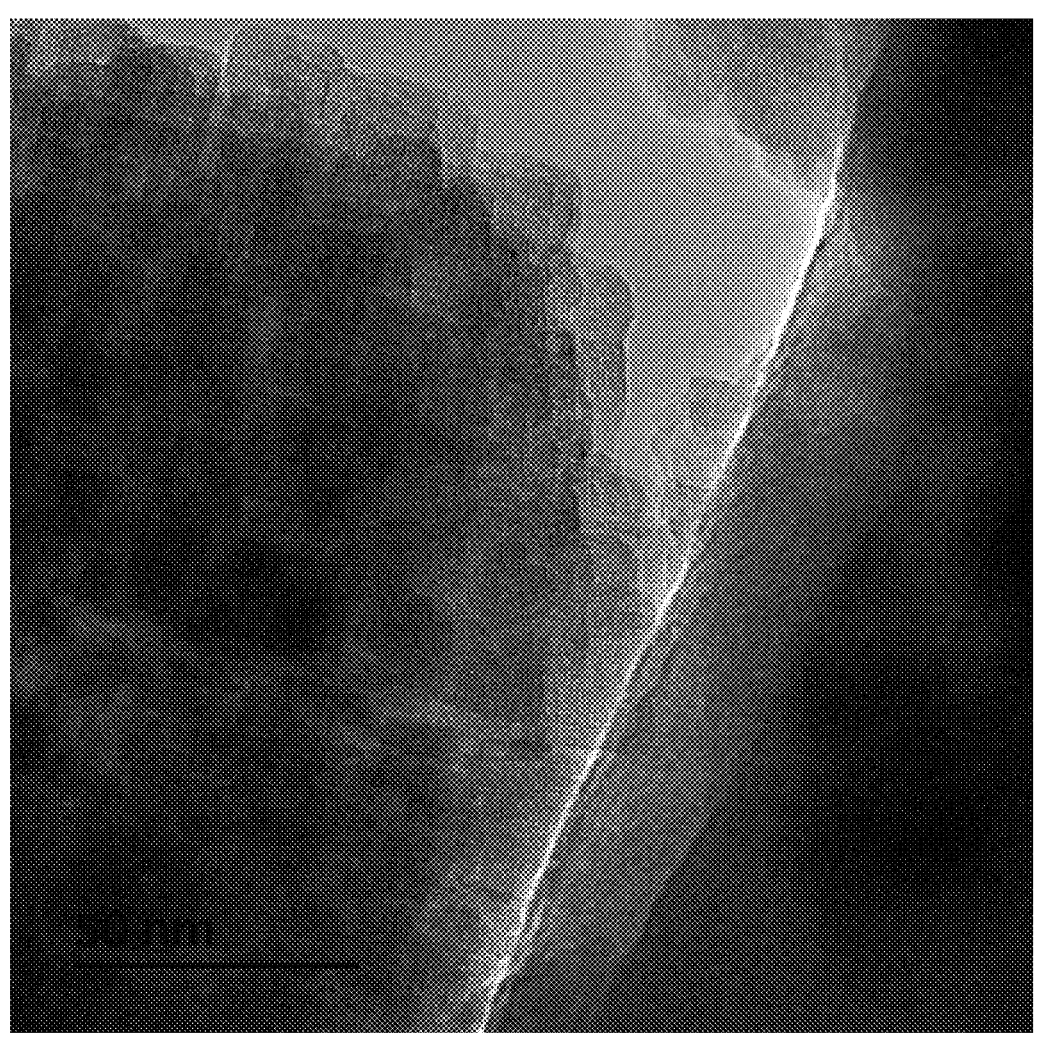
FIG. 4 shows a TEM image of the ZSM-5/β core-shell molecular sieve obtained in Example I-1 of the present application.

FIG. 4 shows a TEM image of the ZSM-5/β core-shell molecular sieve obtained in Example I-1, and from the TEM it can be observed that the shell β molecular sieve has grown while attaching to the core, and finally becomes the core-shell molecular sieve.

Figure 5:
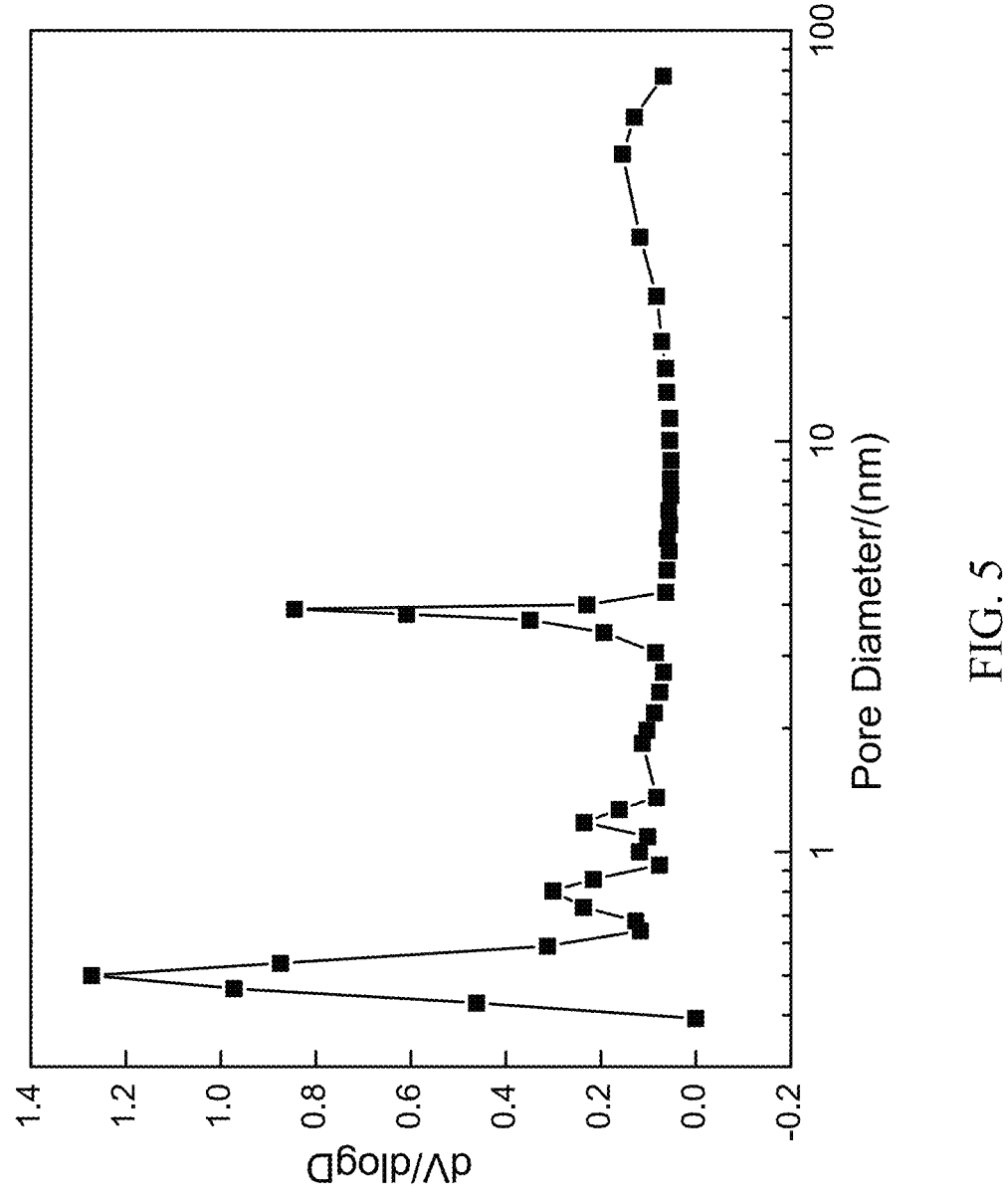
FIG. 5 shows the pore diameter distribution of the ZSM-5/β core-shell molecular sieve obtained in Example I-1 of the present application.

FIG. 5 shows the pore diameter distribution diagram of the ZSM-5/β core-shell molecular sieve obtained in Example I-1, and it is proved by the pore diameter distribution curve that the core-shell molecular sieve has a hierarchical pore structure, i.e. a micro-meso-macro pore structure.

Comparative Example I-1

(1) water glass, aluminum sulfate and aqueous ethylamine solution were used as starting materials, and mixed at a molar ratio of $SiO_2:Al_2O_3:C_2H_5NH_2:H_2O=40:1:10:1792$ and gelatinized, crystallized at 140° C. for 3 days, to obtain a large-grain cylindrical ZSM-5 molecular sieve (with a grain size of 4.0 μm);

(2) the large-grain cylindrical ZSM-5 molecular sieve obtained was pre-treated for 30 min with a sodium chloride salt solution (with a NaCl concentration of 5 wt %) comprising 0.5 wt % of methyl methacrylate, filtered, dried, and added into a β molecular sieve suspension (a nano β molecular sieve, the mass ratio of the ZSM-5 molecular sieve to the β molecular sieve suspension being 1:10) dispersed with deionized water to 0.5 wt % , adhered for 30 min, filtered, dried, and calcined for 5 h at 540° C. to obtain a core molecular sieve;

(3) silica white and tetraethoxysilane (TEOS) were used as a silicon source, sodium aluminate and tetraethyl ammonium hydroxide (TEAOH) were used as a starting material, they were added at a ratio of TEAOH:$SiO_2$:$Al_2O_3$:$H_2O$=13:30:1:1500, the core molecular sieve obtained in step 2) was added, and then charged into a stainless steel kettle with a tetrafluoroethylene lining for crystallization at 140° C. for 54 hours;

(4) after crystallization, the resultant was filtered, washed, dried, and calcined at 550° C. for 4 hours, to obtain the core-shell molecular sieve.

Comparative Example I-2

A molecular sieve was synthesized as described in Example I-1, except that, in step (3), the crystallization temperature was 30° C. and the crystallization time was 3 hours, and after a sample of the crystallized product was filtered, washed, dried and calcined, it can be observed that there was no peak at 2θ=22.4° and no peak at 2θ=21.2° in the XRD pattern.

Comparative Example I-3

ZSM-5 and the β molecular sieve used in steps (1) and (2) of Example I-1 were mechanically mixed according to the mixture ratio of Example I-1 to obtain a molecular sieve mixture.

Comparative Examples I-4

A molecular sieve was synthesized as described in Example I-1, except that, in step (3), the crystallization temperature was 180° C. and the crystallization time was 120 hours, and after a sample of the crystallized product was filtered, washed, dried and calcined, it can be observed that there was a peak at 2θ=22.4° and a peak at 2θ=21.2° in the XRD pattern.

Comparative Examples I-5

A molecular sieve was synthesized as described in Example I-1, except that step (2) was not employed, and the product ZSM-5 molecular sieve material I of step (1) was directly used in step (4) in place of the ZSM-5 molecular sieve material II.

In Comparative Examples I-4 and 1-5, no core-shell molecular sieve was obtained.

Example I-2

(1) 5.0 g of a hydrogen-type ZSM-5 molecular sieve (with a silica-alumina ratio of 60, an average grain size of 0.5 μm, an average particle size of 10 μm and a crystallinity of 90.0%) was added into 50.0 g of an aqueous solution of polydiallyldimethylammonium chloride and sodium chloride (with the content by mass of the polydiallyldimethylammonium chloride in the solution being 0.2% and the content by mass of the sodium chloride being 0.2%) at room temperature (25° C.), stirred for 2 h, and filtered, and the resulting filter cake was dried at 50° C. in an air atmosphere to obtain a ZSM-5 molecular sieve material I;

(2) the ZSM-5 molecular sieve material I was added into a hydrogen-type β molecular sieve suspension (the concentration of the β molecular sieve in the β molecular sieve suspension is 2.5 wt %, the β molecular sieve has an average grain size of 0.1 μm, a silica-alumina ratio of 30.0, and a crystallinity of 92.0%); the ZSM-5 molecular sieve material I and the β molecular sieve suspension were stirred for 2 hours at 50° C. at a mass ratio of 1:45, filtered and dried in an air atmosphere at 90° C. to obtain a ZSM-5 molecular sieve material II;

(3) 2.0 g of aluminum sol (with a $Al_2O_3$ concentration of 25 wt %, and an aluminum-chlorine molar ratio of 1.1) was dissolved in 5.0 g of deionized water, 0.3 g of NaOH particles were added, then 45.0 mL of water glass (with a $SiO_2$ concentration of 251 g/L, and a modulus of 2.5) and 16 g of tetraethylammonium hydroxide solution (with the concentration by mass of the tetraethylammonium hydroxide solution being 25%) were added sequentially, fully and uniformly stirred, then transferred into a reaction kettle with a polytetrafluoroethylene lining for crystallization, and crystallized at 150° C. for 10 hours to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II to the pre-crystallized synthesis liquid III of 1:10, and then crystallized for 80 h at 130° C. After crystallization, the resultant was filtered, washed, dried, and calcined at 550° C. for 4 hours, to obtain a sodium-type ZSM-5/β core-shell molecular sieve.

Example I-3

(1) At room temperature (25° C.), a hydrogen-type ZSM-5 molecular sieve (with a silica-alumina ratio of 100, an average grain size of 100 nm, an average particle size of 5.0 microns, a crystallinity of 91.0%, and an amount of 5.0 g) was added as a core material into 50.0 g of an aqueous solution of n-butylamine and sodium chloride (the content by mass of the n-butylamine is 5.0%, and the content by mass of the sodium chloride is 2%), stirred for 24 hours, filtered, and dried at 70° C. in an air atmosphere to obtain a ZSM-5 molecular sieve material I;

(2) the ZSM-5 molecular sieve material I was added into a hydrogen-type β molecular sieve suspension (the concentration by weight of the β molecular sieve in the β molecular sieve suspension is 5.0 wt %, the β molecular sieve has an average grain size of 50 nm, a silica-alumina ratio of 30.0, and a crystallinity of 95.0%), wherein the mass ratio of the ZSM-5 molecular sieve material I to the β molecular sieve suspension is 1:20, stirred for 10 hours at 50° C., filtered, and the resulting filter cake was dried in an air atmosphere at a temperature of 120° C. to obtain a ZSM-5 molecular sieve material II;

(3) 1.0 g of sodium metaaluminate was dissolved in 18.0 g of deionized water, 0.60 g of NaOH particles was added, then 10.0 g of coarse silica gel (with a $SiO_2$ content of 98.0 wt %) and 18 g of tetraethylammonium bromide solution (the mass fraction of the tetraethylammonium bromide solution is 25%) was added sequentially, stirred uniformly, transferred into a reaction kettle with a polytetrafluoroethylene lining for crystallization, and crystallized at 130° C. for 30 hours to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:4, and crystallized for 100 hours at 80° C. After crystallization, the resultant was filtered, washed, dried, and calcined at 550° C. for 4 hours, to obtain a sodium-type ZSM-5/β core-shell molecular sieve.

Example I-4

(1) a hydrogen-type ZSM-5 molecular sieve (with a silica-alumina ratio of 200, an average crystal grain size of 5.0 μm, an average particle size of 25 μm, a crystallinity of 92.0%, and an amount of 5.0 g) was added as a core material into 50.0 g of a sodium chloride salt solution (with a sodium chloride concentration of 1 wt %) having a content by mass of dipicolinic acid of 1.0% at 25° C., stirred for 10 hours, filtered, and the resulting filter cake was dried at 30° C. in an air atmosphere to obtain a ZSM-5 molecular sieve material I;

(2) the ZSM-5 molecular sieve material I was added into a β molecular sieve suspension (the concentration by weight of the β molecular sieve in the β molecular sieve suspension is 4.0 wt %, hydrogen-type β molecular sieve, with an average grain size of 0.5 μm, a silica-alumina ratio of 30, and a crystallinity of 90.0%), wherein the mass ratio of the ZSM-5 molecular sieve material I to the β molecular sieve suspension is 1:15, stirred for 24 hours at 50° C., filtered, and the resulting filter cake was dried in an air atmosphere at 140° C. to obtain a molecular sieve II;

(3) 9.0 g of aluminum sulfate was dissolved in 150.0 g of deionized water, 2.4 g of NaOH particles were added, then 30.0 g of silica white and 42.0 g of sodium carboxymethylcellulose (CAS number: 9004-32-4) were adding sequentially, uniformly stirred, then transferred into a reaction kettle with a polytetrafluoroethylene lining for crystallization, and crystallized at 150° C. for 12 hours to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the molecular sieve II was added into the pre-crystallized synthesis liquid III at a weight ratio of the ZSM-5 molecular sieve material II, on a dry basis, to the pre-crystallized synthesis liquid III of 1:8, and crystallized at 150° C. for 50 h. After crystallization, the resultant was filtered, washed, dried, and calcined at 550° C. for 4 hours, to obtain a sodium-type ZSM-5/β core-shell molecular sieve.

Examples I-5

A molecular sieve was synthesized as described in Example I-1, except that the ZSM-5 molecular sieve obtained in step (1) of Comparative Example I-1 was used as the core molecular sieve.

TABLE I-1

Synthesis conditions used and properties of molecular sieves obtained in each example and comparative example

| Example No. | Ex. I-1 | Comp. Ex. I-1 | Comp. Ex. I-2 | Comp. Ex. I-3 | Comp. Ex. I-4 | Comp. Ex. I-5 | Ex. I-2 | Ex. I-3 | Ex. I-4 | Ex. I-5 |
|---|---|---|---|---|---|---|---|---|---|---|
| Average particle size of ZSM-5 molecular sieve, μm | 15 | 4 | 15 | 15 | 15 | 15 | 10 | 5 | 25 | 4 |
| Average particle size of β molecular sieve, μm | 0.2 | 0.02 | 0.2 | 0.2 | 0.2 | Not adhered | 0.1 | 0.05 | 0.5 | 0.2 |
| Average grain size of β molecular sieve, μm | 0.2 | 0.02 | 0.2 | 0.2 | 0.2 | — | 0.1 | 0.05 | 0.5 | 0.2 |
| Mixture ratio of the β molecular sieve synthesis liquid:the molar ratio of R:$SiO_2$:$Al_2O_3$:$H_2O$ | 5:34:1:858 | 13:30:1:1500 | 5:34:1:858 | | | Same as Ex. 1 | 4:38:1:670 | 5:35:1:373 | 6:34:1:787 | 5:34:1:858 |
| Crystallization temperature of step 3), ° C. | 80 | — | 30 | — | 180 | 80 | 150 | 130 | 150 | 80 |
| Crystallization time of step 3), h | 48 | — | 3 | — | 120 | 48 | 10 | 30 | 12 | 48 |
| Diffraction peak at 2θ = 22.4° of the product of step 3) | Yes | — | No | — | Yes | Yes | Yes | Yes | Yes | Yes |
| Diffraction peak at 2θ = 21.2° of the product of step 3) | No | — | No | — | Yes | No | No | No | No | No |
| The weight ratio of the ZSM-5 molecular sieve material II to the pre-crystallized synthesis liquid III | 1:10 | — | 1:10 | — | 1:10 | 1:10* | 1:10 | 1:4 | 1:8 | 1:10 |

TABLE I-1-continued

Synthesis conditions used and properties of molecular sieves obtained in each example and comparative example

| Example No. | Ex. I-1 | Comp. Ex. I-1 | Comp. Ex. I-2 | Comp. Ex. I-3 | Comp. Ex. I-4 | Comp. Ex. I-5 | Ex. I-2 | Ex. I-3 | Ex. I-4 | Ex. I-5 |
|---|---|---|---|---|---|---|---|---|---|---|
| Crystallization temperature of step 4), ° C. | 120 | — | 120 | — | 120 | 120 | 130 | 80 | 150 | 120 |
| Crystallization time of step 4), h | 60 | — | 60 | — | 60 | 60 | 80 | 100 | 50 | 60 |
| D1/D2** | 2:3 | 0.01:1 | 1:5 | 1:6 | 1:8 | 1:8 | 4:1 | 1:1 | 1:4 | 1:7 |
| Mass ratio of core to shell | 15:1 | 80:1 | 10:1 | | — | — | 1:5 | 1:1 | 10:1 | 9:1 |
| Total specific surface area, $m^2/g$ | 533 | 398 | 476 | 425 | 486 | 467 | 547 | 525 | 504 | 496 |
| The proportion of the specific surface area of mesopores to the total specific surface area, % | 35 | 45 | 8.0 | 5.3 | 7.6 | 9.4 | 25 | 30 | 17 | 24 |
| Average grain size of shell molecular sieve, μm | 0.2 | 0.02 | 0.1 | — | — | — | 0.05 | 0.2 | 0.5 | 0.1 |
| Average grain size of core molecular sieve, μm | 1.2 | 4 | 1.2 | — | — | — | 0.5 | 0.1 | 5 | 4 |
| Thickness of shell, μm | 0.5 | 0.06 | 0.1 | — | | | 0.05 | 0.2 | 2 | 0.5 |
| Silica-alumina ratio of core molecular sieve | 30 | 30 | 30 | — | 30 | 30 | 60 | 100 | 200 | 30 |
| Silica-alumina ratio of shell molecular sieve | 30 | 31 | 30 | — | 30 | 30 | 34 | 32 | 33 | 30 |
| Shell coverage, % | 100 | 75 | 30 | — | — | — | 100 | 80 | 90 | 85 |
| Number of crystal grains of core ZSM-5 molecular sieve | >1 | 1 | >1 | — | — | — | >1 | >1 | >1 | 1 |
| Pore volume, mL/g | 0.371 | 0.201 | 0.255 | 0.105 | 0.164 | 0.150 | 0.377 | 0.368 | 0.358 | 0.398 |
| Pore diameter distribution, % | | | | | | | | | | |
| Proportion of the pore volume of pores with a diameter of 0.3-0.6 nm | 70 | 80 | 91 | 92 | 89 | 91 | 72 | 76 | 80 | 41 |
| Proportion of the pore volume of pores with a diameter of 0.7-1.5 nm | 5 | 10 | 4 | 5 | 5 | 5 | 3 | 5 | 7 | 7 |
| Proportion of the pore volume of pores with a diameter of 2-4 nm | 10 | 8 | 3 | 2.9 | 3 | 1 | 9 | 8 | 5 | 45 |
| Proportion of the pore volume of pores with a diameter of 20-80 nm | 15 | 2 | 2 | 0.1 | 3 | 3 | 16 | 11 | 8 | 7 |

*In Comparative Example 5, it refers to the weight ratio of the ZSM-5 molecular sieve material I to the pre-crystallized synthesis liquid III;
**D1/D2 in the table refers to the ratio of the height of the diffraction peak at $2\theta = 22.4°$ to the height of the diffraction peak at $2\theta = 23.1°$ in the X-ray diffraction pattern of the molecular sieve product (same below).

Evaluation Through Reaction

The ZSM-5/β core-shell molecular sieves obtained in Examples I-1 to I-5 above and samples of the molecular sieves obtained in each Comparative Example were subjected to ammonium exchange to reduce the sodium oxide content to a level of less than 0.1 wt %, to obtain a hydrogen-type molecular sieve, the ammonium exchange conditions included: molecular sieve:ammonium chloride: $H_2O=1:0.5:10$, an ammonium exchange temperature of 85° C., an ammonium exchange time of 1 h. After ammonium exchange, the resultant was filtered, washed, dried, and then calcined for 2 h at 550° C.

The hydrogen-type molecular sieve obtained above was subjected to aging under 100% steam at 800° C. for 4 hours, and the aged sample was evaluated on a fixed bed microreactor ACE-MODEL FB (according the standard methods of ASTM D5154 and D7964). The feedstock oil was a hydro-upgraded heavy oil (composition and physical properties are shown in Table I-2), and the evaluation conditions included: a reaction temperature of 550° C., a reaction pressure of 0.1 Mpa, a catalyst-to-oil ratio (by weight) of 3, an oil-feeding time of 150 seconds, and the evaluation results are shown in Table I-3.

TABLE I-2

Composition and properties of feedstock oil

| Properties | Hydro-upgraded heavy oil |
|---|---|
| Density (20° C.)/(kg/$m^3$) | 890.0 |
| Sulfur/(μg/g) | <200 |
| Ni + V/(μg/g) | <1 |
| Content of hydrogen/% | 12.90 |
| Cycloalkane content/% | 44.67% |
| End boiling point | 630° C. |

TABLE I-3

| | | Comp. | Comp. | Comp. | Comp. | Comp. | | | Ex. I- | Ex. |
|---|---|---|---|---|---|---|---|---|---|---|
| Example No. | Ex. I-1 | Ex. I-1 | Ex. I-2 | Ex. I-3 | Ex. I-4 | Ex. I-5 | Ex. I-2 | Ex. I-3 | 4 | I-5 |
| | | | | Product distribution/wt % | | | | | | |
| H$_2$-C$_2$ (excluding ethylene) | 3.34 | 1.98 | 2.07 | 2.01 | 2.06 | 2.04 | 3.45 | 3.14 | 3.99 | 2.98 |
| Ethylene | 7.21 | 4.85 | 5.18 | 4.21 | 4.34 | 4.25 | 7.04 | 6.87 | 6.85 | 6.32 |
| C$_3$-C$_4$ (excluding propylene) | 7.15 | 4.87 | 5.18 | 5.08 | 5.46 | 4.36 | 7.06 | 6.74 | 6.06 | 6.89 |
| Propylene | 8.04 | 5.98 | 6.35 | 6.07 | 6.14 | 6.07 | 8.24 | 7.65 | 7.53 | 7.04 |
| Gasoline | 13.06 | 10.28 | 11.15 | 11.56 | 10.44 | 10.78 | 13.84 | 12.25 | 11.23 | 11.54 |
| Diesel oil | 11.78 | 11.89 | 10.44 | 10.49 | 11.12 | 11.07 | 11.38 | 11.57 | 12.47 | 12.02 |
| Heavy oil | 48.69 | 59.75 | 59.04 | 60.13 | 59.92 | 60.94 | 47.89 | 51.05 | 51.18 | 52.54 |
| Coke | 0.73 | 0.40 | 0.59 | 0.45 | 0.52 | 0.49 | 0.98 | 0.73 | 0.69 | 0.67 |

As can be seen from Table I-3, the core-shell molecular sieve of the present application can provide a higher yield of propylene, as well as a higher yield of ethylene, an improved conversion of heavy oil, and a significantly improved yield of liquefied gas (C3-C4), as compared to the molecular sieves of the comparative examples.

II. Preparation and Evaluation of the Catalysts of the First Type of Embodiments (Hydrogenated VGO Catalytic Cracking Catalysts)

Example II-1

(1) 500 g of a hydrogen-type ZSM-5 molecular sieve (with a silica-alumina ratio of 30, an average grain size of 1.2 an average particle size of the ZSM-5 molecular sieve of 15 μm and a crystallinity of 93.0%) was added as a core material into 5000 g of an aqueous solution of methyl methacrylate and sodium chloride (with the concentration by mass of the methyl methacrylate being 0.2% and the concentration by mass of the sodium chloride being 5.0%) at room temperature (25° C.), stirred for 1 h, filtered, and dried at 50° C. in an air atmosphere to obtain a ZSM-5 molecular sieve material I;

(2) the ZSM-5 molecular sieve material I was added into a β molecular sieve suspension (a suspension formed by a hydrogen-type β molecular sieve and water, wherein the concentration by weight of the β molecular sieve in the β molecular sieve suspension is 0.3 wt %, the β molecular sieve has an average grain size of 0.2 micron, a silica-alumina ratio of 30, and a crystallinity of 89%, and the particles of the β molecular sieve are particles composed of a single crystal grain), at a mass ratio of the ZSM-5 molecular sieve material I to the β molecular sieve suspension of 1:10, stirred for 1 hour at a temperature of 50° C., filtered, and the resulting filter cake was dried in an air atmosphere at a temperature of 90° C. to obtain a ZSM-5 molecular sieve material II;

(3) 100.0 g of aluminum isopropoxide was dissolved in 1500 g of deionized water, 65 g of NaOH particles were added, then 1000 g of silica sol (with a SiO$_2$ content of 25.0 wt %, a pH value of 10.0 and a sodium oxide content of 0.10%) and 2000 g of tetraethylammonium hydroxide solution (the concentration of tetraethylammonium hydroxide in the tetraethylammonium hydroxide solution being 25 wt %) were added sequentially, uniformly stirred, then transferred into a reaction kettle with a polytetrafluoroethylene lining for crystallization, and crystallized at 80° C. for 48 hours to obtain a pre-crystallized synthetic solution III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II to the pre-crystallized synthesis liquid III of 1:10, crystallized at 120° C. for 60 hours, filtered, washed, dried and calcined at 550° C. for 4 hours after the completion of the crystallization, to obtain a sodium-type ZSM-5/β core-shell molecular sieve;

(5) the resulting sodium-type ZSM-5/β core-shell molecular sieve was subjected to exchanging with NH$_4$C solution and washing to reduce the content of Na$_2$O to a level of less than 0.15 wt %, filtered, dried, and calcined at 550° C. for 4 hours, to obtain a hydrogen-type core-shell molecular sieve, designated as SZ-II-1.

Example II-2

(1) 500 g of a hydrogen-type ZSM-5 molecular sieve (with a silica-alumina ratio of 60, an average grain size of 0.5 μm, an average particle size of 10 μm and a crystallinity of 90.0%) was added into 5000 g of an aqueous solution of polydiallyldimethylammonium chloride and sodium chloride (with the content by mass of the polydiallyldimethylammonium chloride in the solution being 0.2% and the content by mass of the sodium chloride being 0.2%) at room temperature (25° C.), stirred for 2 hours, filtered, and the resulting filter cake was dried at 50° C. in an air atmosphere to obtain a ZSM-5 molecular sieve material I;

(2) the ZSM-5 molecular sieve material I was added into a hydrogen-type β molecular sieve suspension (the concentration of the β molecular sieve in the β molecular sieve suspension is 2.5 wt %, the β molecular sieve has an average grain size of 0.1 μm, a silica-alumina ratio of 30.0, and a crystallinity of 92.0%); the ZSM-5 molecular sieve material I and the β molecular sieve suspension were stirred for 2 hours at 50° C. at a mass ratio of 1:45, filtered and dried in an air atmosphere at 90° C. to obtain a ZSM-5 molecular sieve material II;

(3) 200.0 g of aluminum sol (with the concentration of $Al_2O_3$ being 25 wt %, the aluminum-chlorine molar ratio being 1.1) was dissolved in 500 g of deionized water, 30 g of NaOH particles were added, 4500 mL of water glass (with a $SiO_2$ concentration of 251 g/L, a modulus of 2.5) and 1600 g of tetraethylammonium hydroxide solution (with the concentration by mass of the tetraethylammonium hydroxide solution being 25%) were added sequentially, fully and uniformly stirred, then transferred into a reaction kettle with a polytetrafluoroethylene lining for crystallization, crystallized for 10 hours at 150° C. to obtain a pre-crystallized synthesis liquid III; after a sample of the pre-crystallized synthesis liquid III was filtered, washed, dried and calcined, it can be observed that there was a peak at $2\theta=22.4°$ and no peak at $2\theta=21.2°$ in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:10, then crystallized for 80 hours at 130° C., filtered, washed, dried, and calcined for 4 hours at 550° C. to obtain a sodium-type ZSM-5/β core-shell molecular sieve;

(5) the sodium-type ZSM-5/β core-shell molecular sieve was subjected to exchanging with $NH_4Cl$ solution and washing to reduce the content of $Na_2O$ to a level of less than 0.15 wt %, filtered, dried, and calcined at 550° C. for 4 hours, to obtain a hydrogen-type core-shell molecular sieve, designated as SZ-II-2.

Example II-3

(1) At room temperature (25° C.), 500 g of a hydrogen-type ZSM-5 molecular sieve (with a silica-alumina ratio of 100, an average grain size of 100 nm, an average particle size of 5.0 micron, a crystallinity of 91.0%) was added as a core material into 5000 g of an aqueous solution of n-butylamine and sodium chloride (with a concentration by mass of n-butylamine of 5.0%, a concentration by mass of sodium chloride of 2%), stirred for 24 h, filtered and dried at 70° C. in an air atmosphere to obtain a ZSM-5 molecular sieve material I;

(2) the ZSM-5 molecular sieve material I was added into a hydrogen-type β molecular sieve suspension (the concentration by weight of the β molecular sieve in the β molecular sieve suspension is 5.0 wt %, the β molecular sieve has an average grain size of 50 nm, a silica-alumina ratio of 30.0, and a crystallinity of 95.0%) at a mass ratio of the ZSM-5 molecular sieve material I to the β molecular sieve suspension of 1:20, stirred for 10 hours at 50° C., filtered, and the resulting filter cake was dried in an air atmosphere at a temperature of 120° C. to obtain a ZSM-5 molecular sieve material II;

(3) 100 g of sodium metaaluminate was dissolved in 1800 g of deionized water, 60 g of NaOH particles were added, then 1000 g of coarse silica gel ($SiO_2$ content: 98.0 wt %) and 1800 g of tetraethylammonium bromide solution (with the concentration by mass of the tetraethylammonium bromide solution being 25%) were added sequentially, stirred uniformly, transferred into a reaction kettle with a polytetrafluoroethylene lining for crystallization, and crystallized at 130° C. for 30 hours to obtain a pre-crystallized synthesis liquid III; after a sample of the pre-crystallized synthesis liquid III was filtered, washed, dried and calcined, it can be observed that there was a peak at $2\theta=22.4°$ and no peak at $2\theta=21.2°$ in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:4, crystallized for 100 hours at 80° C., filtered, washed, dried, and calcined for 4 hours at 550° C. to obtain a sodium-type ZSM-5/β core-shell molecular sieve;

(5) the sodium-type ZSM-5/β core-shell molecular sieve was subjected to exchanging with $NH_4Cl$ solution and washing to reduce the content of $Na_2O$ to a level of less than 0.15 wt %, filtered, dried, and calcined at 550° C. for 4 hours, to obtain a hydrogen-type core-shell molecular sieve, designated as SZ-II-3.

Comparative Example II-1

(1) water glass, aluminum sulfate and aqueous ethylamine solution were used as starting materials, and mixed at a molar ratio of $SiO_2$:$Al_2O_3$:$C_2H_5NH_2$:$H_2O$=40:1:10:1792 and gelatinized, crystallized at 140° C. for 3 days, to obtain a large-grain cylindrical ZSM-5 molecular sieve (with a grain size of 4.0 μm);

(2) the large-grain cylindrical ZSM-5 molecular sieve obtained was pre-treated for 30 min with a sodium chloride salt solution (with a NaCl concentration of 5 wt %) comprising 0.5 wt % of methyl methacrylate, filtered, dried, and added into a β molecular sieve suspension (a nano β molecular sieve, the mass ratio of the ZSM-5 molecular sieve to the β molecular sieve suspension being 1:10) dispersed with deionized water to 0.5 wt %, adhered for 30 min, filtered, dried, and calcined for 5 h at 540° C. to obtain a core molecular sieve;

(3) silica white and tetraethoxysilane (TEOS) were used as a silicon source, sodium aluminate and TEAOH were used as starting materials, they were added into the core molecular sieve obtained in step 2) at a ratio of TEAOH:$SiO_2$:$Al_2O_3$:$H_2O$=13:30:1:1500, and then charged into a stainless steel kettle with a tetrafluoro-ethylene lining for crystallization at 140° C. for 54 hours;

(4) after the completion of crystallization, the resultant was filtered, washed, dried and calcined for 4 hours at 550° C. to obtain a sodium-type core-shell molecular sieve; and (5) the resulting sodium-type core-shell molecular sieve was subjected to exchanging with $NH_4Cl$ solution and washing to reduce the content of $Na_2O$ to a level of less than 0.15 wt %, filtered, dried, and calcined at 550° C. for 2 hours to obtain a hydrogen-type core-shell molecular sieve, designated as DZ-II-1.

Comparative Example II-2

A molecular sieve was synthesized as described in Example II-1, except that, in step (3), the crystallization temperature was 30° C. and the crystallization time was 3 hours, and after a sample of the crystallized product was filtered, washed, dried and calcined, it can be observed that there was no peak at $2\theta=22.4°$ and no peak at $2\theta=21.2°$ in the XRD pattern. The molecular sieve obtained was designated as DZ-II-2.

Comparative Example II-3

The ZSM-5 molecular sieve and β molecular sieve used in steps (1) and (2) of Example II-1 were mechanically mixed according to the mixture ratio of Example II-1, and the resulting molecular sieve mixture was designated as DZ-II-3.

The following examples and comparative examples are provided to illustrate the preparation of catalysts according to the first type of embodiments provided herein, wherein the kaolin used is a commercial product from China Kaolin Clay Co. Ltd., having a solid content of 75 wt %; the pseudo-boehmite (boehmite for short) is available from Shandong Aluminum Corporation, having an alumina con-

TABLE II-1

Synthesis conditions used and properties of molecular sieves obtained in each example and comparative example

| Example No. | Ex. II-1 | Comp. Ex. II-1 | Comp. Ex. II-2 | Comp. Ex. II-3 | Ex. II-2 | Ex. II-3 |
|---|---|---|---|---|---|---|
| Average particle size of ZSM-5 molecular sieve, μm | 15 | 4 | 15 | 15 | 10 | 5 |
| Average particle size of β molecular sieve, μm | 0.2 | 0.02 | 0.2 | 0.2 | 0.1 | 0.05 |
| Average grain size of β molecular sieve, μm | 0.2 | 0.02 | 0.2 | 0.2 | 0.1 | 0.05 |
| Mixture ratio of the β molecular sieve synthesis liquid:the molar ratio of $R:SiO_2:Al_2O_3:H_2O$ | 5:34:1:858 | 13:30:1:1500 | 5:34:1:858 | | 4:38:1:670 | 5:35:1:373 |
| Crystallization temperature of step 3), ° C. | 80 | — | 30 | — | 150 | 130 |
| Crystallization time of step 3), h | 48 | — | 3 | — | 10 | 30 |
| Diffraction peak at $2\theta = 22.4°$ of the product of step 3) | Yes | — | No | — | Yes | Yes |
| Diffraction peak at $2\theta = 21.2°$ of the product of step 3) | No | — | No | — | No | No |
| The weight ratio of the ZSM-5 molecular sieve material II to the pre-crystallized synthesis liquid III | 1:10 | — | 1:10 | — | 1:10 | 1:4 |
| Crystallization temperature of step 4), ° C. | 120 | | 120 | | 130 | 80 |
| Crystallization time of step 4), h | 60 | | 60 | | 80 | 100 |
| D1/D2 | 2:3 | 0.01:1 | 1:5 | 1:6 | 4:1 | 1:1 |
| Mass ratio of core to shell | 15:1 | 80:1 | 10:1 | | 1:5 | 1:1 |
| Total specific surface area, $m^2/g$ | 533 | 398 | 476 | 425 | 547 | 525 |
| The proportion of the specific surface area of mesopores to the total specific surface area, % | 35 | 45 | 8.0 | 5.3 | 25 | 30 |
| Average grain size of shell molecular sieve, μm | 0.2 | 0.02 | 0.1 | — | 0.05 | 0.2 |
| Average grain size of core molecular sieve, μm | 1.2 | 4 | 1.2 | — | 0.5 | 0.1 |
| Thickness of shell, μm | 0.5 | 0.06 | 0.1 | — | 0.05 | 0.2 |
| Silica-alumina ratio of core molecular sieve | 30 | 30 | 30 | — | 60 | 100 |
| Silica-alumina ratio of shell molecular sieve | 30 | 31 | 30 | — | 34 | 32 |
| Shell coverage, % | 100 | 75 | 30 | — | 100 | 80 |
| Number of crystal grains of core ZSM-5 molecular sieve | >1 | 1 | >1 | — | >1 | >1 |
| Pore volume, mL/g | 0.371 | 0.201 | 0.255 | 0.105 | 0.377 | 0.368 |
| Pore diameter distribution, % | | | | | | |
| Proportion of the pore volume of pores with a diameter of 0.3-0.6 nm | 70 | 80 | 91 | 92 | 72 | 76 |
| Proportion of the pore volume of pores with a diameter of 0.7-1.5 nm | 5 | 10 | 4 | 5 | 3 | 5 |
| Proportion of the pore volume of pores with a diameter of 2-4 nm | 10 | 8 | 3 | 2.9 | 9 | 8 |
| Proportion of the pore volume of pores with a diameter of 20-80 nm | 15 | 2 | 2 | 0.1 | 16 | 11 |

55 tent of 65 wt %; the alumina sol is available from Qilu Branch of Sinopec Catalyst Co. Ltd., having an alumina content of 21 wt %.

Examples II-4 to II-6

Catalysts were prepared using the core-shell molecular sieves obtained in Examples II-1 to II-3, respectively, and designated as A-II-1, A-II-2 and A-II-3. The method for preparing the catalyst was as follows:

(1) pseudo-boehmite was uniformly mixed with water, concentrated hydrochloric acid (chemically pure, product of Beijing Chemical Plant) with a concentration of 36 wt % was added under stirring, at an acid-to-aluminum ratio of 0.2 (i.e. the weight ratio of the 36 wt % hydrochloric acid to pseudo-boehmite (calculated as $Al_2O_3$)), the resulting mixture was heated to 70° C. and aged for 1.5 hours to obtain an aged pseudo-boehmite slurry, having an alumina content of 12 wt %;

56

II-4 for preparing the catalyst. The catalysts obtained are designated as DB-II-1, DB-II-2 and DB-II-3.

Table II-2 shows the type and amount of the molecular sieve used in each example and comparative example, and the amounts of the aluminum sol, pseudo-boehmite, modified silica sol and kaolin clay used on a dry basis, per 1 Kg of catalyst obtained. The rare earth content of the modified silica sol is a content by weight calculated as $RE_2O_3$ and based on the amount of silica.

Table II-3 shows the composition of each of the catalysts A-II-1 to A-II-3 obtained in the example and the catalysts DB-II-1 to DB-II-3 obtained in the comparative example, expressed by weight percentage on a dry basis. The contents of the molecular sieve, the boehmite, the aluminum sol, the silica sol and the kaolin in the catalyst are calculated based on the amounts of corresponding starting materials used in the preparation.

TABLE II-2

Amounts of components used in each example and comparative example

| | | | | | (Modified) silica Sol | | Molecular sieves | |
| Example No. | Catalyst No. | Kaolin, kg | Boehmite, kg | Aluminum sol, kg | Amount, kg | Rare earth content | Type | Amount, kg |
|---|---|---|---|---|---|---|---|---|
| Ex. II-4 | A-II-1 | 0.38 | 0.10 | 0.05 | 0.10 | 10 | SZ-II-1 | 0.37 |
| Ex. II-5 | A-II-2 | 0.50 | 0.10 | 0.05 | 0.10 | 15 | SZ-II-2 | 0.25 |
| Ex. II-6 | A-II-3 | 0.50 | 0.10 | 0.10 | 0.10 | 5 | SZ-II-3 | 0.15 |
| Comp. Ex. II-4 | DB-II-1 | 0.38 | 0.10 | 0.05 | 0.10 | 0 | DZ-II-1 | 0.37 |
| Comp. Ex. II-5 | DB-II-2 | 0.38 | 0.10 | 0.05 | 0.10 | 0 | DZ-II-2 | 0.37 |
| Comp. Ex. II-6 | DB-II-3 | 0.38 | 0.10 | 0.05 | 0.10 | 0 | DZ-II-3 | 0.37 |

(2) silica sol (with a pH of 3, a $SiO_2$ content of 25%, available from Beijing Chemical Plant) was taken, rare earth chloride (with the weight ratio of La to Ce being 2:3, and the total content of La and Ce accounts being 98 wt %) was added thereto, stirred for 20 minutes, to obtain a modified silica sol; in the silica sols obtained in Examples II-4 to II-6, the rare earth content is 10 wt %, 15 wt % and 5 wt %, respectively, calculated as $RE_2O_3$ and based on the weight of $SiO_2$;

(3) the core-shell molecular sieve was mixed with the modified silica sol, and stirred for 30 minutes to obtain a slurry;

(4) the aluminum sol, the slurry obtained in step (3), kaolin, the aged pseudo-boehmite slurry and deionized water were mixed, stirred for 30 minutes to obtain a slurry with a solid content of 25 wt %, and spray dried to obtain catalyst microspheres;

(5) the resultant was subjected to ammonium exchange at a weight ratio of the catalyst microspheres:ammonium salt:$H_2O$=1:1:10 for 1 h at 80° C., filtered, then subjected to the exchanging and filtering process for one more time, and dried to obtain the target catalyst.

Comparative Examples II-4 to II-6

Comparative Examples II-4 to II-6 illustrate the catalysts prepared using the molecular sieves obtained in Comparative Examples II-1 to II-3.

The molecular sieves obtained in Comparative Examples II-1 to II-3 were mixed with the aged pseudo-boehmite slurry, kaolin, water, modified silica sol and alumina sol, respectively, and spray dried to obtain a microspherical catalyst according to the method as described in Example

TABLE II-3

Composition of the catalyst of each example and comparative example

| Example No. | Catalyst No. | Core-shell molecular sieve, wt % | Kao-lin, wt % | Boehm-ite, wt % | Aluminum sol, wt % | Modified silica sol, wt % |
|---|---|---|---|---|---|---|
| Ex. II-4 | A-II-1 | 37% | 38% | 10% | 5% | 10% |
| Ex. II-5 | A-II-2 | 25% | 50% | 10% | 5% | 10% |
| Ex. II-6 | A-II-3 | 15% | 50% | 10% | 10% | 15% |
| Comp. Ex. II-4 | DB-II-1 | 37% | 38% | 10% | 5% | 10% |
| Comp. Ex. II-5 | DB-II-2 | 37% | 38% | 10% | 5% | 10% |
| Comp. Ex. II-6* | DB-II-3 | 37% | 38% | 10% | 5% | 10% |

*Core-shell molecular sieve content of Comparative Example 3 actually refers to the content of the molecular sieve mixture.

Evaluation Through Reaction

After the catalysts of the examples and the comparative examples were aged for 17 hours at 800° C. under 100 vol % steam, the performance of the catalysts for catalytic cracking of hydrogenated VGO was evaluated on a small fixed fluidized bed reactor, and the evaluation conditions included: a reaction temperature of 520° C., a weight space velocity of 4.0 h$^{-1}$, and a catalyst-to-oil ratio of 8 (weight ratio). The properties of the hydrogenated VGO used are shown in Table II-4, and the evaluation results are shown in Table II-5.

TABLE II-4

| Properties of hydrogenated VGO | |
| --- | --- |
| Properties | Hydrogenated VGO |
| Density at 20° C., g/cm³ | 0.8974 |
| Refractivity at 70° C. | 1.4794 |
| Viscosity at 80° C., mm²/s | 15.87 |
| Carbon residue, m % | 0.3 |
| Four-component composition, m % | |
| Saturates | 78.8 |
| Aromatics | 19.6 |
| Resins | 1.6 |
| Asphaltenes | <0.1 |
| Hydrocarbon composition, m % | |
| Paraffins | 30.5 |
| Total naphthenes | 48.3 |

TABLE II-5

| Evaluation results | | | | | | |
| --- | --- | --- | --- | --- | --- | --- |
| Catalyst | A-II-1 | A-II-2 | A-II-3 | DB-II-1 | DB-II-2 | DB-II-3 |
| Product distribution, wt % | | | | | | |
| Dry gas | 4.19 | 4.08 | 3.64 | 2.53 | 3.09 | 2.76 |
| Liquefied gas | 26.37 | 25.48 | 23.16 | 23.29 | 23.01 | 23.06 |
| Gasoline | 18.37 | 17.42 | 20.13 | 26.86 | 24.85 | 23.72 |
| Diesel oil | 9.54 | 12.87 | 16.82 | 13.62 | 15.14 | 17.85 |
| Fuel oil | 38.46 | 37.16 | 34.08 | 30.04 | 31.14 | 29.97 |
| Coke | 3.07 | 2.99 | 2.17 | 3.66 | 2.77 | 2.64 |
| Product yield, wt % | | | | | | |
| C2⁻ (ethylene) | 3.41 | 3.15 | 2.98 | 1.04 | 1.84 | 1.45 |
| C3⁻ (propylene) | 15.04 | 14.81 | 13.45 | 9.67 | 10.15 | 10.4 |
| C3⁻/C3⁰ | 9.96 | 8.98 | 10.76 | 6.45 | 7.25 | 7.70 |
| Properties of fuel oil | | | | | | |
| Density (15° C.), kg/m³ | 843 | 857 | 881 | 910 | 862 | 872 |
| Sulfur content, wt % | | | | | | |
| Total sulfur (Open sea) | 0.35 | 0.40 | 0.41 | 0.5 | 0.45 | 0.47 |
| Carbon aromaticity index | 801 | 813 | 821 | 831 | 820 | 823 |
| Flash point, % | 80 | 78 | 75 | 72 | 76 | 74 |
| Acid value (KOH), mg/g | 2.0 | 2.1 | 2.0 | 2.2 | 2.1 | 2.4 |
| Carbon residue, % | 14 | 15 | 17 | 16 | 15 | 17 |

In Table II-5, C2⁼ refers to ethylene, C3⁼ refers to propylene, C3⁰ refers to propane, and the expression "Total Sulfur (Open sea)" indicates that the total sulfur content should meet the standard for use on the open sea.

The product yields listed in Table II-5 were calculated based on the feed quantity of the feedstock. As can be seen from Table II-5, the catalyst of the first type of embodiments of the present application shows higher fuel oil yield, higher ethylene and propylene yield, and higher propylene/propane ratio when used for hydrogenated VGO conversion. The fuel oil obtained can meet the standards of marine fuel oil.

III. Preparation and Evaluation of the Catalyst of the Second Type of Embodiments (Hydrogenated LCO Catalytic Cracking Catalyst)

Example III-1

(1) 500 g of a hydrogen-type ZSM-5 molecular sieve (with a silica-alumina ratio of 30, an average grain size of 1.2 an average particle size of 15 μm and a crystallinity of 93.0%) was added as a core material into 5000 g of an aqueous solution of methyl methacrylate and sodium chloride (with the concentration by mass of the methyl methacrylate being 0.2% and the concentration by mass of the sodium chloride being 5.0%) at room temperature (25° C.), stirred for 1 h, filtered, and dried at 50° C. in an air atmosphere to obtain a ZSM-5 molecular sieve material I;

(2) the ZSM-5 molecular sieve material I was added into a β molecular sieve suspension (a suspension formed by a hydrogen-type β molecular sieve and water, wherein the concentration by weight of the β molecular sieve in the β molecular sieve suspension is 0.3 wt %, the β molecular sieve has an average grain size of 0.2 micron, a silica-alumina ratio of 30, and a crystallinity of 89%, and the particles of the β molecular sieve are particles composed of a single crystal grain), at a mass ratio of the ZSM-5 molecular sieve material I to the β molecular sieve suspension of 1:10, stirred for 1 hour at a temperature of 50° C., filtered, and the resulting filter cake was dried in an air atmosphere at a temperature of 90° C. to obtain a ZSM-5 molecular sieve material II;

(3) 100 g of aluminum isopropoxide was dissolved in 1500 g of deionized water, 65 g of NaOH particles were added, then 1000 g of silica sol (with a SiO₂ content of 25.0 wt %, a pH value of 10.0 and a sodium oxide content of 0.10%) and 2000 g of tetraethylammonium hydroxide solution (with the concentration of tetraethylammonium hydroxide in the tetraethylammonium hydroxide solution being 25 wt %) were added sequentially, uniformly stirred, then transferred into a reaction kettle with a polytetrafluoroethylene lining for crystallization, and crystallized at 80° C. for 48 hours to obtain a pre-crystallized synthetic solution III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II to the pre-crystallized synthesis liquid III of 1:10, crystallized at 120° C. for 60 hours, filtered, washed, dried and calcined at 550° C. for 4 hours after the completion of the crystallization, to obtain a sodium-type ZSM-5/β core-shell molecular sieve;

(5) the resulting sodium-type core-shell molecular sieve was subjected to exchanging with NH₄Cl solution and washing to reduce the content of Na₂O in the core-shell molecular sieve to a level of less than 0.15 wt %, filtered, dried, and calcined at 550° C. for 2 hours to obtain a hydrogen-type ZSM-5/β core-shell molecular sieve, designated as SZ-III-1.

Example III-2

(1) 500.0 g of hydrogen-type ZSM-5 molecular sieve (with a silica-alumina ratio of 60, an average grain size of 0.5 μm, an average particle size of 10 μm and a crystallinity of 90.0%) was added into 5000.0 g of an aqueous solution of polydiallyldimethylammonium chloride and sodium chloride (with the content by mass of polydiallyldimethylammonium chloride in the solution being 0.2% and the content by mass of sodium chloride being 0.2%) at room temperature (25° C.), stirred for 2 h, and filtered, and the resulting filter cake was dried at 50° C. in an air atmosphere to obtain a ZSM-5 molecular sieve material I;

(2) the ZSM-5 molecular sieve material I was added into a hydrogen-type β molecular sieve suspension (the concentration of the β molecular sieve in the β molecular sieve suspension is 2.5 wt %, the β molecular sieve has an average grain size of 0.1 μm, a silica-alumina ratio of 30.0, and a crystallinity of 92.0%); the ZSM-5 molecular sieve material I and the β molecular sieve suspension were stirred for 2 hours at 50° C. at a mass ratio of 1:45, filtered and dried in an air atmosphere at 90° C. to obtain a ZSM-5 molecular sieve material II;

(3) 200.0 g of aluminum sol (with the concentration of $Al_2O_3$ being 25 wt %, the aluminum-chlorine molar ratio being 1.1) was dissolved in 500.0 g of deionized water, 30 g of NaOH particles were added, 4500.0 mL of water glass (with a $SiO_2$ concentration of 251 g/L, and a modulus of 2.5) and 1600 g of tetraethylammonium hydroxide solution (with the concentration by mass of the tetraethylammonium hydroxide solution being 25%) were added sequentially, fully and uniformly stirred, then transferred into a reaction kettle with a polytetrafluoroethylene lining for crystallization, crystallized for 10 hours at 150° C. to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:10, then crystallized for 80 hours at 130° C., filtered, washed, dried, and calcined for 4 hours at 550° C. to obtain a sodium-type ZSM-5/β core-shell molecular sieve;

(5) the resulting sodium-type core-shell molecular sieve was subjected to exchanging with NH₄Cl solution and washing to reduce the content of Na₂O in the core-shell molecular sieve to a level of less than 0.15 wt %, filtered, dried, and calcined at 550° C. for 2 hours to obtain a hydrogen-type ZSM-5/β core-shell molecular sieve, designated as SZ-III-2.

Example III-3

(1) At room temperature (25° C.), a hydrogen-type ZSM-5 molecular sieve (with a silica-alumina ratio of 100, an average grain size of 100 nm, an average particle size of 5.0 microns, a crystallinity of 91.0% and an amount of 500 g) was added as a core material into 5000.0 g of an aqueous solution of n-butylamine and sodium chloride (with the content by mass of n-butylamine being 5.0% and the content by mass of sodium chloride being 2%), stirred for 24 hours, filtered, and dried at 70° C. in an air atmosphere to obtain a ZSM-5 molecular sieve material I;

(2) the ZSM-5 molecular sieve material I was added into a hydrogen-type β molecular sieve suspension (the concentration by weight of the β molecular sieve in the β molecular sieve suspension is 5.0 wt %, the β molecular sieve has an average grain size of 50 nm, a silica-alumina ratio of 30.0, and a crystallinity of 95.0%) at a mass ratio of the ZSM-5 molecular sieve material I to the β molecular sieve suspension of 1:20, stirred for 10 hours at 50° C., and filtered, and the resulting filter cake was dried in an air atmosphere at a temperature of 120° C. to obtain a ZSM-5 molecular sieve material II;

(3) 100 g of sodium metaaluminate was dissolved in 1800 g of deionized water, 60 g of NaOH particles were added, then 1000 g of coarse silica gel ($SiO_2$ content: 98.0 wt %) and 1800 g of tetraethylammonium bromide solution (with the concentration by mass of the tetraethylammonium bromide solution being 25%) were added sequentially, stirred uniformly, then transferred into a reaction kettle with a polytetrafluoroethylene lining for crystallization, and crystallized at 130° C. for 30 hours to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:4, crystallized for 100 hours at 80° C., filtered, washed, dried, and calcined for 4 hours at 550° C. to obtain a sodium-type ZSM-5/β core-shell molecular sieve;

(5) the resulting sodium-type core-shell molecular sieve was subjected to exchanging with NH₄Cl solution and washing to reduce the content of Na₂O to a level of less than 0.15 wt %, filtered, dried, and calcined at 550° C. for 2 hours to obtain a hydrogen-type ZSM-5/β core-shell molecular sieve, designated as SZ-III-3.

Comparative Example III-1

(1) water glass, aluminum sulfate and aqueous ethylamine solution were used as starting materials, and mixed at a molar ratio of $SiO_2$:$Al_2O_3$:$C_2H_5NH_2$:$H_2O$=40:1:10: 1792 and gelatinized, crystallized at 140° C. for 3 days, to obtain a large-grain cylindrical ZSM-5 molecular sieve (with a grain size of 4.0 μm);

(2) the large-grain cylindrical ZSM-5 molecular sieve obtained was pre-treated for 30 min with a sodium chloride salt solution (with a NaCl concentration of 5 wt %) comprising 0.5 wt % of methyl methacrylate, filtered, dried, and added into a β molecular sieve suspension (a nano β molecular sieve, the mass ratio of the ZSM-5 molecular sieve to the β molecular sieve suspension being 1:10) dispersed with deionized water to 0.5 wt %, adhered for 30 min, filtered, dried, and calcined for 5 h at 540° C. to obtain a core molecular sieve;

(3) silica white and tetraethoxysilane (TEOS) were used as a silicon source, sodium aluminate and TEAOH were used as starting materials, they were added into the core molecular sieve obtained in step 2) at a ratio of TEAOH:$SiO_2$:$Al_2O_3$:$H_2O$=13:30:1:1500, and then charged into a stainless steel kettle with a tetrafluoro-ethylene lining for crystallization at 140° C. for 54 hours;

(4) after the completion of crystallization, the resultant was filtered, washed, dried and calcined for 4 hours at 550° C. to obtain a sodium-type core-shell molecular sieve;

(5) the resulting sodium-type core-shell molecular sieve was subjected to exchanging with NH$_4$Cl solution and washing to reduce the content of Na$_2$O to a level of less than 0.15 wt %, filtered, dried, and calcined at 550° C. for 2 hours to obtain a hydrogen-type core-shell molecular sieve, designated as DZ-III-1.

Comparative Example III-2

A molecular sieve was synthesized as described in Example III-1, except that, in step 3), the crystallization temperature was 30° C. and the crystallization time was 3 hours and after a sample of the crystallized product was filtered, washed, dried and calcined, it can be observed that there was no peak at 2θ=22.4° C. and no peak at 2θ=21.2° C. in the XRD pattern. The molecular sieve obtained was designated as DZ-III-2.

Comparative Example III-3

A molecular sieve was synthesized as described in Example III-1, in which the ZSM-5 and β molecular sieves used in steps (1) and (2) of Example III-1 were mechanically mixed and the resulting molecular sieve mixture was designated as DZ-III-3.

The preparation conditions of Examples III-1 to III-3 and Comparative Examples III-1 to III-2 are shown in Table III-1, and the properties of the molecular sieves obtained in step (4) of Examples III-1 to III-3 and Comparative Examples III-1 to III-2 are shown in Table III-1 (cont.). The properties of the mixed molecular sieve of Comparative Example III-3 are shown in Table III-1 (cont.).

TABLE III-1

| Synthesis conditions for each example and comparative example | | | | | |
|---|---|---|---|---|---|
| Example No. | Ex. III-1 | Comp. Ex. III-1 | Comp. Ex. III-2 | Ex. III-2 | Ex. III-3 |
| Average particle size of ZSM-5 molecular sieve, μm | 15 | 4 | 15 | 10 | 5 |
| Average particle size of β molecular sieve, μm | 0.2 | 0.02 | 0.2 | 0.1 | 0.05 |
| Average grain size of β molecular sieve, μm | 0.2 | 0.02 | 0.2 | 0.1 | 0.05 |
| Mixture ratio of the β molecular sieve synthesis liquid: the molar ratio of R:SiO$_2$:Al$_2$O$_3$:H$_2$O | 5:34:1:858 | 13:30:1:1500 | 5:34:1:858 | 4:38:1:670 | 5:35:1:373 |
| Crystallization temperature of step 3), ° C. | 80 | — | 30 | 150 | 130 |
| Crystallization time of step 3), h | 48 | — | 3 | 10 | 30 |
| Diffraction peak at 2θ = 22.4° of the product of step 3) | Yes | — | No | Yes | Yes |
| Diffraction peak at 2θ = 21.2° of the product of step 3) | No | — | No | No | No |
| The weight ratio of the ZSM-5 molecular sieve material II to the pre-crystallized synthesis liquid III | 1:10 | — | 1:10 | 1:10 | 1:4 |
| Crystallization temperature of step 4), ° C. | 120 | — | 120 | 130 | 80 |
| Crystallization time of step 4), h | 60 | — | 60 | 80 | 100 |

| Properties of the molecular sieves obtained in the examples and comparative examples | | | | | |
|---|---|---|---|---|---|
| Example No. | Ex. III-1 | Comp. Ex. III-1 | Comp. Ex. III-2 | Ex. III-2 | Ex. III-3 | Ex. III-1 |
| Pore volume, mL/g | 0.371 | 0.201 | 0.255 | 0.105 | 0.377 | 0.368 |
| Pore diameter distribution, % | | | | | | |
| Proportion of the pore volume of pores with a diameter of 0.3-0.6 nm | 70 | 80 | 91 | 92 | 72 | 76 |
| Proportion of the pore volume of pores with a diameter of 0.7-1.5 nm | 5 | 10 | 4 | 5 | 3 | 5 |
| Proportion of the pore volume of pores with a diameter of 2-4 nm | 10 | 8 | 3 | 2.9 | 9 | 8 |
| Proportion of the pore volume of pores with a diameter of 20-80 nm | 15 | 2 | 2 | 0.1 | 16 | 11 |
| D1/D2 | 2:3 | 0.01:1 | 1:5 | 1:6 | 4:1 | 1:1 |
| Mass ratio of core to shell | 15:1 | 80:1 | 10:1 | | 1:5 | 1:1 |
| Total specific surface area, m$^2$/g | 533 | 398 | 476 | 425 | 547 | 525 |

TABLE III-1-continued

| | | | | | | |
|---|---|---|---|---|---|---|
| The proportion of the specific surface area of mesopores to the total specific surface area, % | 35 | 45 | 8.0 | 5.3 | 25 | 30 |
| Average grain size of shell molecular sieve, μm | 0.2 | 0.02 | 0.1 | — | 0.05 | 0.2 |
| Average grain size of core molecular sieve, μm | 1.2 | 4 | 1.2 | — | 0.5 | 0.1 |
| Thickness of shell, μm | 0.5 | 0.06 | 0.1 | — | 0.05 | 0.2 |
| Silica-alumina ratio of core molecular sieve | 30 | 30 | 30 | — | 60 | 100 |
| Silica-alumina ratio of shell molecular sieve | 30 | 31 | 30 | — | 34 | 32 |
| Shell coverage, % | 100 | 75 | 30 | — | 100 | 80 |
| Number of crystal grains of core ZSM-5 molecular sieve | >1 | 1 | >1 | — | >1 | >1 |
| Final molecular sieve product No. | SZ-III-1 | DZ-III-1 | DZ-III-2 | DZ-III-3 | SZ-III-2 | SZ-III-3 |

The following examples are provided to illustrate the preparation of catalysts according to the second type of embodiments of the present application, wherein the kaolin used is a commercial product from China Kaolin Clay Co. Ltd., having a solid content of 75 wt %; the pseudo-boehmite used is available from Shandong Aluminum Corporation, having an alumina content of 65 wt %;

the alumina sol is available from Qilu Branch of Sinopec Catalyst Co. Ltd., having an alumina content of 21 wt %. The silica sol is available from Beijing Chemical Plant, having a silica content of 25 wt % and a pH value of 3.0. The second molecular sieve is a β molecular sieve, hydrogen-type, having a silica-alumina ratio of 35, a sodium oxide content of 0.1 wt % and a crystallinity of 91.3%, and is available from Qilu Branch of Sinopec Catalyst Co. Ltd.

Examples III-4 to III-6

Examples III-4 to III-6 illustrate the preparation of the hydrogenated LCO catalytic cracking catalysts of the present application.

Catalysts were prepared using the core-shell molecular sieves obtained in Examples III-1 to III-3, respectively, and designated as A-III-1, A-III-2 and A-III-3. The method for preparing the catalyst was as follows:

(1) pseudo-boehmite (boehmite for short) and water were mixed and stirred evenly, concentrated hydrochloric acid (chemically pure, produced by Beijing Chemical Plant) with a concentration of 36 wt % was added under stirring, at an acid-aluminum ratio (the mass ratio of the concentrated hydrochloric acid with a concentration of 36 wt % to the pseudo-boehmite calculated as $Al_2O_3$) of 0.2, the mixture was heated to 70° C., and aged for 1.5 hours, to obtain an aged pseudo-boehmite slurry. The alumina content in the aged pseudo-boehmite slurry was 12 wt %;

(2) a core-shell molecular sieve (the first molecular sieve), a molecular sieve with a pore opening diameter of 0.65-0.70 nm (the second molecular sieve), alumina sol, silica sol, kaolin, the aged pseudo-boehmite slurry and deionized water were uniformly mixed, to obtain a slurry with a solid content of 28 wt %, and spray dried; the first molecular sieves used in Examples 4 to 6 were core-shell molecular sieves SZ-III-1, SZ-III-2, and SZ-III-3, respectively;

(3) the resultant was subjected to ammonium exchange at a weight ratio of the catalyst:ammonium salt:$H_2O$=1:

1:10 for 1 h at 80° C., filtered, then subjected to the exchanging and filtering process for one more time, and dried to obtain the target catalyst.

Example III-7

A catalyst was prepared as described in Example III-4, except that no silica sol was used and an equivalent amount of aluminum sol was used instead, to obtain a catalyst A-III-4.

Table III-2 shows the numbering and amounts of the first molecular sieves, the types and amounts of the second molecular sieves, the amounts of the alumina sol, silica sol and kaolin used in Examples III-4 to III-7, on a dry basis, per 1 Kg of catalytic cracking catalyst obtained. The composition of the catalysts A-III-1 to A-III-4 of Examples III-4 to III-7, expressed by weight percentage on a dry basis, is given in Table III-3. The contents of the first molecular sieve, the second molecular sieve, the binder and the kaolin in the catalyst are calculated based on the amounts of corresponding starting materials used in the preparation.

Comparative Examples III-4 to III-6

Comparative Examples III-4 to III-6 illustrate catalysts prepared using the molecular sieves obtained in Comparative Examples III-1 to III-3.

Microspherical catalysts were prepared as described in Example III-4 by mixing and slurrying a first molecular sieve (being the molecular sieves DZ-III-1, DZ-III-2 and DZ-III-3 obtained in Comparative Examples III-1 to III-3, respectively) and a second molecular sieve, pseudo-boehmite, kaolin, silica sol, alumina sol and water, and spray-drying. The catalysts obtained were respectively designated as: DB-III-1, DB-III-2 and DB-III-3.

Table III-2 shows the type and amount of the first molecular sieve and the amounts of the second molecular sieve, alumina sol, silica sol and kaolin used in each comparative example, on a dry basis, per 1 Kg of catalyst obtained. The composition of the catalyst of each comparative example, expressed by weight percentage on a dry basis, is given in Table III-3.

TABLE III-2

Amounts of components used in each example and comparative example

| Example No. | Catalyst No. | Kaolin, kg | Boehmite, kg | Aluminum sol, kg | Silica sol, kg | First molecular sieve | | Second molecular sieve | |
|---|---|---|---|---|---|---|---|---|---|
| | | | | | | No. | Amount, kg | Type | Amount, kg |
| Ex. III-4 | A-III-1 | 0.3 | 0.15 | 0.10 | 0.10 | SZ-III-1 | 0.25 | β | 0.10 |
| Ex. III-5 | A-III-2 | 0.3 | 0.10 | 0.20 | 0.15 | SZ-III-2 | 0.15 | β | 0.10 |
| Ex. III-6 | A-III-3 | 0.3 | 0.20 | 0.15 | 0.15 | SZ-III-3 | 0.10 | β | 0.10 |
| Ex. III-7 | A-III-4 | 0.3 | 0.15 | 0.20 | 0 | SZ-III-1 | 0.25 | β | 0.10 |
| Comp. Ex. III-4 | DB-III-1 | 0.3 | 0.15 | 0.10 | 0.10 | DZ-III-1 | 0.25 | β | 0.10 |
| Comp. Ex. III-5 | DB-III-2 | 0.3 | 0.15 | 0.10 | 0.10 | DZ-III-2 | 0.25 | β | 0.10 |
| Comp. Ex. III-6 | DB-III-3 | 0.3 | 0.15 | 0.10 | 0.10 | DZ-III-3 | 0.25 | β | 0.10 |

TABLE III-3

Composition of the catalysts of the examples and comparative examples

| Example No. | Catalyst No. | Core-shell molecular sieve | Second molecular sieve | Kaolin clay | Boehm-ite | Alu-minum sol | Silica sol |
|---|---|---|---|---|---|---|---|
| Ex. III-4 | A-III-1 | 25 | 10 | 30 | 15 | 10 | 10 |
| Ex. III-5 | A-III-2 | 15 | 10 | 30 | 10 | 20 | 15 |
| Ex. III-6 | A-III-3 | 10 | 10 | 30 | 20 | 15 | 15 |
| Ex. III-7 | A-III-4 | 25 | 10 | 30 | 15 | 20 | 0 |
| Comp. Ex. III-4 | DB-III-1 | 25 | 10 | 30 | 15 | 10 | 10 |
| Comp. Ex. III-5 | DB-III-2 | 25 | 10 | 30 | 15 | 10 | 10 |
| Comp. Ex. III-6 | DB-III-3 | 25 | 10 | 30 | 15 | 10 | 10 |

Evaluation Through Reaction

The catalytic cracking catalysts A-III-1 to A-III-4 obtained in Examples III-4 to III-7 and the catalysts DB-III-1 to DB-III-3 obtained in Comparative Examples III-4 to III-6 were aged at 800° C. for 4 hours under 100 vol % steam, respectively, and then their catalytic cracking reaction performance was evaluated on a small fixed fluidized bed reactor under the conditions including a reaction temperature of 580° C., a weight space velocity of 4.0 h$^{-1}$, and a catalyst-to-oil ratio of 12 wt %. The properties of the hydrogenated LCO are shown in Table III-4, and the reaction results are shown in Table III-5.

TABLE III-4

Properties of hydrogenated LCO

| Properties | Hydrogenated LCO |
|---|---|
| Carbon content, wt % | 88.37 |
| Hydrogen content, wt % | 11.63 |

TABLE III-4-continued

Properties of hydrogenated LCO

| Properties | Hydrogenated LCO |
|---|---|
| Density at 20° C., kg/m$^3$ | 888.7 |
| 10% of carbon residue, wt % | <0.1 |
| Freezing point, ° C. | <−50 |
| Paraffins, wt % | 13.0 |
| Monocycloalkanes, wt % | 7.6 |
| Bicycloalkanes, wt % | 18.1 |
| Tricycloalkanes, wt % | 8.7 |
| Total naphthenes, wt % | 34.4 |
| Total bicyclic aromatics, wt % | 6.4 |

TABLE III-5

Evaluation results

| Catalyst | A-III-1 | A-III-2 | A-III-3 | A-III-4 | DB-III-1 | DB-III-2 | DB-III-3 |
|---|---|---|---|---|---|---|---|
| | Product distribution, wt % | | | | | | |
| Dry gas | 9.48 | 9.14 | 8.78 | 10.01 | 6.89 | 7.64 | 7.14 |
| Liquefied gas | 36.83 | 35.0 | 34.21 | 33.04 | 21.75 | 23.35 | 22.84 |

TABLE III-5-continued

| | | | | Evaluation results | | | |
|---|---|---|---|---|---|---|---|
| Catalyst | A-III-1 | A-III-2 | A-III-3 | A-III-4 | DB-III-1 | DB-III-2 | DB-III-3 |
| Gasoline | 30.51 | 29.78 | 28.61 | 30.15 | 37.06 | 37.74 | 37.51 |
| Diesel oil | 18.04 | 19.21 | 21.87 | 20.63 | 26.47 | 24.84 | 25.83 |
| Heavy oil | 2.98 | 4.47 | 4.25 | 3.33 | 4.97 | 4.84 | 4.75 |
| Coke | 2.16 | 2.40 | 2.25 | 2.84 | 2.86 | 1.59 | 1.93 |
| Yield of light olefins, wt % | 30.96 | 28.45 | 27.45 | 26.82 | 20.74 | 22.48 | 21.42 |

The yield of light olefins listed in Table III-5 was calculated based on the feed quantity of the feedstock, and the light olefins referred to C2-C4 olefins.

As can be seen from the results listed in Table III-5, the catalyst of the second type of embodiments of the present application can provide a higher cracking capability, a higher yield of light olefins, and a higher yield of liquefied gas, when used for the conversion of hydrogenated LCO.

IV. Preparation and Evaluation of the Catalyst of the Third Type of Embodiments (Heavy Oil Catalytic Cracking Catalyst)

Example IV-1

(1) 500 g of a hydrogen-type ZSM-5 molecular sieve (with a silica-alumina ratio of 30, an average grain size of 1.2 an average particle size of 15 μm and a crystallinity of 93.0%) was added as a core material into 5000 g of an aqueous solution of methyl methacrylate and sodium chloride (with the concentration by mass of methyl methacrylate being 0.2% and the concentration by mass of sodium chloride being 5.0%) at room temperature (25° C.), stirred for 1 h, filtered, and dried at 50° C. in an air atmosphere to obtain a ZSM-5 molecular sieve material I;

(2) the ZSM-5 molecular sieve material I was added into a β molecular sieve suspension (a suspension formed by a hydrogen-type β molecular sieve and water, wherein the concentration by weight of the β molecular sieve in the β molecular sieve suspension is 0.3 wt %, the β molecular sieve has an average grain size of 0.2 micron, a silica-alumina ratio of 30, and a crystallinity of 89%, and the particles of the β molecular sieve are particles composed of a single crystal grain), at a mass ratio of the ZSM-5 molecular sieve material I to the β molecular sieve suspension of 1:10, stirred for 1 hour at a temperature of 50° C., and filtered, and the resulting filter cake was dried in an air atmosphere at a temperature of 90° C. to obtain a ZSM-5 molecular sieve material II;

(3) 100.0 g of aluminum isopropoxide was dissolved in 1500 g of deionized water, 65 g of NaOH particles were added, then 1000 g of silica sol (with a $SiO_2$ content of 25.0 wt %, a pH value of 10.0 and a sodium oxide content of 0.10%) and 2000 g of tetraethylammonium hydroxide solution (with the concentration of tetraethylammonium hydroxide in the tetraethylammonium hydroxide solution being 25 wt %) were added sequentially, uniformly stirred, then transferred into a reaction kettle with a polytetrafluoroethylene lining for crystallization, and crystallized at 80° C. for 48 hours to obtain a pre-crystallized synthetic solution III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II to the pre-crystallized synthesis liquid III of 1:10, crystallized at 120° C. for 60 hours, filtered, washed, dried and calcined at 550° C. for 4 hours after the completion of the crystallization, to obtain a sodium-type ZSM-5/β core-shell molecular sieve;

(5) the resulting sodium-type ZSM-5/β core-shell molecular sieve was subjected to exchanging with $NH_4Cl$ solution and washing until the content of $Na_2O$ was less than 0.15 wt %, filtered, dried, and calcined at 550° C. for 2 hours to obtain a hydrogen-type ZSM-5/β core-shell molecular sieve, designated as SZ-IV-1.

Example IV-2

(1) 500 g of a hydrogen-type ZSM-5 molecular sieve (with a silica-alumina ratio of 60, an average grain size of 0.5 μm, an average particle size of 10 μm and a crystallinity of 90.0%) was added into 5000 g of an aqueous solution of polydiallyldimethylammonium chloride and sodium chloride (with the content by mass of polydiallyldimethylammonium chloride in the solution being 0.2% and the content by mass of sodium chloride being 0.2%) at room temperature (25° C.), stirred for 2 hours, and filtered, and the resulting filter cake was dried at 50° C. in an air atmosphere to obtain a ZSM-5 molecular sieve material I;

(2) the ZSM-5 molecular sieve material I was added into a hydrogen-type β molecular sieve suspension (the concentration of the β molecular sieve in the β molecular sieve suspension is 2.5 wt %, the β molecular sieve has an average grain size of 0.1 μm, a silica-alumina ratio of 30.0, and a crystallinity of 92.0%); the ZSM-5 molecular sieve material I and the β molecular sieve suspension were stirred for 2 hours at 50° C. at a mass ratio of 1:45, filtered and dried in an air atmosphere at 90° C. to obtain a ZSM-5 molecular sieve material II;

(3) 200.0 g of aluminum sol (with the concentration of $Al_2O_3$ being 25 wt %, the aluminum-chlorine molar ratio being 1.1) was dissolved in 500 g of deionized water, 30 g of NaOH particles were added, 4500 mL of water glass (with a $SiO_2$ concentration of 251 g/L, a modulus of 2.5) and 1600 g of tetraethylammonium hydroxide solution (with the concentration by mass of the tetraethylammonium hydroxide solution being 25%) were added sequentially, fully and uniformly stirred, then transferred into a reaction kettle with a polytetrafluoroethylene lining for crystallization, crystallized for 10 hours at 150° C. to obtain a pre-crystallized synthesis liquid III; after a sample of the pre-crystallized synthesis liquid III was filtered, washed, dried and calcined, it can be observed that there was a peak at $2\theta=22.4°$ and no peak at $2\theta=21.2°$ in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:10, then crystallized for 80 hours at 130° C., filtered, washed, dried, and calcined for 4 hours at 550° C. to obtain a sodium-type ZSM-5/β core-shell molecular sieve;

(5) the resulting sodium-type ZSM-5/β core-shell molecular sieve was subjected to exchanging with $NH_4Cl$ solution and washing until the content of $Na_2O$ was less than 0.15 wt %, filtered, dried, and calcined at 550° C. for 2 hours to obtain a hydrogen-type core-shell molecular sieve, designated as SZ-IV-2.

Example IV-3

(1) At room temperature (25° C.), a hydrogen-type ZSM-5 molecular sieve (with a silica-alumina ratio of 100, an average grain size of 100 nm, an average particle size of 5.0 microns, a crystallinity of 91.0% and an amount of 500 g) was added as a core material into 5000 g of an aqueous solution of n-butylamine and sodium chloride (with the content by mass of n-butylamine being 5.0% and the content by mass of sodium chloride being 2%), stirred for 24 hours, filtered, and dried at 70° C. in an air atmosphere to obtain a ZSM-5 molecular sieve material I;

(2) the ZSM-5 molecular sieve material I was added into a hydrogen-type β molecular sieve suspension (the concentration by weight of the β molecular sieve in the β molecular sieve suspension is 5.0 wt %, the β molecular sieve has an average grain size of 50 nm, a silica-alumina ratio of 30.0, and a crystallinity of 95.0%) at a mass ratio of the ZSM-5 molecular sieve material I to the β molecular sieve suspension of 1:20, stirred for 10 hours at 50° C., and filtered, and the resulting filter cake was dried in an air atmosphere at a temperature of 120° C. to obtain a ZSM-5 molecular sieve material II;

(3) 100 g of sodium metaaluminate was dissolved in 1800 g of deionized water, 60 g of NaOH particles were added, then 1000 g of coarse silica gel ($SiO_2$ content: 98.0 wt %) and 1800 g of tetraethylammonium bromide solution (with the concentration by mass of the tetraethylammonium bromide solution being 25%) were added sequentially, stirred uniformly, then transferred into a reaction kettle with a polytetrafluoroethylene lining for crystallization, and crystallized at 130° C. for 30 hours to obtain a pre-crystallized synthesis liquid III; after a sample of the pre-crystallized synthesis liquid III was filtered, washed, dried and calcined, it can be observed that there was a peak at $2\theta=22.4°$ and no peak at $2\theta=21.2°$ in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:4, crystallized for 100 hours at 80° C., filtered, washed, dried, and calcined for 4 hours at 550° C. to obtain a sodium-type ZSM-5/β core-shell molecular sieve;

(5) the resulting sodium-type ZSM-5/β core-shell molecular sieve was subjected to exchanging with $NH_4Cl$ solution and washing until the content of $Na_2O$ was less than 0.15 wt %, filtered, dried, and calcined at 550° C. for 2 hours to obtain a hydrogen-type core-shell molecular sieve, designated as SZ-IV-3.

Comparative Example IV-1

(1) water glass, aluminum sulfate and aqueous ethylamine solution were used as starting materials, and mixed at a molar ratio of $SiO_2:Al_2O_3:C_2H_5NH_2:H_2O=40:1:10:1792$ and gelatinized, crystallized at 140° C. for 3 days, to obtain a large-grain cylindrical ZSM-5 molecular sieve (with a grain size of 4.0 μm);

(2) the large-grain cylindrical ZSM-5 molecular sieve obtained was pre-treated for 30 min with a sodium chloride salt solution (with a NaCl concentration of 5 wt %) comprising 0.5 wt % of methyl methacrylate, filtered, dried, and added into a β molecular sieve suspension (a nano β molecular sieve, the mass ratio of the ZSM-5 molecular sieve to the β molecular sieve suspension being 1:10) dispersed with deionized water to 0.5 wt %, adhered for 30 min, filtered, dried, and calcined for 5 h at 540° C. to obtain a core molecular sieve;

(3) silica white and tetraethoxysilane (TEOS) were used as a silicon source, sodium aluminate and TEAOH were used as starting materials, they were added into the core molecular sieve obtained in step 2) at a ratio of $TEAOH:SiO_2:Al_2O_3:H_2O=13:30:1:1500$, and then charged into a stainless steel kettle with a tetrafluoroethylene lining for crystallization at 140° C. for 54 hours;

(4) after the completion of crystallization, the resultant was filtered, washed, dried and calcined for 4 hours at 550° C. to obtain a sodium-type core-shell molecular sieve;

(5) the resulting sodium-type core-shell molecular sieve was subjected to exchanging with $NH_4Cl$ solution and washing until the content of $Na_2O$ was less than 0.15 wt %, filtered, dried, and calcined at 550° C. for 2 hours to obtain a hydrogen-type core-shell molecular sieve, designated as DZ-IV-1.

Comparative Example IV-2

A molecular sieve was synthesized as described in Example IV-1, except that, in step (3), the crystallization temperature was 30° C., the crystallization time was 3 hours, and after a sample of the crystallized product was filtered, washed, dried and calcined, it can be observed that there was no peak at $2\theta=22.4°$ and no peak at $2\theta=21.2°$ in the XRD pattern. The molecular sieve obtained was designated as DZ-IV-2.

Comparative Example IV-3

The ZSM-5 and β molecular sieves used in steps (1) and (2) of Example IV-1 were mechanically mixed at the mixture ratio of Example IV-1, and the resulting molecular sieve mixture was designated as DZ-IV-3.

The synthesis conditions of Examples IV-1 to IV-3 and Comparative Examples IV-1 to IV-2 are shown in Table IV-1.

The properties of the core-shell molecular sieves obtained in Examples IV-1 to IV-3 and Comparative Examples IV-1 to IV-2 and the molecular sieve mixture obtained in Comparative Example IV-3 are shown in Table IV-1 (cont.).

TABLE IV-1

| Example No. | Ex. IV-1 | Comp. Ex. IV-1 | Comp. Ex. IV-2 | Comp. Ex. IV-3 | Ex. IV-2 | Ex. IV-3 |
|---|---|---|---|---|---|---|
| Synthesis conditions for each example and comparative example | | | | | | |
| Average particle size of ZSM-5 molecular sieve, μm | 15 | 4 | 15 | 15 | 10 | 5 |
| Average particle size of β molecular sieve, μm | 0.2 | 0.02 | 0.2 | 0.2 | 0.1 | 0.05 |
| Average grain size of β molecular sieve, μm | 0.2 | 0.02 | 0.2 | 0.2 | 0.1 | 0.05 |
| Mixture ratio of the β molecular sieve synthesis liquid: the molar ratio of R:$SiO_2$:$Al_2O_3$:$H_2O$ | 5:34:1:858 | 13:30:1:1500 | 5:34:1:858 | | 4:38:1:670 | 5:35:1:373 |
| Crystallization temperature of step 3), ° C. | 80 | — | 30 | — | 150 | 130 |
| Crystallization time of step 3), h | 48 | — | 3 | — | 10 | 30 |
| Diffraction peak at 2θ = 22.4° of the product of step 3) | Yes | — | No | — | Yes | Yes |
| Diffraction peak at 2θ = 21.2° of the product of step 3) | No | — | No | — | No | No |
| The weight ratio of the ZSM-5 molecular sieve material II to the pre-crystallized synthesis liquid III | 1:10 | — | 1:10 | — | 1:10 | 1:4 |
| Crystallization temperature of step 4), ° C. | 120 | — | 120 | — | 130 | 80 |
| Crystallization time of step 4), h | 60 | — | 60 | — | 80 | 100 |
| Properties of the molecular sieves obtained in the examples and comparative examples | | | | | | |
| D1/D2 | 2:3 | 0.01 | 1:5 | 1:6 | 4:1 | 1:1 |
| Mass ratio of core to shell | 15:1 | 80:1 | 10:1 | | 1:5 | 1:1 |
| Total specific surface area, $m^2$/g | 533 | 398 | 476 | 425 | 547 | 525 |
| The proportion of the specific surface area of mesopores to the total specific surface area, % | 35 | 45 | 8.0 | 5.3 | 25 | 30 |
| Average grain size of shell molecular sieve, μm | 0.2 | 0.02 | 0.1 | — | 0.05 | 0.2 |
| Average grain size of core molecular sieve, μm | 1.2 | 4 | 1.2 | — | 0.5 | 0.1 |
| Thickness of shell, μm | 0.5 | 0.06 | 0.1 | — | 0.05 | 0.2 |
| Silica-alumina ratio of core molecular sieve | 30 | 30 | 30 | — | 60 | 100 |
| Silica-alumina ratio of shell molecular sieve | 30 | 31 | 30 | — | 34 | 32 |
| Shell coverage, % | 100 | 75 | 30 | — | 100 | 80 |
| Number of crystal grains of core ZSM-5 molecular sieve* | >1 | 1 | >1 | — | >1 | >1 |
| Pore volume, mL/g | 0.371 | 0.201 | 0.255 | 0.105 | 0.377 | 0.368 |
| Pore diameter distribution, % | | | | | | |
| Proportion of the pore volume of pores with a diameter of 0.3-0.6 nm | 70 | 80 | 91 | 92 | 72 | 76 |
| Proportion of the pore volume of pores with a diameter of 0.7-1.5 nm | 5 | 10 | 4 | 5 | 3 | 5 |
| Proportion of the pore volume of pores with a diameter of 2-4 nm | 10 | 8 | 3 | 2.9 | 9 | 8 |
| Proportion of the pore volume of pores with a diameter of 20-80 nm | 15 | 2 | 2 | 0.1 | 16 | 11 |
| Numbering of hydrogen-type core-shell molecular sieve | SZ-IV-1 | DZ-IV-1 | DZ-IV-2 | DZ-IV-3 | SZ-IV-2 | SZ-IV-3 |

*Comparative Example IV-3 resulted in a molecular sieve mixture rather than a core-shell molecular sieve.

The following examples are provide to illustrate the preparation of catalysts according to the third type of embodiments of the present application, wherein the kaolin used is a commercial product from China Kaolin Clay Co. Ltd., having a solid content of 75 wt %; the pseudo-boehmite used is available from Shandong Aluminum Corporation, having an alumina content of 65 wt %; the alumina sol is available from Qilu Branch of Sinopec Catalyst Co. Ltd., having an alumina content of 21 wt %; the silica sol is available from Beijing Chemical Plant, having a silica content of 25 wt % and a pH value of 2.5. The Y molecular sieve is available from Qilu Branch of Sinopec Catalyst Co. Ltd. under the trade name HSY-12, having a rare earth content of 12 wt %, a silica-alumina ratio of 6.0, and a crystallinity of 53.0%.

Examples IV-4 to IV-6

Catalysts were prepared using the hydrogen-type core-shell molecular sieves obtained in Examples IV-1 to IV-3, respectively, which were designated as: A-IV-1, A-IV-2 and A-IV-3. The method for preparing the catalyst was as follows:

(1) pseudo-boehmite (boehmite for short) and water were mixed evenly, concentrated hydrochloric acid (chemically pure, available from Beijing Chemical Plant) with a concentration of 36 wt % was added under stirring, at an acid-aluminum ratio (the weight ratio of the hydrochloric acid with a concentration of 36 wt % to the pseudo-boehmite calculated as alumina) of 0.20, and the resulting mixture was heated to 70° C. and aged for 1.5 hours to obtain an aged pseudo-boehmite. The alumina content of the alumina slurry was 12 wt %;

(2) a hydrogen-type core-shell molecular sieve, a Y molecular sieve, alumina sol, silica sol, kaolin and the aged pseudo-boehmite were mixed with deionized water to obtain a slurry with a solid content of 25 wt %, stirred for 30 minutes, and spray dried;

(3) the resultant was subjected to ammonium exchange at a weight ratio of the catalyst:ammonium salt:$H_2O$=1:1:10 for 1 h at 80° C., filtered, then subjected to the exchanging and filtering process for one more time, and dried to obtain the target catalyst.

Table IV-2 shows the type and amount of the hydrogen-type core-shell molecular sieve (first molecular sieve) used, and the amounts of the Y molecular sieve, boehmite, aluminum sol, silica sol and kaolin used, on a dry basis, per 1 Kg of catalyst obtained.

The composition of the catalysts A-IV-1 to A-IV-3 of the examples is given in Table IV-3. The contents of the first molecular sieve, the Y molecular sieve, the alumina sol, the silica sol, the boehmite and the kaolin in the catalyst are calculated based on the amounts of corresponding starting materials used in the preparation.

Comparative Examples IV-4 to IV-6

Comparative Examples IV-4 to IV-6 illustrate catalysts prepared using the molecular sieves obtained in Comparative Examples IV-1 to IV-3.

The molecular sieves obtained in Comparative Examples IV-1 to IV-3, Y molecular sieve, pseudo-boehmite, kaolin, water and alumina sol were mixed, respectively, and spray dried to prepare microspherical catalysts as described in Example IV-4. The catalysts obtained were respectively designated as: DB-IV-1, DB-IV-2 and DB-IV-3.

The type and amount of the first molecular sieve, and the amounts of the Y molecular sieve, alumina sol, alumina, silica sol and kaolin used in each comparative example are shown in Table IV-2. The composition of the catalyst of each comparative example is given in Table IV-3.

Evaluation Through Reaction

After catalysts A-IV-1 to A-IV-3 and DB-IV-1 to DB-IV-3 were aged for 17 hours at 800° C. under 100% steam, the catalytic cracking performance of the catalysts was evaluated on a small fixed fluidized bed reactor under the conditions including a reaction temperature of 520° C., a weight space velocity of 4.0 $h^{-1}$ and a catalyst-to-oil ratio of 6. The properties of the feedstock oil are shown in Table IV-4, and the evaluation results are shown in Table IV-5.

TABLE IV-4

| Properties of the feedstock oil | |
| --- | --- |
| Properties | Feedstock oil |
| Density at 20° C., g/cm³ | 0.9044 |
| Refractivity at 20° C. | 1.5217 |
| Viscosity at 100° C., mm²/s | 9.96 |
| Freezing point, ° C. | 40 |
| Aniline point, ° C. | 95.8 |
| Carbon residue, % | 3.0 |
| Distillation range, ° C. | |
| Initial boiling point | 243 |
| 5% | 294 |
| 10% | 316 |
| 30% | 395 |
| 50% | 429 |
| 70% | 473 |
| 90% | — |

TABLE IV-2

| amounts of ingredients of examples and comparative examples | | | | | | | | | |
| --- | --- | --- | --- | --- | --- | --- | --- | --- | --- |
| | | | | | | First molecular sieve | | Y molecular sieve | |
| Example No. | Catalyst No. | Kaolin, kg | Boehmite, kg | Aluminum sol, kg | Silica sol, kg | Type | Amount, kg | Type | Amount, kg |
| Ex. IV-4 | A-IV-1 | 0.30 | 0.10 | 0.15 | 0.05 | SZ-IV-1 | 0.10 | HSY-12 | 0.30 |
| Ex. IV-5 | A-IV-2 | 0.30 | 0.15 | 0.10 | 0 | SZ-IV-2 | 0.15 | HSY-12 | 0.30 |
| Ex. IV-6 | A-IV-3 | 0.30 | 0.20 | 0.10 | 0.05 | SZ-IV-3 | 0.05 | HSY-12 | 0.30 |
| Comp. Ex. IV-4 | DB-IV-1 | 0.30 | 0.10 | 0.15 | 0.05 | DZ-IV-1 | 0.10 | HSY-12 | 0.30 |
| Comp. Ex. IV-5 | DB-IV-2 | 0.30 | 0.10 | 0.15 | 0.05 | DZ-IV-2 | 0.10 | HSY-12 | 0.30 |
| Comp. Ex. IV-6 | DB-IV-3 | 0.30 | 0.10 | 0.15 | 0.05 | DZ-IV-3 | 0.10 | HSY-12 | 0.30 |

TABLE IV-3

| catalyst composition for each of the examples and comparative examples | | | | | | | |
| --- | --- | --- | --- | --- | --- | --- | --- |
| Example No. | Catalyst No. | First molecular sieve | Y molecular sieve | Kaolin clay | Boehmite | Aluminum sol | Silica sol |
| Ex. IV-4 | A-IV-1 | 10 | 30 | 30 | 10 | 15 | 5 |
| Ex. IV-5 | A-IV-2 | 15 | 30 | 30 | 15 | 10 | 0 |
| Ex. IV-6 | A-IV-3 | 5 | 30 | 30 | 20 | 10 | 5 |
| Comp. Ex. IV-4 | DB-IV-1 | 10 | 30 | 30 | 10 | 15 | 5 |
| Comp. Ex. IV-5 | DB-IV-2 | 10 | 30 | 30 | 10 | 15 | 5 |
| Comp. Ex. IV-6 | DB-IV-3 | 10 | 30 | 30 | 10 | 15 | 5 |

TABLE IV-5

| | | Evaluation results | | | | |
|---|---|---|---|---|---|---|
| Catalyst | A-IV-1 | A-IV-2 | A-IV-3 | DB-IV-1 | DB-IV-2 | DB-IV-3 |
| | Product distribution, % | | | | | |
| Dry gas | 7.60 | 6.85 | 6.24 | 2.73 | 4.18 | 3.69 |
| Liquefied gas | 37.47 | 35.47 | 34.1 | 28.77 | 33.0 | 32.42 |
| Gasoline | 34.52 | 36.01 | 35.82 | 41.23 | 37.67 | 38.62 |
| Diesel oil | 11.75 | 12.74 | 14.58 | 15.10 | 16.07 | 14.28 |
| Heavy oil | 4.58 | 5.08 | 6.91 | 7.36 | 6.02 | 7.11 |
| Coke | 4.08 | 3.85 | 2.35 | 4.81 | 3.06 | 3.88 |
| Yield of ethylene, wt % | 4.01 | 5.84 | 4.97 | 1.28 | 3.08 | 2.27 |
| Yield of propylene, wt % | 18.54 | 17.61 | 16.54 | 10.93 | 13.57 | 12.59 |
| Yield of C4 olefins, wt % | 15.02 | 14.87 | 13.02 | 8.85 | 10.25 | 9.42 |

The product yields listed in Tables IV-5 were calculated based on the feed quantity of the feedstock.

As can be seen from Table IV-5, as compared with the comparative agent, the catalyst of the third type of embodiments of the present application shows a higher heavy oil cracking capability, a higher yield of light olefins, a significantly improved yield of propylene, and a significantly improved yield of C4 olefins.

V. Preparation and Evaluation of the Catalyst of the Fourth Type of Embodiments (Catalytic Cracking Catalyst for Intermediate Base Crude Oil)

Example V-1

(1) 500 g of a hydrogen-type ZSM-5 molecular sieve (with a silica-alumina ratio of 30, an average grain size of 1.2 μm, an average particle size of ZSM-5 molecular sieve of 15 μm and a crystallinity of 93.0%) was added as a core material into 5000 g of an aqueous solution of methyl methacrylate and sodium chloride (with the concentration by mass of methyl methacrylate being 0.2% and the concentration by mass of sodium chloride being 5.0%) at room temperature (25° C.), stirred for 1 h, filtered, and dried at 50° C. in an air atmosphere to obtain a ZSM-5 molecular sieve material I;

(2) the ZSM-5 molecular sieve material I was added into a β molecular sieve suspension (a suspension formed by a hydrogen-type β molecular sieve and water, wherein the concentration by weight of the β molecular sieve in the β molecular sieve suspension is 0.3 wt %, the β molecular sieve has an average grain size of 0.2 micron, a silica-alumina ratio of 30, and a crystallinity of 89%, and the particles of the β molecular sieve are particles composed of a single crystal grain), at a mass ratio of the ZSM-5 molecular sieve material I to the β molecular sieve suspension of 1:10, stirred for 1 hour at a temperature of 50° C., and filtered, and the resulting filter cake was dried in an air atmosphere at a temperature of 90° C. to obtain a ZSM-5 molecular sieve material II;

(3) 100 g of aluminum isopropoxide was dissolved in 1500 g of deionized water, 65 g of NaOH particles were added, then 1000 g of silica sol (with a $SiO_2$ content of 25.0 wt %, a pH value of 10.0 and a sodium oxide content of 0.10%) and 2000 g of tetraethylammonium hydroxide solution (with the concentration of tetraethylammonium hydroxide in the tetraethylammonium hydroxide solution being 25 wt %) were added sequentially, uniformly stirred, then transferred into a reaction kettle with a polytetrafluoroethylene lining for crystallization, and crystallized at 80° C. for 48 hours to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:10, crystallized at 120° C. for 60 hours, filtered, washed, dried after the completion of crystallization, and calcined at 550° C. for 4 hours to obtain a sodium-type ZSM-5/β core-shell molecular sieve;

(5) the resulting sodium-type ZSM-5/β core-shell molecular sieve was subjected to exchanging with $NH_4Cl$ solution and washing until the content of $Na_2O$ was less than 0.15 wt %, filtered, dried, and calcined at 550° C. for 2 hours to obtain a hydrogen-type ZSM-5/β core-shell molecular sieve, designated as SZ-V-1.

Example V-2

(1) 500.0 g of a hydrogen-type ZSM-5 molecular sieve (with a silica-alumina ratio of 60, an average grain size of 0.5 μm, an average particle size of 10 μm and a crystallinity of 90.0%) was added into 5000.0 g of an aqueous solution of polydiallyldimethylammonium chloride and sodium chloride (with the content by mass of polydiallyldimethylammonium chloride in the solution being 0.2% and the content by mass of sodium chloride being 0.2%) at room temperature (25° C.), stirred for 2 h, and filtered, and the resulting filter cake was dried at 50° C. in an air atmosphere to obtain a ZSM-5 molecular sieve material I;

(2) the ZSM-5 molecular sieve material I was added into a hydrogen-type β molecular sieve suspension (the concentration of the β molecular sieve in the β molecular sieve suspension is 2.5 wt %, the β molecular sieve has an average grain size of 0.1 μm, a silica-alumina ratio of 30.0, and a crystallinity of 92.0%); the ZSM-5 molecular sieve material I and the β molecular sieve suspension were stirred for 2 hours at 50° C. at a mass ratio of 1:45, filtered and dried in an air atmosphere at 90° C. to obtain a ZSM-5 molecular sieve material II;

(3) 200.0 g of aluminum sol (with the concentration of $Al_2O_3$ being 25 wt %, the aluminum-chlorine molar ratio being 1.1) was dissolved in 500.0 g of deionized water, 30 g of NaOH particles were added, 4500.0 mL of water glass (with a $SiO_2$ concentration of 251 g/L, a modulus of 2.5) and 1600 g of tetraethylammonium hydroxide solution (with the concentration by mass of the tetraethylammonium hydroxide solution being 25%) were added sequentially, fully and uniformly stirred, then transferred into a reaction kettle with a polytetrafluoroethylene lining for crystallization, crystallized for 10 hours at 150° C. to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:10, then crystallized for 80 hours at 130° C., filtered, washed, dried, and calcined for 4 hours at 550° C. to obtain a sodium-type ZSM-5/β core-shell molecular sieve;

(5) the resulting sodium-type ZSM-5/β core-shell molecular sieve was subjected to exchanging with NH$_4$Cl solution and washing until the content of Na$_2$O was less than 0.15 wt %, filtered, dried, and calcined at 550° C. for 2 hours to obtain a hydrogen-type ZSM-5/β core-shell molecular sieve, designated as SZ-V-2.

Example V-3

(1) At room temperature (25° C.), a hydrogen-type ZSM-5 molecular sieve (with a silica-alumina ratio of 100, an average grain size of 100 nm, an average particle size of 5.0 microns, a crystallinity of 91.0% and an amount of 500 g) was added as a core material into 5000 g of an aqueous solution of n-butylamine and sodium chloride (with the content by mass of n-butylamine being 5.0% and the content by mass of sodium chloride being 2%), stirred for 24 hours, filtered, and dried at 70° C. in an air atmosphere to obtain a ZSM-5 molecular sieve material I;

(2) the ZSM-5 molecular sieve material I was added into a hydrogen-type β molecular sieve suspension (the concentration by weight of the β molecular sieve in the β molecular sieve suspension is 5.0 wt %, the β molecular sieve has an average grain size of 50 nm, a silica-alumina ratio of 30.0, and a crystallinity of 95.0%) at a mass ratio of the ZSM-5 molecular sieve material I to the β molecular sieve suspension of 1:20, stirred for 10 hours at 50° C., and filtered, and the resulting filter cake was dried in an air atmosphere at a temperature of 120° C. to obtain a ZSM-5 molecular sieve material II;

(3) 100 g of sodium metaaluminate was dissolved in 1800.0 g of deionized water, 60 g of NaOH particles were added, 1000 g of coarse silica gel (SiO$_2$ content: 98.0 wt %) and 1800 g of tetraethylammonium bromide solution (with the concentration by mass of the tetraethylammonium bromide solution being 25%) were added sequentially, stirred uniformly, then transferred into a reaction kettle with a polytetrafluoroethylene lining for crystallization, and crystallized at 130° C. for 30 hours to obtain a pre-crystallized synthesis liquid III; after a sample of the pre-crystallized synthesis liquid III was filtered, washed, dried and calcined, it can be observed that there was a peak at 2θ=22.4° and no peak at 2θ=21.2° in the XRD pattern;

(4) the ZSM-5 molecular sieve material II was added into the pre-crystallized synthesis liquid III at a weight ratio of the ZSM-5 molecular sieve material II, on a dry basis, to the pre-crystallized synthesis liquid III of 1:4, crystallized for 100 hours at 80° C., filtered, washed, dried, and calcined for 4 hours at 550° C. to obtain a sodium-type ZSM-5/β core-shell molecular sieve;

(5) the resulting sodium-type ZSM-5/β core-shell molecular sieve was subjected to exchanging with NH$_4$Cl solution and washing until the content of Na$_2$O was less than 0.15 wt %, filtered, dried, and calcined at 550° C. for 2 hours to obtain a hydrogen-type ZSM-5/β core-shell molecular sieve, designated as SZ-V-3.

Comparative Example V-1

(1) water glass, aluminum sulfate and aqueous ethylamine solution were used as starting materials, and mixed at a molar ratio of SiO$_2$:Al$_2$O$_3$:C$_2$H$_5$NH$_2$:H$_2$O=40:1:10:1792 and gelatinized, crystallized at 140° C. for 3 days, to obtain a large-grain cylindrical ZSM-5 molecular sieve (with a grain size of 4.0 μm);

(2) the large-grain cylindrical ZSM-5 molecular sieve obtained was pre-treated for 30 min with a sodium chloride salt solution (with a NaCl concentration of 5 wt %) comprising 0.5 wt % of methyl methacrylate, filtered, dried, and added into a β molecular sieve suspension (a nano β molecular sieve, the mass ratio of the ZSM-5 molecular sieve to the β molecular sieve suspension being 1:10) dispersed with deionized water to 0.5 wt %, adhered for 30 min, filtered, dried, and calcined for 5 h at 540° C. to obtain a core molecular sieve;

(3) silica white and tetraethoxysilane (TEOS) were used as a silicon source, sodium aluminate and TEAOH were used as starting materials, they were added into the core molecular sieve obtained in step 2) at a ratio of TEAOH:SiO$_2$:Al$_2$O$_3$:H$_2$O=13:30:1:1500, and then charged into a stainless steel kettle with a tetrafluoroethylene lining for crystallization at 140° C. for 54 hours;

(4) after the completion of crystallization, the resultant was filtered, washed, dried and calcined for 4 hours at 550° C. to obtain a sodium-type core-shell molecular sieve; and (5) the resulting sodium-type core-shell molecular sieve was subjected to exchanging with NH$_4$Cl solution and washing until the content of Na$_2$O was less than 0.15 wt %, filtered, dried, and calcined at 550° C. for 2 hours to obtain a hydrogen-type core-shell molecular sieve, designated as DZ-V-1.

Comparative Example V-2

A molecular sieve was synthesized as described in Example V-1, except that, in step 3), the crystallization temperature was 30° C. and the crystallization time was 3 hours, and after a sample of the crystallized product was filtered, washed, dried and calcined, and it can be observed that there was no peak at 2θ=22.4° and no peak at 2θ=21.2° in the XRD pattern. The molecular sieve obtained was designated as DZ-V-2.

Comparative Example V-3

The ZSM-5 and β molecular sieves used in steps (1) and (2) of Example V-1 were mechanically mixed at the mixture ratio of Example V-1, and the resulting molecular sieve mixture was designated as DZ-V-3.

The synthesis conditions of Examples V-1 to V-3 and Comparative Examples V-1 to V-2 are listed in Table V-1.

The properties of the molecular sieves obtained in Examples V-1 to V-3 and Comparative Examples V-1 to V-2 and the properties of the molecular sieve mixture obtained in Comparative Example V-3 are given in Table V-1 (cont.).

TABLE V-1

| Synthesis conditions of examples and comparative examples | | | | | |
|---|---|---|---|---|---|
| Example No. | Ex. V-1 | Comp. Ex. V-1 | Comp. Ex. V-2 | Ex. V-2 | Ex. V-3 |
| Average particle size of ZSM-5 molecular sieve, μm | 15 | 4 | 15 | 10 | 5 |
| Average particle size of β molecular sieve, μm | 0.2 | 0.02 | 0.2 | 0.1 | 0.05 |
| Average grain size of β molecular sieve, μm | 0.2 | 0.02 | 0.2 | 0.1 | 0.05 |
| Mixture ratio of the β molecular sieve synthesis liquid: the molar ratio of $R:SiO_2:Al_2O_3:H_2O$ | 5:34:1:858 | 13:30:1:1500 | 5:34:1:858 | 4:38:1:670 | 5:35:1:373 |
| Crystallization temperature of step 3), ° C. | 80 | — | 30 | 150 | 130 |
| Crystallization time of step 3), h | 48 | — | 3 | 10 | 30 |
| Diffraction peak at 2θ = 22.4° of the product of step 3) | Yes | — | No | Yes | Yes |
| Diffraction peak at 2θ = 21.2° of the product of step 3) | No | — | No | No | No |
| The weight ratio of the ZSM-5 molecular sieve material II to the pre-crystallized synthesis liquid III | 1:10 | — | 1:10 | 1:10 | 1:4 |
| Crystallization temperature of step 4), ° C. | 120 | — | 120 | 130 | 80 |
| Crystallization time of step 4), h | 60 | — | 60 | 80 | 100 |

| Properties of molecular sieves of the examples and comparative examples | | | | | | |
|---|---|---|---|---|---|---|
| Example No. | Ex. V-1 | Comp. Ex. V-1 | Comp. Ex. V-2 | Ex. V-2 | Ex. V-3 | Ex. V-1 |
| D1/D2 | 2:3 | 0.01 | 1:5 | 1:6 | 4:1 | 1:1 |
| Mass ratio of core to shell | 15:1 | 80:1 | 10:1 | | 1:5 | 1:1 |
| Total specific surface area, m²/g | 533 | 398 | 476 | 425 | 547 | 525 |
| The proportion of the specific surface area of mesopores to the total specific surface area, % | 35 | 45 | 8.0 | 5.3 | 25 | 30 |
| Average grain size of shell molecular sieve, μm | 0.2 | 0.02 | 0.1 | — | 0.05 | 0.2 |
| Average grain size of core molecular sieve, μm | 1.2 | 4 | 1.2 | — | 0.5 | 0.1 |
| Thickness of shell, μm | 0.5 | 0.06 | 0.1 | — | 0.05 | 0.2 |
| Silica-alumina ratio of core molecular sieve | 30 | 30 | 30 | — | 60 | 100 |
| Silica-alumina ratio of shell molecular sieve | 30 | 31 | 30 | — | 34 | 32 |
| Shell coverage, % | 100 | 75 | 30 | — | 100 | 80 |
| Number of crystal grains of core ZSM-5 molecular sieve | >1 | 1 | >1 | — | >1 | >1 |
| Pore volume, mL/g | 0.371 | 0.201 | 0.255 | 0.105 | 0.377 | 0.368 |
| Pore diameter distribution, % | | | | | | |
| Proportion of the pore volume of pores with a diameter of 0.3-0.6 nm | 70 | 80 | 91 | 92 | 72 | 76 |
| Proportion of the pore volume of pores with a diameter of 0.7-1.5 nm | 5 | 10 | 4 | 5 | 3 | 5 |
| Proportion of the pore volume of pores with a diameter of 2-4 nm | 10 | 8 | 3 | 2.9 | 9 | 8 |
| Proportion of the pore volume of pores with a diameter of 20-80 nm | 15 | 2 | 2 | 0.1 | 16 | 11 |
| Final molecular sieve No. | SZ-V-1 | DZ-V-1 | DZ-V-2 | DZ-V-3 | SZ-V-2 | SZ-V-3 |

60

The following examples are provide to illustrate the preparation of catalysts according to the fourth type of embodiments of the present application, wherein the kaolin used is a commercial product from China Kaolin Clay Co. Ltd., having a solid content of 75 wt %; the pseudo-boehmite used is available from Shandong Aluminum Corporation, having an alumina content of 65 wt %; the alumina sol is available from Qilu Branch of Sinopec Catalyst Co. Ltd., having an alumina content of 21 wt %; the silica sol is available from Beijing Chemical Plant, having a silica content of 25 wt % and a pH value of 2.0. The Y molecular sieve is available from Qilu Branch of Sinopec Catalyst Co. Ltd. under the trade name HSY-0E, having a rare earth content of 2 wt %, a silica-alumina ratio of 9.0, and a crystallinity of 60%. The β molecular sieve is available from Nankai University Catalyst Plant under the trade name NKF-6-25YY, having a silica-alumina ratio of 25, and a crystallinity of 95%.

Examples V-4 to V-6

Catalysts were prepared using the hydrogen-type core-shell molecular sieves obtained in Examples V-1 to V-3, respectively, which were designated as: A-V-1, A-V-2 and A-V-3. The method for preparing the catalyst was as follows:

(1) pseudo-boehmite (boehmite for short) and water were uniformly mixed, concentrated hydrochloric acid (chemically pure, available from Beijing Chemical Plant) with a concentration of 36 wt % was added under stirring, at an acid-aluminum ratio (the weight ratio of the hydrochloric acid with a concentration of 36 wt % to the pseudo-boehmite calculated as alumina) of 0.2, the resulting mixture was heated to 70° C. and aged for 1.5 hours, to obtain an aged pseudo-boehmite; the alumina content of the alumina slurry was 12 wt %;

(2) a core-shell molecular sieve (first molecular sieve), Y molecular sieve, R molecular sieve (second molecular sieve), alumina sol, silica sol, kaolin and the aged pseudo-boehmite were mixed with deionized water, stirred for 30 minutes, and spray dried;

(3) the resultant was subjected to ammonium exchange at a weight ratio of the catalyst:ammonium salt:$H_2O$=1: 1:10 for 1 h at 80° C., filtered, then subjected to the exchanging and filtering process for one more time, and dried to obtain the target catalyst.

Example V-7

A catalyst was prepared as described in Example V-5, except that no silica sol was used and an equal weight of aluminum sol was used instead. The catalyst obtained was designated as A-V-4.

Comparative Examples V-4 to V-6

Comparative Examples V-4 to V-6 illustrate catalysts prepared using the molecular sieves obtained in Comparative Examples V-1 to V-3.

The molecular sieves obtained in Comparative Examples V-1 to V-3, Y molecular sieve, second molecular sieve, pseudo-boehmite, kaolin, silica sol, alumina sol and water were mixed, respectively, and spray dried to prepare microspherical catalysts as described in Example V-4, respectively. The catalysts obtained were respectively designated as: DB-V-1, DB-V-2 and DB-V-3.

Table V-2 shows the type and amount of the first molecular sieve, and the amounts of Y molecular sieve, second molecular sieve, alumina sol, silica sol and kaolin, on a dry basis, used in each examples and comparative examples, per 1 kg of catalyst obtained.

The composition, on a dry basis, of the catalysts of the examples and comparative examples is given in Table V-3. The contents of the first molecular sieve, the Y molecular sieve, the second molecular sieve, the alumina sol, the silica sol, the boehmite and the kaolin in the catalyst are calculated based on the amounts of corresponding starting materials used in the preparation.

TABLE V-2

| | | | | | | First molecular sieve | | Y molecular sieve | | Second molecular sieve | |
|---|---|---|---|---|---|---|---|---|---|---|---|
| Example No. | Catalyst No. | Kaolin, kg | Boehmite, kg | Aluminum sol, kg | Silica sol, kg | Type | Amount, kg | Type | Amount, kg | Type | Amount, kg |
| Ex. V-4 | A-V-1 | 0.38 | 0.10 | 0.05 | 0 | SZ-V-1 | 0.35 | HSY-0E | 0.08 | β | 0.04 |
| Ex. V-5 | A-V-2 | 0.38 | 0.10 | 0.10 | 0.05 | SZ-V-2 | 0.25 | HSY-0E | 0.08 | β | 0.04 |
| Ex. V-6 | A-V-3 | 0.38 | 0.10 | 0.10 | 0.15 | SZ-V-3 | 0.15 | HSY-0E | 0.08 | β | 0.04 |
| Ex. V-7 | A-V-4 | 0.38 | 0.10 | 0.15 | 0 | SZ-V-2 | 0.25 | HSY-0E | 0.08 | β | 0.04 |
| Comp. Ex. V-4 | DB-V-1 | 0.38 | 0.10 | 0.05 | 0 | DZ-V-1 | 0.35 | HSY-0E | 0.08 | β | 0.04 |
| Comp. Ex. V-5 | DB-V-2 | 0.38 | 0.10 | 0.05 | 0 | DZ-V-2 | 0.35 | HSY-0E | 0.08 | β | 0.04 |
| Comp. Ex. V-6 | DB-V-3 | 0.38 | 0.10 | 0.05 | 0 | DZ-V-3 | 0.35 | HSY-0E | 0.08 | β | 0.04 |

TABLE V-3

Composition of the catalysts of each example and comparative example

| Example No. | Catalyst No. | First molecular sieve | Y molecular sieve | Second molecular sieve | Kaolin clay | Boehmite | Aluminum sol | Silica sol |
|---|---|---|---|---|---|---|---|---|
| Ex. V-4 | A-V-1 | 35 | 8 | 4 | 38 | 10 | 5 | 0 |
| Ex. V-5 | A-V-2 | 25 | 8 | 4 | 38 | 10 | 10 | 5 |
| Ex. V-6 | A-V-3 | 15 | 8 | 4 | 38 | 10 | 10 | 15 |
| Ex. V-7 | A-V-4 | 25 | 8 | 4 | 38 | 10 | 15 | 0 |
| Comp. Ex. V-4 | DB-V-1 | 35 | 8 | 4 | 38 | 10 | 5 | 0 |

TABLE V-3-continued

| | | First molecular sieve | Y molecular sieve | Second molecular sieve | Kaolin clay | Boehmite | Aluminum sol | Silica sol |
|---|---|---|---|---|---|---|---|---|
| Example No. | Catalyst No. | | | | | | | |
| Comp. Ex. V-5 | DB-V-2 | 35 | 8 | 4 | 38 | 10 | 5 | 0 |
| Comp. Ex. V-6 | DB-V-3 | 35 | 8 | 4 | 38 | 10 | 5 | 0 |

Evaluation Through Reaction

The catalysts obtained in Examples V-4 to V-7 and Comparative Examples V-4 to V-6 were subjected to aging at 800° C. for 17 hours under 100 vol % steam, and then their performance on the catalytic cracking of the intermediate base crude oil was evaluated on a small fixed fluidized bed reactor under the conditions including a reaction temperature of 580° C., a weight space velocity of 4.0 h$^{-1}$, and a catalyst-to-oil ratio of 10 wt %. The properties of the intermediate base crude oil used are shown in Table V-4, and the reaction results are shown in Table V-5.

TABLE V-4

Properties of the intermediate base crude oil

| Properties | Intermediate base crude oil |
|---|---|
| Carbon content, wt % | 86.43 |
| Hydrogen content, wt % | 12.88 |
| Density at 20° C., kg/m$^3$ | 901 |
| Carbon residue, wt % | 4.8 |
| Freezing point, ° C. | 42 |
| Initial boiling point, ° C. | 278.8 |
| End boiling point, ° C. | 540.2 |
| Saturates, wt % | 40 |
| Aromatics, wt % | 22.6 |
| Resins, wt % | 37.3 |
| Asphaltenes, wt % | 0.1 |
| Paraffins, wt % | 29.4 |
| Monocycloalkanes, wt % | 8.4 |
| Bicycloalkanes, wt % | 9.5 |
| Tricycloalkanes, wt % | 6.7 |
| Total naphthenes, wt % | 26.4 |
| Total bicyclic aromatics, wt % | 10.2 |

TABLE 5

Evaluation results

| Catalyst | A-V-1 | A-V-2 | A-V-3 | A-V-4 | DB-V-1 | DB-V-2 | DB-V-3 |
|---|---|---|---|---|---|---|---|
| | | | Product distribution, wt % | | | | |
| Dry gas | 11.34 | 10.75 | 9.98 | 11.74 | 5.34 | 8.45 | 6.37 |
| Liquefied gas | 43.23 | 41.54 | 40.25 | 42.77 | 31.32 | 34.12 | 35.9 |
| Gasoline | 22.87 | 21.91 | 20.23 | 20.68 | 26.46 | 23.72 | 23.98 |
| Diesel oil | 12.78 | 14.38 | 16.29 | 13.44 | 21.21 | 20.25 | 20.00 |
| Heavy oil | 7.22 | 9.45 | 10.84 | 9.21 | 14.28 | 11.71 | 12.41 |
| Coke | 2.56 | 1.97 | 2.41 | 2.16 | 1.39 | 1.75 | 1.34 |
| Yield of light olefins, wt % | 35.97 | 34.42 | 33.27 | 32.08 | 20.35 | 25.14 | 23.91 |

The yield of light olefins listed in Table V-5 was calculated based on the feed quantity of the feedstock.

As can be seen from Table V-5, the catalyst of the fourth type of embodiments of the present application has a higher cracking capability for intermediate base crude oil, a lower yield of diesel oil and heavy oil, a significantly improved yield of light olefins, and a significantly improved yield of liquefied gas.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A ZSM-5/β core-shell molecular sieve, comprising a core comprising at least two crystal grains of ZSM-5 molecular sieve and a shell comprising a plurality of crystal grains of β molecular sieve, wherein:

the at least two crystal grains of ZSM-5 molecular sieve have an average grain size of 0.05-15 μm, the ZSM-5/β core-shell molecular sieve has a shell coverage of 50-100% and a shell thickness of 10-2000 nm, an average grain size of the plurality of crystal grains of β molecular sieve in the shell is 10-500 nm, a ratio of a height of a diffraction peak at 2θ=22.4° to a height of a diffraction peak at 2θ=23.1° in an X-ray diffraction pattern of the ZSM-5/β core-shell molecular sieve is 0.1-10:1, and the ZSM-5/β core-shell molecular sieve has a total specific surface area of more than 420 m$^2$/g, and a proportion of the specific surface area of pores having a pore diameter of 2-50 nm to a total specific surface area is 10-40%.

2. The ZSM-5/β core-shell molecular sieve of claim 1, wherein the total specific surface area of the ZSM-5/β core-shell molecular sieve is 450-620 m$^2$/g, and the proportion of the specific surface area of the pores having a pore diameter of 2-50 nm to the total specific surface area is 12-35%.

3. The ZSM-5/β core-shell molecular sieve of claim 1, wherein a mass ratio of the core to the shell of the ZSM-5/β core-shell molecular sieve is 0.2-20:1.

4. The ZSM-5/β core-shell molecular sieve of claim 1, wherein in the ZSM-5/β core-shell molecular sieve, a pore volume of pores having a pore diameter of 2-80 nm accounts for 10-30% of a total pore volume; and a pore volume of pores with a pore diameter of 20-80 nm accounts for 50-70% of the pore volume of pores with a pore diameter of 2-80 nm.

5. A method for the synthesis of a ZSM-5/β core-shell molecular sieve of claim 1, comprising the steps of:

1) treating a particulate ZSM-5 molecular sieve with a surfactant solution to obtain a ZSM-5 molecular sieve material I, wherein the particulate ZSM-5 molecular sieve comprises are preferably composed of at least two ZSM-5 molecular sieve crystal grains;

2) treating the ZSM-5 molecular sieve material I with a slurry comprising a particulate β molecular sieve to obtain a ZSM-5 molecular sieve material II, wherein the particulate β molecular sieve comprises at least one crystal grain of the β molecular sieve;

3) providing a synthesis liquid comprising a silicon source, an aluminum source, an optional alkali source, a template and water, and crystallizing the synthesis liquid at a temperature of 50-300° C. to obtain a pre-crystallized synthesis liquid III; and 4) mixing the ZSM-5 molecular sieve material II with the pre-crystallized synthesis liquid III to crystalize the ZSM-5/β core-shell molecular sieve.

6. The method of claim 5, wherein step 1) is carried out in the surfactant solution having a surfactant concentration of 0.05-50 wt % for at least 0.5 h at a temperature of 20-70° C.; preferably under stirring, and then filter and dry.

7. The method of claim 5, wherein:

the surfactant solution further comprises 0.05-10.0 wt % of a salt selected from the group consisting of sodium chloride, potassium chloride, ammonium chloride, ammonium nitrate or a combination thereof;

a weight ratio of the surfactant solution to the particulate ZSM-5 molecular sieve, on a dry basis, in step 1) is 10-200:1;

the surfactant is selected from the group consisting of polymethyl methacrylate, polydiallyldimethylammonium chloride, dipicolinic acid, aqueous ammonia, ethylamine, n-butylamine, tetraethylammonium hydroxide, tetrapropylammonium hydroxide, tetraethylammonium bromide, tetrapropylammonium bromide, tetrabutylammonium hydroxide, and a combination thereof;

the ZSM-5 molecular sieve used in step 1) is a sodium-type, a hydrogen-type, or an ion-exchanged ZSM-5 molecular sieve;

the average grain size of the at least two crystal grains of ZSM-5 molecular sieve is 0.05-20 μm; or an average particle size of the ZSM-5 molecular sieve particles is 0.1-30 μm.

8. The method of claim 5, wherein the treatment of step 2) is performed by: adding the ZSM-5 molecular sieve material I into the slurry comprising the particulate β molecular sieve, contacting for at least 0.5 hour at 20-60° C.; then filtering and drying.

9. The method of claim 5, wherein:

a concentration of β molecular sieve in the slurry comprising the particulate β molecular sieve used in step 2) is 0.1-10 wt %, preferably 0.3-8 wt %;

a weight ratio of the slurry comprising the particulate β molecular sieve to the ZSM-5 molecular sieve material I, on a dry basis, in step 2) is 10-50:1;

in the slurry comprising the particulate β molecular sieve used in step 2), the average grain size of the β molecular sieve grains is 0.01-0.5 μm; or an average particle size of the particulate β molecular sieve is 0.01-0.5 μm.

10. The method of claim 5, wherein, in step 3), molar ratio among the silicon source, the aluminum source, the optional alkali source, the template, and water includes:

$R/SiO_2=0.1-10:1$;

$H_2O/SiO_2=2-150:1$;

$SiO_2/Al_2O_3=10-800:1$; and $Na_2O/SiO_2=0-2:1$;

wherein R represents the template, $SiO_2$ represents the silicon source calculated as $SiO_2$, $Al_2O_3$ represents the aluminum source calculated as $Al_2O_3$, and $Na_2O$ represents the alkali source calculated as $Na_2O$.

11. The method of claim 5, wherein in step 4), the crystallization is carried out at a temperature of 50-300° C. for 10-400 h;

and a weight ratio of the pre-crystallized synthesis liquid III to the ZSM-5 molecular sieve material II, on a dry basis, is 2-10:1.

12. A catalyst comprising, on a dry basis and based on the weight of the catalyst, 30-90 wt % of a carrier, 2-50 wt % of the ZSM-5/β core-shell molecular sieve of claim 1, and 0-50 wt % of an additional molecular sieve.

13. The catalyst of claim 12, comprising: on a dry basis and based on the weight of the catalyst, 50-90 wt %, preferably 60-85 wt %, of a carrier and 10-50 wt % of the ZSM-5/β core-shell molecular sieve, wherein the carrier comprises silica sol and a modifying element.

14. The catalyst of claim 13, wherein the carrier comprises one or more selected from the group consisting of pseudo-boehmite, alumina sol, and clay.

15. The catalyst of claim 12, comprising: on a dry basis and based on the weight of the catalyst, 50-85 wt % of a carrier, 10-35 wt % of the ZSM-5/β core-shell molecular sieve, and 5-15 wt % of a molecular sieve having a pore opening diameter of 0.65-0.70 nm.

16. The catalyst of claim 12, comprising: on a dry basis and based on the weight of the catalyst, 30-83 wt % of a carrier and 2-20 wt % of the ZSM-5/β core-shell molecular sieve and 15-50 wt % of a Y molecular sieve.

17. The catalyst of claim 12, comprising: on a dry basis and based on the weight of the catalyst, 50-79 wt % of a carrier, 15-35 wt % of the ZSM-5/β core-shell molecular sieve, 5-10 wt % of a Y molecular sieve, 1-5 wt % of a molecular sieve having a pore opening diameter of 0.65-0.70 nm.

18. A process for catalytic conversion of a hydrocarbon oil, comprising the step of contacting a hydrocarbon oil feedstock with the catalyst according to claim 12 for reaction.

19. The process of claim 18, wherein the catalytic conversion is catalytic cracking of hydrogenated vacuum gas oil (VGO), catalytic cracking of hydrogenated light cycle oil (LCO) to produce light olefins, catalytic cracking of heavy oil, or catalytic cracking of intermediate base crude oil.

\* \* \* \* \*